United States Patent [19]
Beck et al.

[11] Patent Number: 5,467,754
[45] Date of Patent: * Nov. 21, 1995

[54] ACCUMULATOR FUEL INJECTION SYSTEM

[75] Inventors: Niels J. Beck, Bonita; James A. Pena, Leucadia; Alan R. Roach, Del Mar; Bevan H. Johnston, La Mesa, all of Calif.

[73] Assignee: Servojet Electronic Systems, Ltd., San Diego, Calif.

[*] Notice: The portion of the term of this patent subsequent to Aug. 30, 2011, has been disclaimed.

[21] Appl. No.: 118,168

[22] Filed: Sep. 7, 1993

Related U.S. Application Data

[63] This application is a continuation-in-part of PCT/US92/05227, filed Jun. 25, 1992; and continuation-in-part of Ser. No. 830,981, Jan. 28, 1992, Pat. No. 5,241,935, which is a continuation of Ser. No. 152,013, Feb. 3, 1988, abandoned.

[51] Int. Cl.$^6$ ............................................. F02B 3/00
[52] U.S. Cl. ................................... 123/467; 123/300
[58] Field of Search ................................ 123/299, 300, 123/467, 447, 458; 239/88–96

[56] References Cited

U.S. PATENT DOCUMENTS

| | | | |
|---|---|---|---|
| 1,735,718 | 11/1929 | Attendu . | |
| 4,168,804 | 9/1979 | Hofmann . | |
| 4,284,043 | 8/1981 | Happel . | |
| 4,470,548 | 9/1984 | Ushimura . | |
| 4,473,046 | 9/1984 | Aoyama et al. . | |
| 4,540,126 | 9/1985 | Yoneda et al. . | |
| 4,548,172 | 10/1985 | Bailey . | |
| 4,704,999 | 11/1987 | Hashikawa et al. . | |
| 5,191,867 | 3/1993 | Glassey . | |
| 5,241,935 | 9/1993 | Beck | 123/300 |
| 5,287,838 | 2/1994 | Wells | 123/506 |
| 5,341,783 | 8/1994 | Beck | 123/446 |
| B1 4,715,541 | 8/1991 | Freudenschuss . | |

FOREIGN PATENT DOCUMENTS

| | | |
|---|---|---|
| 972143 | 1/1951 | France . |
| 2191606 | 1/1974 | France . |

OTHER PUBLICATIONS

SAE Technical Paper Series, *Effects of Fuel Injection on Diesel Combustion*, Beck et al., Mar. 1988.

SAE Technical Paper Series, *Injection Rate Shaping and High Speed Combustion Analysis–New Tools for Diesel Engine Combustion Development*, Beck et al, Nov. 1989.

*Primary Examiner*—C. S. Miller
*Attorney, Agent, or Firm*—Nilles & Nilles

[57] ABSTRACT

A method of reducing undesired premixed burning in an internal combustion engine includes lifting an injector needle of a fuel injector a constant low-lift increment from a valve seat of a valve covers orifice (VCO) nozzle having an injection hole opening into the valve seat, and preventing lifting of the needle beyond the low-lift increment for a sufficient interval of time to inject a relatively small initial fuel charge into the engine from the VCO nozzle, the injection producing a highly atomized, wide-angle spray plume with relatively low penetration. The interval terminates when lifting forces imposed on the needle overcome holding forces imposed on the needle by a stop plate which has opposed first and second surfaces exposed to an ambient fluid pressure and to a fluid vapor pressure, respectively. A subsequent step includes lifting the needle to a higher lift position to inject a main fuel charge into the engine, the main fuel charge being injected as a relatively narrow jet having high penetration. The stop plate preferably has opposed rough and smooth flat surfaces orientable such that preventing step will occur when the smooth surface faces downwardly and will not occur when the plate is inverted such that the rough surface faces downwardly.

31 Claims, 21 Drawing Sheets

ACCUMULATOR FUEL INJECTION SYSTEM

CROSS-REFERENCE TO RELATED APPLICATIONS

This application is a continuation-in-part of PCT/US92/05227, filed Jun. 25, 1992; and a continuation-in-part of U.S. patent application Ser. No. 07/830,981, filed Jan. 28, 1992, now U.S. Pat. No. 5,241,935 which is a continuation of U.S. patent application Ser. No. 07/152,013, filed Feb. 3, 1988, now abandoned.

BACKGROUND OF THE INVENTION

1. Field of the Invention

The present invention relates to fuel injectors for internal combustion engines, and particularly to improvements in accumulator-type fuel injectors, including both unintensified and intensified accumulator injectors, which produce improved fuel economy, noise reduction, and reduction of undesirable exhaust emissions, including smoke, oxides of nitrogen, and hydrocarbons.

2. Description of the Prior Art

Accumulator-type fuel injectors have been known in the art for many years, but never have achieved widespread use. It is believed this is because they have heretofore not solved problems present in conventional injectors, and have even introduced additional problems which have been inherent in prior art forms of accumulator injectors.

One serious problem with both conventional fuel injectors and prior art accumulator-type fuel injectors has been premixed burning of the fuel. Typically, about 25–50 percent of the total quantity of fuel injected will be atomized and mixed with air prior to the start of combustion. The sudden combustion of this premixed fuel causes a rapid rate of heat release at the beginning of ignition, with a resulting excessively high noise level, and undesirable exhaust emissions including smoke, oxides of nitrogen, and hydrocarbon emissions. One answer to this problem is to provide a two-stage injection, with a small pilot charge of fuel first injected and ignited, and then the main charge of fuel injected and immediately ignited by the already ignited pilot charge. A system of this type is taught in Loyd U.S. Pat. No. 4,414,940. Although the Loyd system does solve the problem, it requires two separate injectors, one for the pilot charge and another for the main charge, making the system undesirably complicated and expensive.

Another problem with both conventional fuel injectors and prior art accumulator-type fuel injectors is that they produce a fixed spray pattern regardless of engine power demands, and this necessarily compromises engine efficiency at some power settings. For optimum overall engine efficiency, it would be desirable to tailor the spray configuration variably according to the power demands of the engine by having a relatively wide, flat conical spray configuration at relatively low fuel delivery, such as during engine idle, and to have the cone of the spray narrow progressively as the power setting is progressively increased.

The injector needle closure event has been characteristically unsatisfactory in prior art accumulator-type injectors. Typically, atomization of the fuel has been poor as the needle approaches the seat. Rapid needle closure is required to keep atomization good during the closing event, but the required high speed needle movement has caused needle bounce off of the seat, resulting in secondary and sometimes tertiary injection events, with essentially unatomized fuel dribble being the further result. Both poor atomization and fuel dribble associated with needle closing results in undesirable smoke and high hydrocarbon levels in the exhaust. Prior art accumulator needles have been characteristically long and massive, and if closed at high speed, considerable elastic compressional energy builds up along their lengths upon striking the valve seat, and when this energy is released it causes the needle to bounce off the seat. Examples of accumulator injector needles which are thus undesirably long and massive are found in Falberg U.S. Pat. No. 2,985,378, Berchtold U.S. Pat. No. 4,566,416, Loyd U.S. Pat. No. 4,414,940, Beck et al, U.S. Pat. No. 4,628,881, Vincent et al. U.S. Pat. No. 4,080,942, and in a 1957 publication by Hooker in the Volume 65, 1957 issue of "SAE Transactions," illustrated at page 317. The typical accumulator injector needle mass is on the order of about six grams or more, and with this much mass the energy of momentum of a fast-closing needle is generally too much to avoid needle bounce.

Such prior art long needles in accumulator-type injectors also resulted in an undesirably large needle column length for compression when the injector was charged prior to injection, which tended to prevent close control of the injection characteristics.

While a short, very lightweight needle is desirable to minimize needle bounce, needle closure damping associated with such short, lightweight needle is also desirable to positively preclude needle bounce in a high speed needle closing event. Applicants are not aware of such closure damping having been addressed in the prior art. It is believed that this is because the prior art has not sought to cure the problem of poor atomization proximate needle closure by means of a high speed needle closing event.

In order to maintain good atomization right up to needle closure, it is also necessary to have a high closing accumulator pressure, and this in turn requires high peak pressure and high average pressure in the accumulator cavity to get the required injection quantity at high power settings. A relatively small accumulator cavity is required for high accumulator pressures. Conventional accumulator injector practice has been to have the accumulator cavity coaxially disposed around the needle, with the needle closure spring disposed within the accumulator cavity. In general, this results in accumulator cavities which are too large for a high pressure accumulator, particularly with the very high pressure in an intensified-type accumulator injector such as that disclosed in the aforesaid Beck et al. U.S. Pat. No. 4,628,881. With the spring located in the accumulator cavity, the only way to reduce the volume of the cavity would be to reduce the size of the spring, and this is just the opposite off what is required for high speed needle closure, namely, a large, strong closure spring. This conventional arrangement with the needle spring concentrically located within the accumulator cavity is seen in Falberg U.S. Pat. No. 2,985,378, Berchtold U.S. Pat. No. 4,566,416, Loyd U.S. Pat. No. 4,414,940, Beck et al. U.S. Pat. No. 4,628,881, and the aforesaid Hooker publication. Vincent et al. U.S. Pat. No. 4,080,942 has the needle spring located in a control chamber which receives pressurized fluid for holding the needle down, but this has resulted in the main accumulator chamber being spaced coaxially above the control chamber, a cumbersome arrangement which could not possible be used in an intensified form of accumulator injector such as that disclosed in the Beck et al. U.S. Pat. No. 4,628,881. For a practical and compact accumulator fuel injector, the accumulator cavity should be arranged closely proximate the spring cavity within a lower portion of the injector, and generally concentrically and thereby compactly oriented about the spring cavity. This is the only feasible location for the accumulator cavity in an intensified form of accumulator injector.

Pintle spray nozzles have frusto-conical deflecting surfaces are known in the fuel injector art, and are common in garden hose nozzles. In hose nozzles, the angle of the spray is manually adjustable by axial movement of the pintle head relative to the orifice. However, no such adjustability has heretofore been known in the fuel injector art, even though automatic adjustment of the spray cone angle to tailor the spray to engine power demands could produce substantial increases in efficiency over the engine power spectrum.

Two-stage injection processes are better suited for the reduction of undesired premixed burning when the injection of the initial or pilot charge is throttled to produce a highly atomized and dispersed pre-injection spray for ignition and the main charge is injected in the form of a penetrating jet spray. The atomized initial charge is produced by forcing the fuel under high pressure through a small area immediately upstream of the injection holes so as to produce highly turbulent flow through the holes, thus resulting in the desired atomization. This effect, however, cannot be achieved substantially using conventional sac or pintle nozzles.

Another problem associated with conventional two-stage fuel injection systems is that such systems typically cannot be converted into single-stage systems, i.e., systems lacking a pilot or initial injection stage, without completely redesigning the system. This of course limits the versatility of the typical two-stage injection system.

SUMMARY OF THE INVENTION

In view of these and other problems in the art, it is a general object of the present invention to provide a fuel injector for internal combustion engines which produces reduced noise levels, and reduction of undesirable exhaust emissions including smoke, oxides of nitrogen and hydrocarbons.

Another object of the invention is to provide an improved fuel injector for internal combustion engines which substantially eliminates premixed burning and its adverse effects of noise and undesirable exhaust emissions.

Another object of the invention is to provide a simplified two-stage injection system for first injecting a small pilot or initial charge of fuel which is ignited before injection of the main charge, and then injecting the main charge of fuel which is immediately ignited by the already ignited pilot charge, for elimination of the usual large amount of premixed burning and its adverse effects, the system requiring only a single injector.

Another object of the invention is to provide a fuel injection system which can be used as either a single-stage injection system or a two-stage injection system depending upon the orientation of a single component of the system.

Another object of the invention is to provide a fuel injector system which tailors the injection spray configuration variably according to the power demands of the engine for improved efficiency over the full range of power settings, delivering the injected fuel in a relatively wide, flat conical spray configuration at relatively low engine power settings, such as during engine idle, with the cone of the spray narrowing progressively as the power setting is progressively increased.

Another object of the invention is to provide a fuel injector which has a high pressure, high speed needle closing event without material needle bounce and associated secondary and possibly tertiary injections proximate closure, resulting in good atomization right up to closure and substantial elimination of fuel dribble.

Another object of the invention is to provide, in an accumulator-type fuel injector, a needle which is particularly short and light in weight so that it can be moved rapidly in the needle closing event for sharp fuel cut off, while at the same time it will store only minimal elastic compressional energy when it impacts the valve seat, with resulting minimization of needle closure bounce. Such short needle has a much shorter compression column length than conventional accumulator-type injector needles, enabling closer control of the injection characteristics to be maintained.

Another object of the invention is to provide, in an accumulator-type fuel injector, a needle closure damper for effectively damping the end of the needle closing event, for positively precluding needle closure bounce.

A further object of the invention is to provide, in an accumulator-type injector, a needle closure damper which is remote from the needle tip and valve seat, thereby permitting efficient shaping of the needle tip and valve seat for a high flow coefficient as the needle approaches the seat during closure, maintaining high pressure proximate the seat with resulting good atomization up to closure.

Another object of the invention is to provide an improved accumulator-type fuel injector of the character described which does not require a specialized nozzle, so that a generally conventional-type nozzle and associated manufacturing tooling may be utilized.

A further object of the invention is to provide, in an accumulator-type injector, an accumulator cavity which is separate and isolated from the needle spring cavity yet is compactly arranged closely proximate the spring cavity within a lower portion of the injector, enabling a large, high speed needle spring to be employed, while at the same time enabling the accumulator cavity to be as small as desired for high pressure accumulator operation, both of which are important factors in achieving fast, crisp needle closure with good fuel atomization and minimum fuel dribble proximate closure.

A further object of the invention is to provide, in an accumulator-type injector, a two-part needle comprising a lower part which engages the valve seat and an upper plunger part which engages the needle during the needle opening event to slow down the opening as a damping factor, but separates from the needle during the needle closing event to minimize needle length and mass for high speed needle closure with minimum bounce from stored elastic compressional energy.

A further object of the invention is to provide, in an accumulator-type injector, novel needle opening stop devices which stop the needle at a small initial "prelift" or "low-lift" increment of lift from a small pilot injection, and then release the needle to its full lift for injection of the main charge.

A further object of the invention is to provide methods for controlling the time interval during which the needle remains in the small prelift or low-lift position for injection of the pilot charge, including adjustably orificing the needle opening vent passage, and adjusting the vent pressure level.

A further object of the invention is to provide such stop devices at a location immediately above a short, one-piece needle, enabling minimization of the needle compression column length for closer control of the injection characteristics.

A still further object of the invention is to provide hydraulic circuitry for producing and controlling the time duration of the needle prelift, including a positive stop arrangement associated with such hydraulic circuitry for defining the amount of needle prelift.

Yet a further object of the invention is to provide, in an intensified accumulator-type fuel injector, intensifier plunger over-travel safety means for stopping further and uncontrolled injection events in the event of injector nozzle breakage.

An additional object of the invention is to improve the flow coefficient proximate the needle tip and seat in an accumulator-type injector by axially guiding the needle closer to the seat for improved repeatability of centering of the needle on the seat upon needle closure, thereby enabling higher closer pressures and consequent better fuel atomization proximate closure.

Yet another object of the invention is to provide a two-stage injection system and process which, in the initial or pilot stage, produces a highly atomized spray with low penetration for improved ignition.

The present invention provides a series of both method and apparatus advances in the accumulator-type fuel injector art, each of which produces improved engine performance, and when some or all are combined, synergistically produce surprisingly large improvements in engine fuel economy, reduction of noise, and reduction of undesirable exhaust emissions, including smoke, oxides of nitrogen and hydrocarbons. The invention is applicable to both intensified accumulator injectors of the general type disclosed in the aforesaid Beck et al. patent, and unintensified accumulators of the general type disclosed in the aforesaid Beck et al., Falberg, Berchtold and Vincent et al. patents, and Hooker publication.

According to the invention, injector needle closure speed is increased for sharper fuel cut off and hence better atomization proximate closure, while at the same time needle bounce off of the valve seat is reduced, to minimize secondary and sometimes tertiary injection events and consequent fuel dribble, by reducing both the mass and the length of the needle. In one form of the invention, reduction of both the closing mass and closing length of the needle is accomplished by dividing the needle longitudinally into a pair of longitudinal sections, a lower needle section and an upper plunger section, which act as a unit during the needle opening stroke, but separate during the closing stroke so that a lower needle section of greatly reduced mass and length operates independently during needle closure.

Needle bounce is also reduced according to the invention by means of hydraulic damping which cushions the end of the needle closure stroke. This is accomplished by providing a damper member that is coupled to the upper end of the needle, or to the upper end of the lower needle portion in the case of the divided needle, located in a fluid-filled cavity, with close-tolerance spacing both peripherally between the damper member and the wall of the cavity and axially under the damper member. The resulting constriction against passage of fluid from under the damper member past the periphery of the damper member produces a hydraulic "squish damping" effect proximate needle closure. The low mass of the needle cooperates with this hydraulic damping in minimization of needle bounce. Preferably, this closure damping cavity is remote from the needle tip and seat, permitting efficient shaping of the needle tip and valve seat for a high flow coefficient and resulting good atomization proximate closure. In some forms of the invention, this closure damping cavity is also the needle spring cavity which is separate and isolated from the accumulator cavity.

The end of the opening stroke of the needle is also preferably damped according to the invention. This is accomplished by providing a damper cavity just above the upper end of the needle, or in the case of the divided needle, just above the upper end of the upper plunger section. A needle stop and damping plate is located in the damper cavity, having close-tolerance peripheral spacing relative to the wall of the cavity. The cavity has a downwardly facing shoulder against which the upper end of the needle or plunger moves the stop/damping plate to define the fully open needle position, and hydraulic squish damping occurs by constricted flow of fluid around the periphery of the plate and between the plate and this stop shoulder. The opening stroke of the needle may be further slowed down or damped by adding mass to the needle during the opening stroke. This is accomplished by employing the divided needle arrangement referred to above which adds the mass of the plunger to the mass of the needle during the opening stroke, while leaving the plunger behind and removing its mass for the closing stroke.

In some forms of the invention, the accumulator cavity is separated from the needle spring cavity. This enables the accumulator cavity to be made as small as desired for high pressure accumulator operation, while at the same time enabling use of a strong, fast-acting spring for rapid needle closure. Both high accumulator pressure, which enables high closing pressure, and a strong spring for causing fast needle closure are factors which cumulatively contribute to good closure atomization. The spring cavity is coaxial of the needle, while the accumulator cavity is spaced radially outwardly from the spring cavity in a lower portion of the injector, which is an optimal location for the accumulator cavity in the intensified form of the invention. The higher the accumulator cavity pressure, the smaller the accumulator cavity must be for the same quantity of fuel injected. To accommodate very high accumulator cavity pressures in the intensified form of the invention, the accumulator cavity comprises a plurality of generally parallel accumulator bores peripherally spaced about the spring cavity.

Preferred forms of the present invention embody a two-stage needle lift for first injecting a small pilot charge of fuel which is ignited before injection of the main charge, and then injecting the main charge of fuel which is immediately ignited by the already ignited pilot charge. This eliminates the usual amount of premixed burning and its adverse effects of poor fuel economy, large noise levels, and large levels of undesirable exhaust emissions. The initial needle prelift or low-lift stage may be from about 1 to about 20 percent of maximum needle lift, and the pilot charge is preferably on the order of about 2–20 percent of the full charge.

In some forms of the invention, this two-stage needle lift is accomplished by utilizing a two-stage venting of pressure from above the opening stop/damping plate referred to above to first stop the needle at the prelift position, and then after a sufficient interval of time for injection of the pilot charge, release the needle to move further upwardly for full injection of the main charge.

In this case, the damping/stop plate preferably is smoothly polished or lapped on its flat lower surface and rough on its upper surface so as to be sealed to the mating smooth, flat shoulder of the injection body when in its seated position such that ambient pressure acts downwardly on the stop plate and only fluid vapor pressure acts on the interface between the stop plate and the injector body. The second stage (injection of main charge) is thus initiated when the stop plate is lifted off from its seat so that the fluid vapor pressure acting on the stop plate lower surface increases to ambient pressure. This arrangement permits the conversion of the system to a single-stage system simply by turning the damping/stop plate over during assembly such that the roughened surface is normally nonsealingly seated on the injector body such that ambient fluid pressure is always present both above and beneath the damping/stop plate so that the plate offers little or no resistance to needle lift.

In other forms of the invention, the two-stage needle lift is accomplished by hydraulic circuits which provide two-stage venting of pressurized fuel from above the needle so as to cause a first low-lift increment of movement of the injector needle, and then in sequence the full lift movement of the needle.

The various two-stage lift forms of the invention are shown and described in connection with intensified forms of the invention, applying the two-stage venting to the low pressure intensifier cylinder so as to control the pressure in the high pressure cylinder. However, such two-stage venting to control the two-stage lift is equally applicable to unintensified forms of the invention, with the venting being from directly above the needle.

In a presently preferred form of the invention, a stop/rate plate of the character described above is disposed immediately above the top of a short needle, for minimization of needle column length, and in this form the accumulator cavity may be located generally coaxially above the stop/rate plate and hydraulically separated from the cavity which contains the stop/rate plate. In a form of the invention which has the needle divided into a lower needle section and an upper plunger section, the stop/rate plate is disposed immediately above the plunger section, and the accumulator cavity may be disposed below the rate plate and also hydraulically separated from the cavity which contains the stop/rate plate.

The injection spray pattern or configuration may be automatically varied for improved engine efficiency over the engine power spectrum by utilizing a pintle nozzle which is variably controlled according to the quantity of fuel delivered. Use is made of the fact that in an accumulator injector the needle lift is momentarily generally proportional to the difference between opening and closing pressures, and hence also to fuel delivery volume. The pintle nozzle is arranged to deliver a relatively wide, flat cone of spray for low engine power settings, such as at idle, and a narrowing cone of spray for increasing power settings.

A further feature of both the intensified and unintensified forms of the invention is that the needle is axially guided very close to the valve seat, which provides reliable repeatability of needle centering on the seat over a long operational life of the injectors. This enables the needle tip and seat combination to have a high flow coefficient for high pressure closure and consequent good atomization proximate closure.

A further feature of the invention is the production of a highly atomized spray with low penetration during the initial or pilot injection stage through the use of a valve covers orifice (VCO) nozzle in combination with the inventive damping/stop plate. With this construction, fuel flow into the injection holes of the VCO is throttled during the initial or pilot injection stage due to the decreased area between the needle and the valve seat immediately upstream of the injection holes. This configuration results in a high turbulence at the entry to the injection hole resulting in the highly atomized spray of fuel from the holes with low penetration.

BRIEF DESCRIPTION OF THE DRAWINGS

These and other objects and advantages of the invention will become more apparent from the following Detailed Description and the accompanying drawings, wherein.

DETAILED DESCRIPTION

A. First Embodiment

Figure 1:
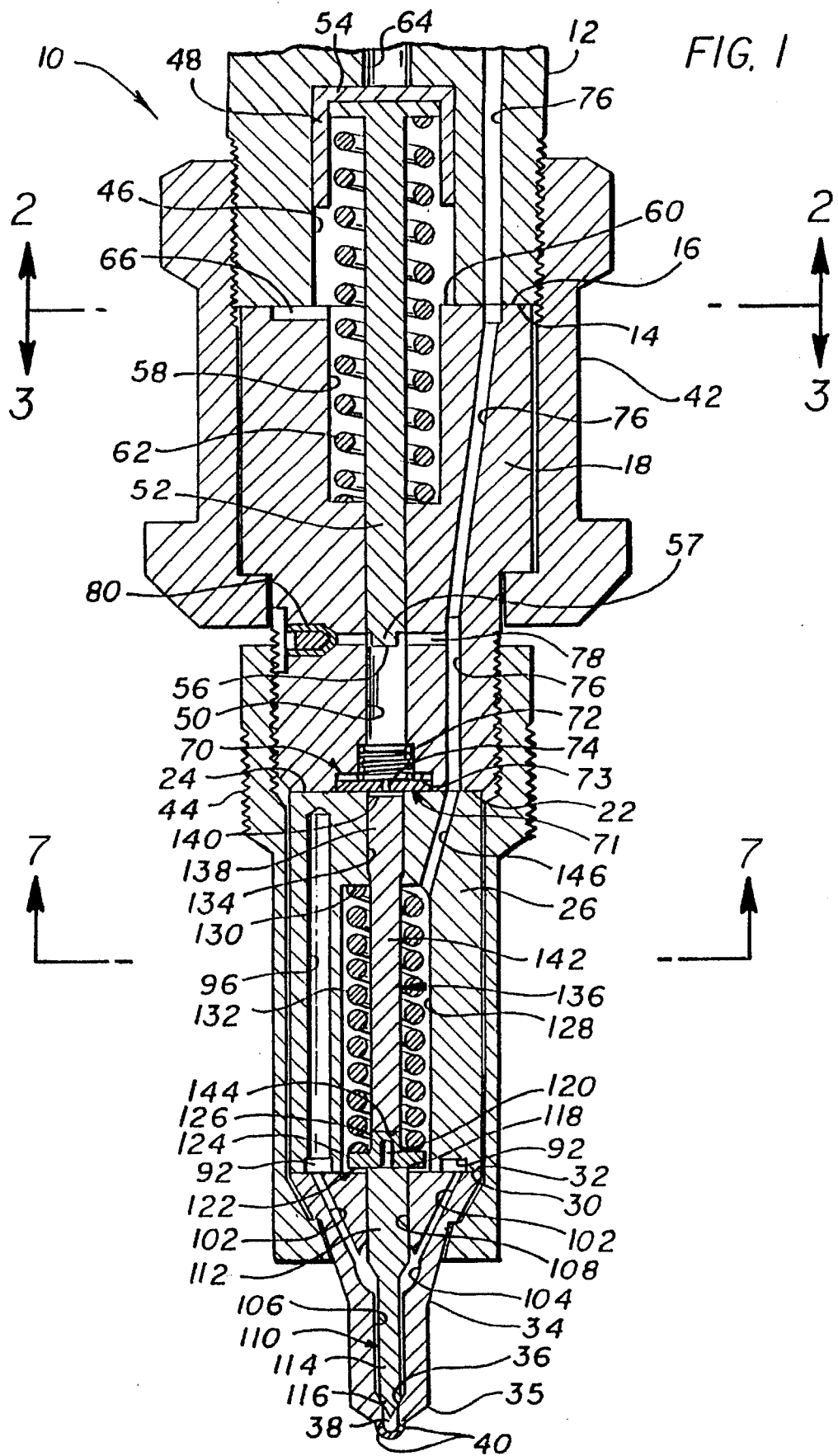
FIG. 1 is an enlarged longitudinal, axial sectional view of an intensified form of the present invention, with the needle shown in the closed position.

Referring to the drawings, and at first particularly to FIGS. 1–8 thereof, these figures illustrate an "intensified" or pressure multiplication form of the present invention. The longitudinal axial sectional view of FIG. 1 best illustrates the overall assembly of this form of the invention, while the fragmentary longitudinal axial section of FIG. 4 best illustrates the high pressure fuel input to the accumulator cavity.

The intensified form of the invention has particular utility for diesel engines where high overall accumulator pressures and consequent high closing pressure enabled thereby can be beneficial as described hereinafter. Nevertheless, it is to be understood that the intensified form of the invention may also be beneficially employed for engines powered with gasoline or other liquid fuels.

1. Construction of First Embodiment

Figure 9:
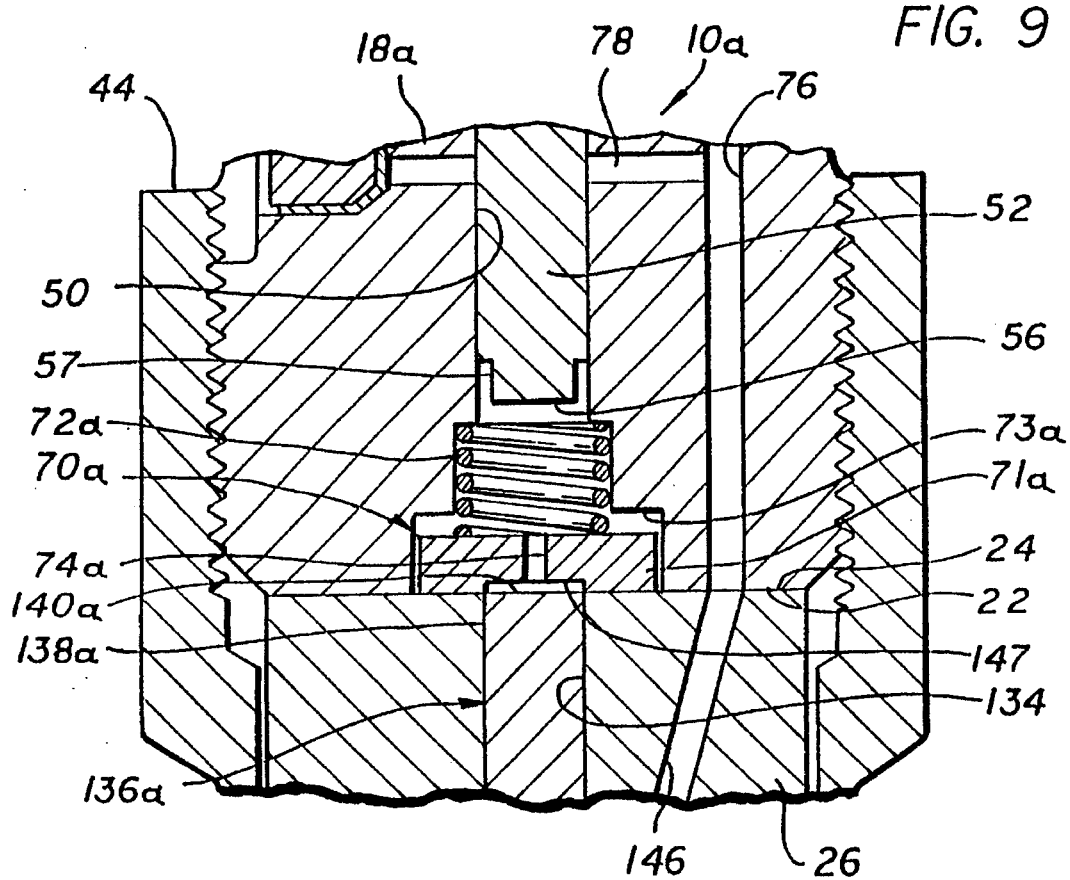
FIG. 9 is a view similar to a portion of FIG. 8 showing a second form of the stop plate or wafer.
Figure 10:
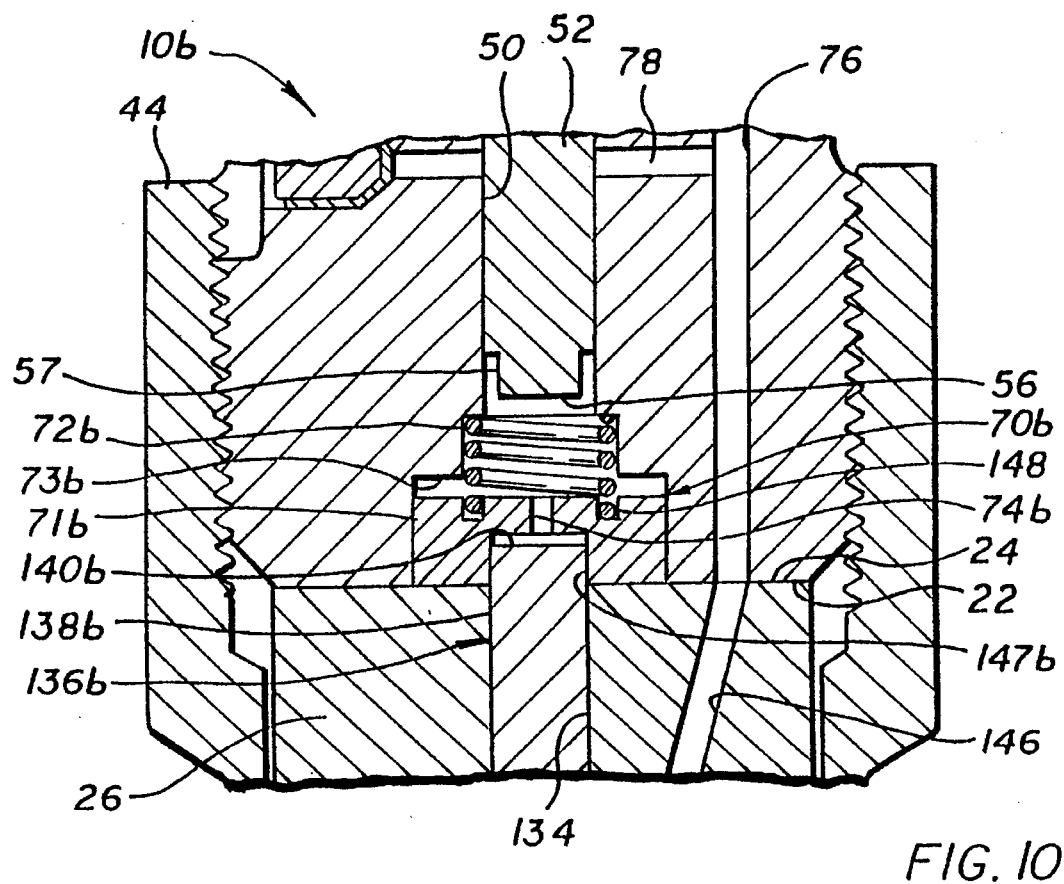
FIG. 10 is a view similar to FIG. 9 showing a third form of the stop plate or wafer.

The intensifier-type accumulator injector of the invention is generally designated 10. A control block 12 is disposed at the upper end of injector 10, control block 12 being in communication with a high speed solenoid actuated control valve (not shown). Such control valve may be like the valve 30 shown and described in detail in the Beak et al. U.S. Pat. No. 4,628,881, which is best illustrated in FIGS. 5a, 9 and 10 of that patent. Features which it is desirable to incorporate in the high speed solenoid actuated control valve are covered in jointly owned co-pending applications, Serial No. 823,807 of Robert L. Barkhimer, filed Jan. 29, 1986 for High Cycle Solenoid Valve (now U.S. Pat. No. 4,997,004), and Ser. No. 830,000 of Niels J. Beck, filed Feb. 18, 1986 for Ball Poppet Valve Seat Construction.

Control block 12 is hydraulically connected to such solenoid actuated control valve in a manner similar to the hydraulic connections of the block 110 to the valve 30 in said Beck et al. '881, patent, for an overall mode of operation of the present intensified accumulator injector 10 which is essentially the same as that of the injector of FIGS. 5a, 5b, 9 and 10 of the Beck et al. '881 patent. It is to be noted that in the Beck et al. '881 patent the block 110 serves not only as the upper part of the injector but also as the main body of the valve, whereas control block 12 in the present invention may be attached to an independent valve body or otherwise hydraulically connected to the solenoid actuated valve, remotely if desired.

Figure 2:
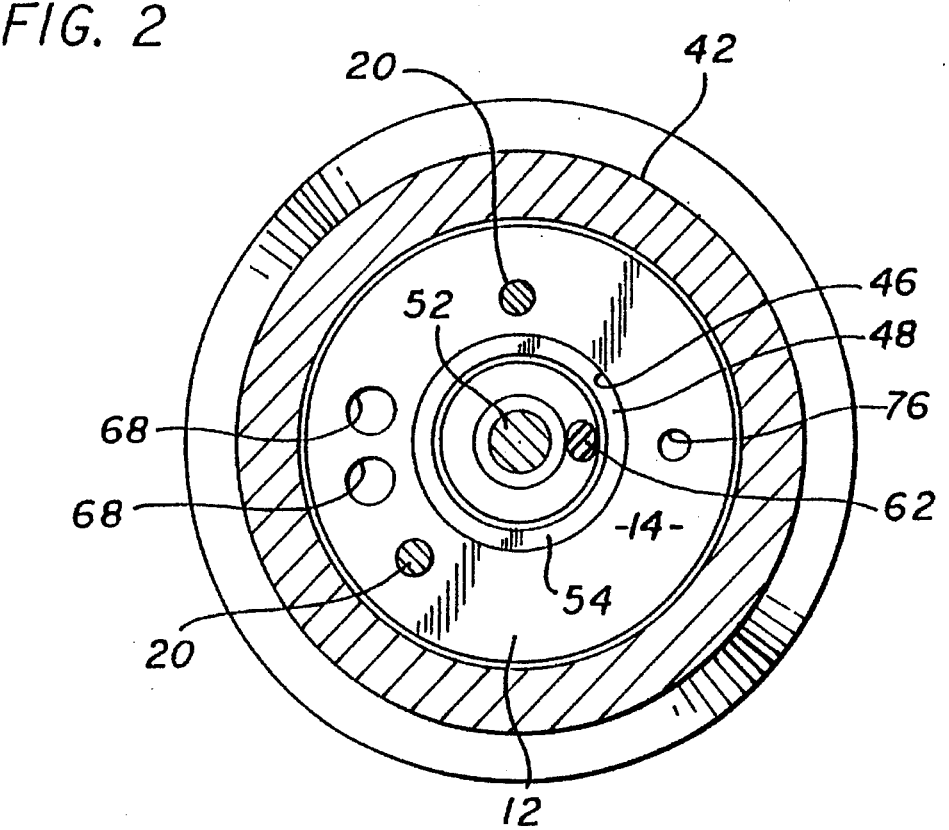
FIG. 2 is a traverse section taken on line 2—2 of FIG. 1, looking upwardly.
Figure 3:
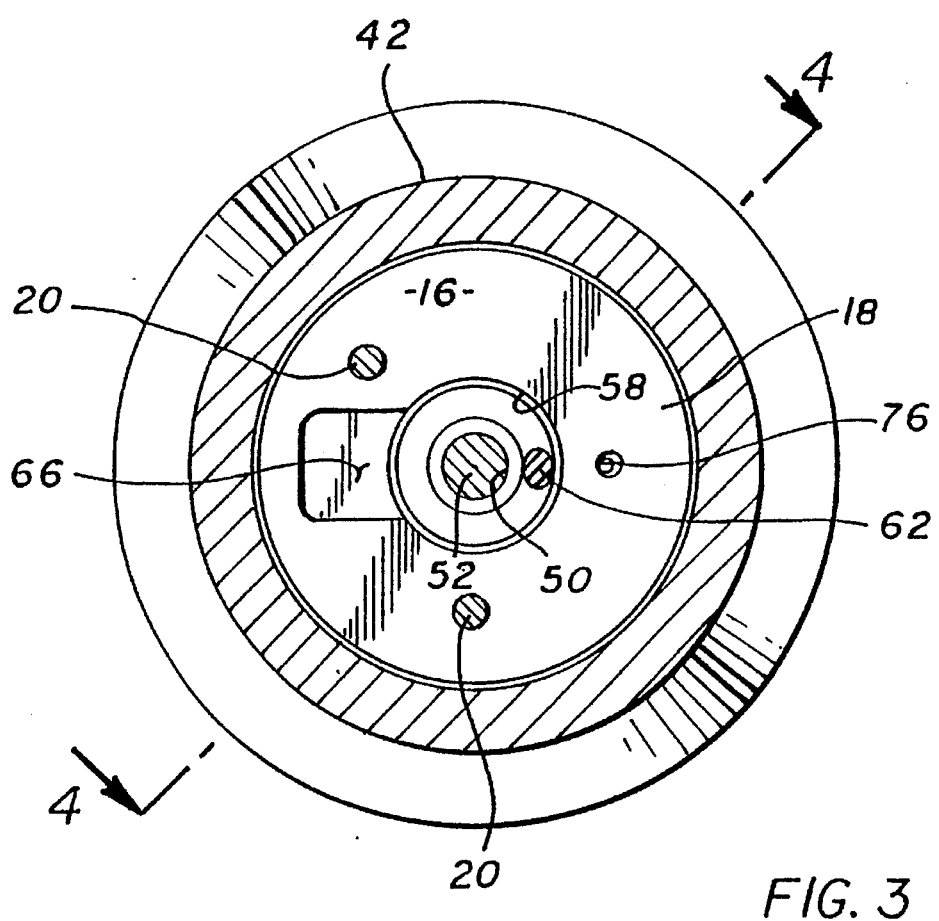
FIG. 3 is a traverse section taken ,on line 3—3 of FIG. 1, looking downwardly.

The flat, transverse lower end surface 14 of control block 12 is lapped to a mating flat, transverse upper end surface 16 of an intensifier body 18, control block 12 and intensifier body 18 being keyed together for correct relative orientation by a pair of locator dowels 20 which are seen in FIGS. 2 and 3. The flat, transverse lower end surface 22 of intensifier body 18 is, in turn, lapped to a flat, transverse upper end surface 24 of an accumulator body 26, intensifier body 18 and accumulator body 26 being keyed together in correct relative orientation by a pair of locator dowels 28 seen in FIGS. 5 and 6. The flat, transverse lower end surface 30 of accumulator body 26 is lapped to a flat, transverse upper end surface 32 of a nozzle body 34 which extends from upper end surface 32 to a lower end generally designated 35 and which, in the illustrated embodiment is a sac nozzle in the lower end 35 of the nozzle body 34 of which are the injector valve seat 36, sac 38 and injection holes 40. Of course, other nozzles could be employed, including a valve covers orifice (VCO) nozzle, detailed below.

The control block 12 and intensifier body 18 are clamped together within an upper housing 42, intensifier body 18 being stepped so as to seat within upper housing 42, and control block 12 being threadedly coupled to upper housing 42. The accumulator body 26 and nozzle body 34 are clamped together with a lower housing 44 which is threadedly coupled to intensifier body 18.

A low pressure hydraulic cylinder 46 having a relatively large diameter bore is axially defined within control block 12, and a relatively large diameter, down-cupped low pressure piston 48 is axially slidable within cylinder 46. A coaxial high pressure hydraulic cylinder 50 having a relatively small bore is axially defined within intensifier body 18, extending down through the lower end surface 22 of intensifier body 18. A high pressure piston or plunger 52 having a relatively small diameter is axially slidable within high pressure cylinder 50. High pressure piston 52 has an upper end cap 54, shown as a flange, which seats inside the low pressure piston 48 against the top wall of the latter. High pressure piston 52 extends downwardly to a flat, transverse lower end 56, and has a reduced diameter lower end portion 57. A cylindrical spring cavity 58 is defined within intensifier body 18, opening through the upper end surface 16 of body 18 into communication with low pressure cylinder 46. Spring cavity 58 is coaxial with cylinder 46 but of smaller diameter so as to provide an upwardly facing shoulder 60 which acts as a stop for downward movement of low pressure piston 48, and consequently also high pressure piston 52 which moves axially down and up as a unit with low pressure piston 48. A piston return spring 62 is disposed within both low pressure cylinder 46 and spring cavity 58, having its lower end seated against the bottom of cavity 58 and its upper end seated against high pressure piston flange 54, biasing flange 54 against the top of low pressure piston 48 so as to effectively couple the pistons 48 and 52 together at all times.

An actuating fluid inlet and vent passage 64 extends axially through the upper portion of control block 12 into communication with low pressure cylinder 46, and provides liquid into low pressure cylinder 46 to drive low pressure piston 48, and hence also high pressure piston 52, downwardly in an intensification stroke from the uppermost position of the two pistons as illustrated in FIG. 1 downwardly to an extent determined by the momentary power demand of the engine, the lowermost positions of the pistons being determined by engagement of the lower lip of low pressure piston 48 against stop shoulder 60. The lowermost position of high pressure piston 52 is the position illustrated in FIG. 4. The liquid supplied via passage 64 preferably comprises fuel but, as discussed in the Beck '881 patent, could comprise another fluid. The Beck '881 patent is, as discussed below, incorporated herein by reference.

Inlet/vent passage 64 also serves as a vent passage through which fluid is vented from low pressure cylinder 46 for initiating and controlling the timing of a small incremental prelift of the needle for injection of a small initial pilot charge, and then full lift of the needle for the main injection. Inlet/vent passage 64 preferably has variable orificing (not shown) for controlling the rate of decay of pressure in low pressure cylinder 46, and hence of the intensified pressure in high pressure cylinder 50, for adjustment of the timing of the prelift and full lift events, as described in detail hereinafter in the description of the operation of the intensified injector 10. The time duration of the prelift phase of the injection event will control the quantity of the pilot charge. Such variable venting by variable orificing or valving of passage 64 affords the opportunity to adjust the prelift portion of the injection while the engine is running by dynamic adjustment of the vent fluid flow. The rate of decay of pressure in low pressure cylinder 46, and hence of the intensified pressure in high pressure cylinder 50, may also be controlled by adjusting the pressure level in the vent line to passage 64, and this may also be done while the engine is running.

To accomplish a downward intensification stroke of pistons 48 and 52, pressurized liquid fuel is passed through inlet/vent passage 64 from the solenoid control valve referred to above at common rail pressure (i.e., regulated pump pressure). For time interval (or time duration or pulse width) fuel metering of the amount of the fuel charge to be introduced into the accumulator, this rail pressure will be the same for each piston stroke, typically on the order of about 1,500 psig, but the length of the time interval during which pressurized fuel is supplied to low pressure cylinder 46 through inlet/vent passage 64 will vary from a relatively short time interval for low engine power to a relatively long time interval for high engine power. For pressure compressibility fuel metering of the fuel charge to be introduced into the accumulator, the pressure of liquid introduced into low pressure cylinder 46 through inlet/vent passage 64 will vary according to engine power demands, as for example from about 500 psig at idle to about 1,500 psig at full power.

Figure 4:
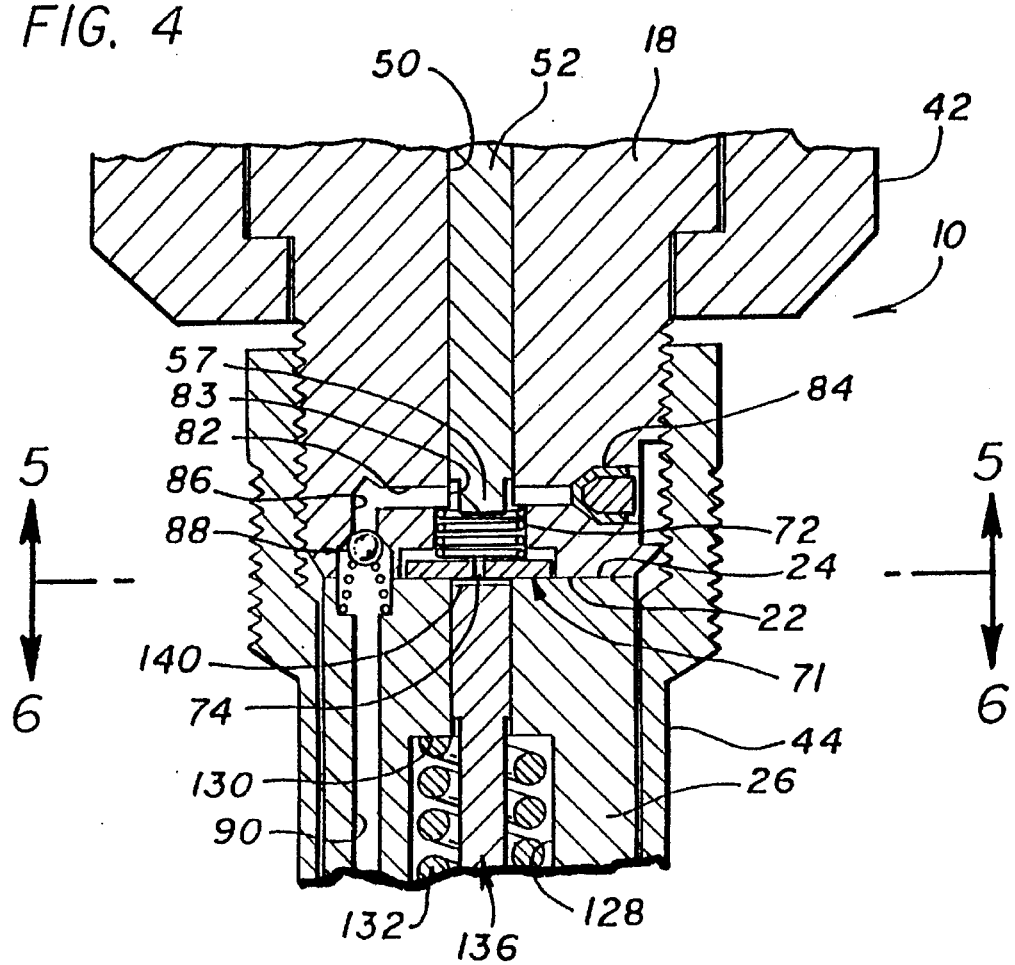
FIG. 4 is a fragmentary longitudinal section, partly in elevation, taken oil line 4—4 of FIG. 3.
Figure 5:
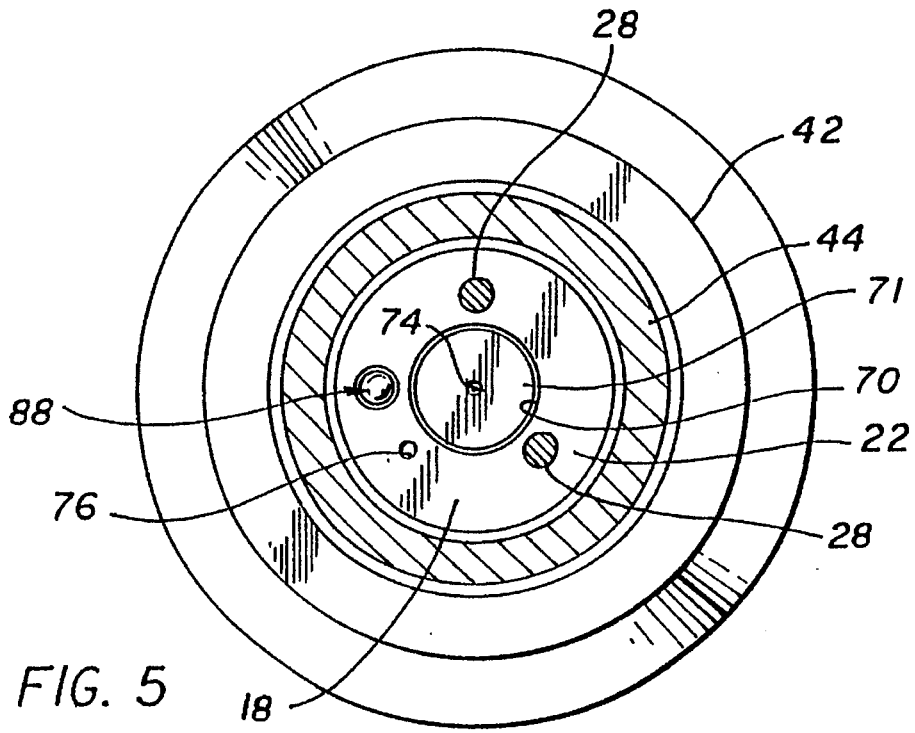
FIG. 5 is a traverse section taken on line 5—5 of FIG. 4, looking upwardly.
Figure 6:
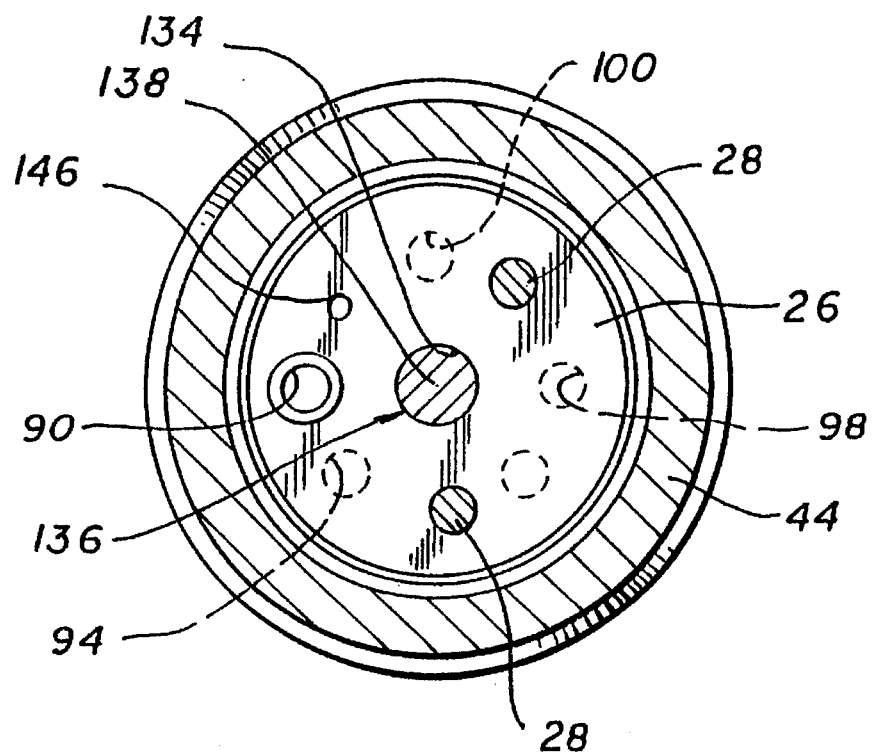
FIG. 6 is a traverse section taken on line 6—6 of FIG. 5, looking downwardly.
Figure 7:
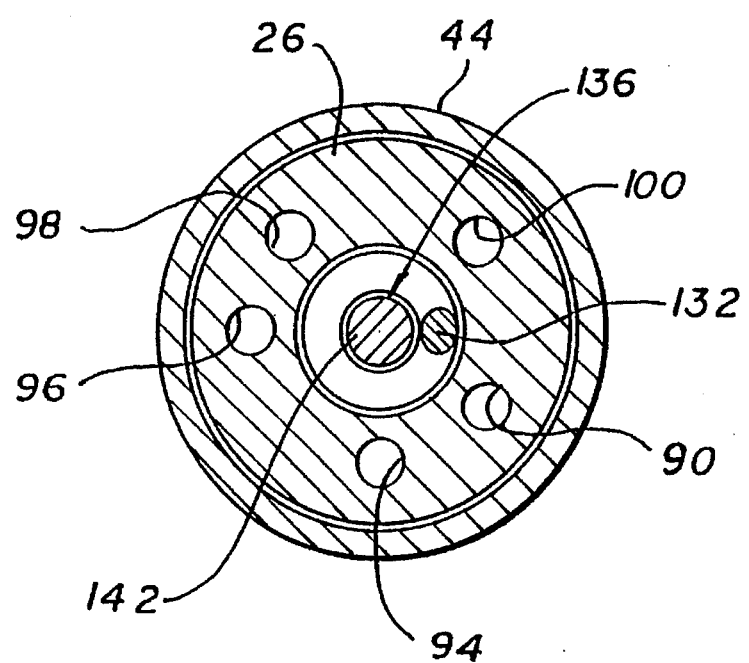
FIG. 7 is a traverse section taken on line 7 of FIG. 1.

For either such time duration fuel metering or pressure compressibility fuel metering, or a combination of both, the length of the downward intensification stroke of pistons 48 and 52 will vary according to power demand, the stroke being a relatively short stroke for a relatively low power demand, and a relatively long stroke for a relatively high power demand, with the full power, maximum stroke length being to the high pressure piston 52 position shown in dotted lines in FIG. 1 and shown in FIG. 4. The hydraulic pressure which builds up in low pressure cylinder 46 will be generally proportional to the length of the downward stroke, and the intensified pressure in high pressure cylinder 50 will be higher than the low pressure cylinder pressure in proportion to the cross-sectional area of high pressure piston 48 divided by the cross-sectional area of low pressure piston 52. A satisfactory intensification factor is on the order of about 15:1, produced by a 15:1 area ratio of low pressure piston 48 to high pressure piston 52. For example, with such a 15:1 intensification, a relatively low rail pressure of 500 psig would produce a relatively low engine power intensified pressure of 7,500 psig, while a relatively high rail pressure of 1,500 psig would produce a relatively high engine power intensified pressure of 22,500 psig.

At the engine-timed instant for initiation of an injection event, the solenoid valve shifts to a vent position in which it vents passage 64, and hence low pressure cylinder 46, to a lowered pressure, which may be essentially atmospheric pressure, which enables piston return spring 62 to move both of the pistons 48 and 52 back up to their positions of repose as illustrated in FIG. 1. The manner in which this causes the injection event to occur will be described in detail hereinbelow.

Pressure relief from within cylinder 46 and spring cavity 58 during the intensification downstroke of the pistons is accomplished through a vent cavity 66 in the upper end of intensifier body 18 and a pair of communicating vent passages 68, seen in FIG. 2, which extend longitudinally upwardly through control block 12 and are vented to essentially atmospheric pressure.

Figure 8:
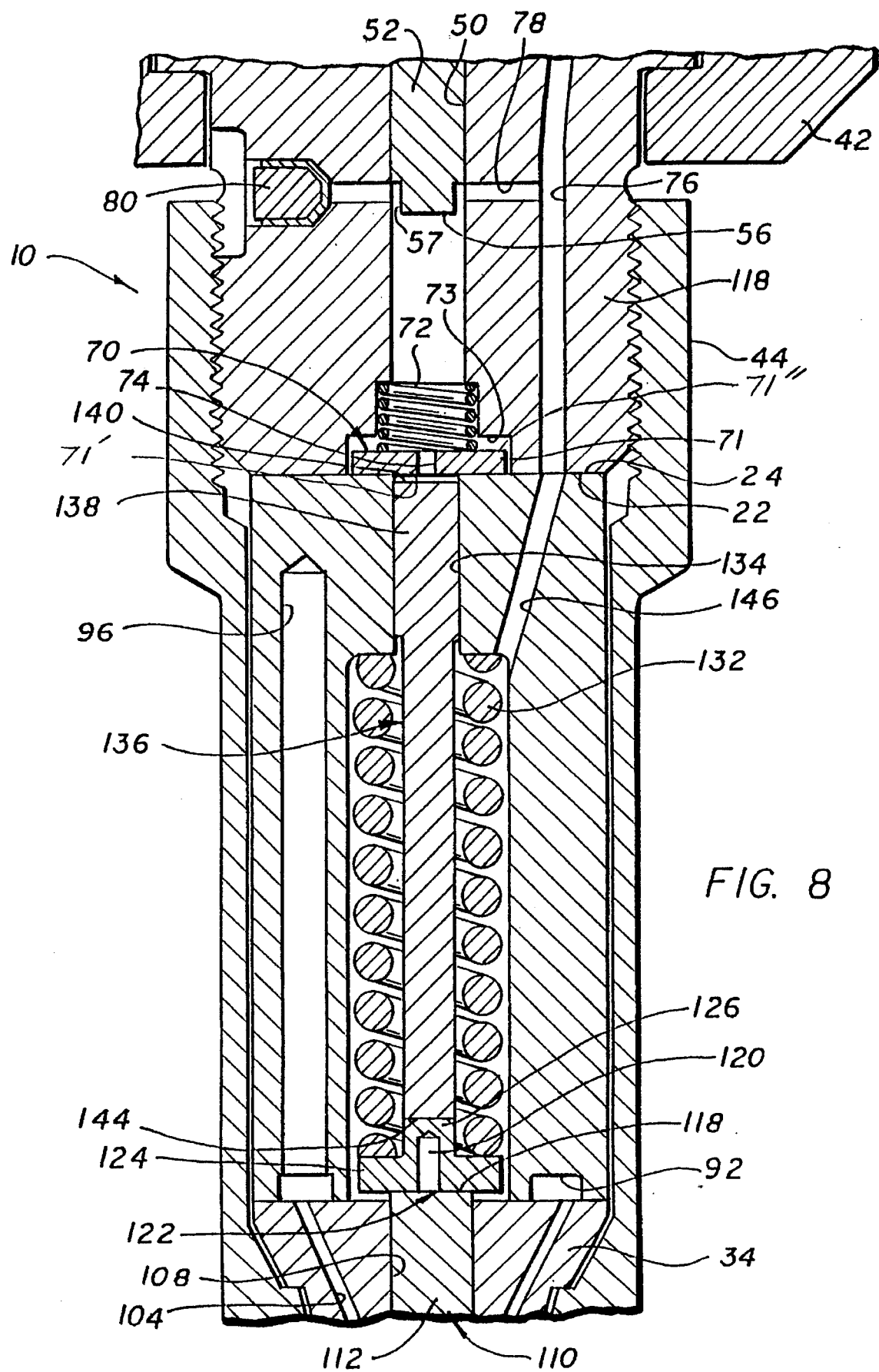
FIG. 8 is a further enlarged fragmentary longitudinal, axial section of a portion of FIG. 1, showing a first form of the opening stop plate or wafer of the invention which is employed to provide two-stage needle lift.

A stepped counterbore is provided in the lower end of high pressure cylinder 50. The relatively large diameter lower portion of this stepped counterbore defines a damper cavity 70 in which a needle stop plate member 71 is disposed. The relatively small upper portion of this stepped counterbore provides a guide for a plate spring 72 which engages the top of plate 71 and biases plate 71 to a normally seated position as shown in FIGS. 1 and 8 with its lower surface 71' peripherally seated flush against the upper end surface 24 of accumulator body 26. The lower surface 71' of plate 71 has a lapped (sealingly seated) fit against a shoulder formed by upper body surface 24 so as to provide a fluid-tight seal in the normally seated position of plate 71. As a result, the net fluid pressure on the plate 71 is the product of 1) the interface area, and 2) the difference between the ambient pressure in cavity 70 and the vapor fluid pressure. Plate 71 is sometimes referred to herein as a needle stop because it serves the function of stopping the opening stroke of the injector needle by abutting against the step or shoulder 73 between the two sections of the stepped counterbore to define the fully open position of the needle. Plate 71 performs two other important functions which will be described in more detail hereinafter. First, whilst still in its seated position as shown in FIG. 1, at the beginning of the opening stroke, the seated plate 71 enables the needle to open slightly to a prelift or low-lift position but stops the needle in this slightly open position for injection of a small pilot charge; and then after a brief interval of time allows the needle to proceed to its fully open position for injection of the main fuel charge. Plate 71 has a central hole 74 therethrough for admitting intensified pressurized fuel to the region below plate 71 during the intensification stroke and until initiation of injection, for holding the needle column down against the intensified pressure within the accumulator cavity. Second, plate 71 serves as a hydraulic damper for damping the end of the opening stroke of the needle to prevent needle bounce for a more uniform fuel spray in the early part of the injection event. The opening damping effect can be adjusted by adjusting the radial clearance between the periphery of stop plate 71 and the annular surface of damper cavity 70.

The first function of the plate 71 can, if desired, be eliminated simply by turning the plate 71 over during assembly such that its relatively rough upper surface 71" is seated on the upper body surface 24 and such that its smooth lower surface 71' faces upwardly. Accordingly, in its normal seated position, the plate 71 would not be lapped to the body surface 24 and no net fluid pressure would be applied against the plate 71.

A fluid supply conduit 76 continuously supplies fuel to the injector 10 at rail pressure, extending longitudinally down through both control block 12 and intensifier body 18, opening downwardly through the lower end surface 22 of intensifier body 18. Fuel supply conduit 76 supplies fuel to high pressure cylinder 50 for intensification and valving on into the accumulator cavity. A cross-conduit 78 provides communication from fuel supply conduit 76 to high pressure cylinder 50, the end of cross-conduit 78 being blocked by a high pressure plug 80, such as a "Lee Plug," disposed in a counterbore of the cross-conduit 78.

After the end of each intensification stroke during which high pressure piston 52 has delivered highly pressurized and compressed fuel from high pressure cylinder 50 into the accumulator cavity, when high pressure piston 52 moves back upwardly to its uppermost, rest position as shown in FIG. 1, it draws a vacuum in high pressure cylinder 50 below fuel inlet cross-conduit 78. When the lower end portion 57 of high pressure piston 52 uncovers cross-conduit 78 into communication with high pressure cylinder 50, fuel under rail pressure from supply conduit 76 flows through cross-conduit 78 fill the void in the lower portion of high pressure cylinder 50.

High pressure cylinder 50 is thus loaded with fuel at rail pressure and is ready for another intensification stroke during which it greatly increases the fuel pressure above rail pressure, compressing the fuel and delivering it to the accumulator cavity. For time interval fuel metering, the amount of increase of pressurization within high pressure cylinder 50 over rail pressure will be determined by the duration of the time interval, and the corresponding length of the stroke of high pressure piston 52 downwardly from its rest position as shown in FIG. 1. For pressure compression metering, the pressure produced by the intensification stroke in high pressure cylinder 50 will be an increase above rail pressure in proportion to the ratio of the transverse area of low pressure piston 48 to the transverse area of high pressure piston 52, since the intensification stroke is time to enable a substantial equilibrium to be achieved between the downward rail pressure force against the top of low pressure piston 48 and upward intensified fluid pressure force against the lower end 56 of high pressure piston 52, before the injection event is commenced by venting fluid pressure from above low pressure piston 48 through inlet vent passage 64.

Reference will now be made to FIG. 4 which illustrates the fluid communication from high pressure cylinder 50 into the accumulator cavity. The axial sectional view of FIG. 4 is rotationally offset 135° from the axial section of FIG. 1, this 135° offset being clockwise looking downwardly as in FIGS. 3 and 6. A second radially oriented cross-conduit 82 is located below the upper end of the reduced diameter lower end portion 57 of high pressure piston 52 at the lowermost stroke position of high pressure piston 52 as illustrated in FIG. 4. Cross-conduit 82 defines an outlet port 83 from high pressure cylinder 50 leading to the accumulator cavity. High pressure plug 84, such as a Lee Plug, seals the drilling end of cross-conduit 82, being located in a counterbore thereof.

Cross-conduit 82 leads from outlet port 83 to a longitudinally oriented passage 86 which provides communication from high pressure cylinder 50 through a check valve 88 leading to an accumulator bore 90 which defines one portion of the overall accumulator cavity. Accumulator bore 90 is located generally in the peripheral region of accumulator body 26, and is oriented parallel to the longitudinal axis of accumulator body 26. Accumulator bore 90 extends downwardly to a location proximate the bottom of accumulator body 26 where it communicates with an annular cavity or ring passage 92 seen in FIG. 1, in the same manner as accumulator bore 96 shown in FIG. 1. There are five of these longitudinally arranged accumulator bores spaced about the peripheral region of accumulator body 26 in the form of the invention illustrated in FIGS. 1–10 which cumulatively make up the primary accumulator cavity, all of which communicate with annular cavity 92. These are seen in section in FIG. 7, and in the transverse sectional view of FIG. 6 the accumulator bore 90 is seen from its upper end and the four other accumulator bores 94, 96, 98 and 100 are shown in dotted lines.

While five of these accumulator bores make up the primary accumulator cavity in the illustrated form of the invention, it is to be understood that any desired number of such accumulator bores having any desired diameter may be provided according to the selected volume for the primary accumulator cavity of injector 10. Not only can the number and diameters of these accumulator bores be varied, but also the lengths of all these accumulator bores except inlet bore 90 can be varied to provide the desired primary accumulator cavity volume.

A feature of this form of the present invention is the fact that the entire accumulator cavity including the primary cavity represented by accumulator bores 90, 94, 96, 98 and 100, and annular cavity 92 are completely isolated from and independent of the injector needle spring cavity, while nevertheless being compactly arranged closely proximate the spring cavity within a lower portion of the injector, namely within accumulator body 26, and thus structurally completely separated from and independent of the upper intensifier portion of the injector. In a high pressure injector such as in the intensified injector 10, the spring cavity must be relatively large to accommodate a relatively large fast-acting needle closure spring. Separation of the accumulator cavity from the spring cavity enables the overall accumulator cavity to be much smaller than conventional accumulator cavities which include the spring cavity, for very high pressure operation of the injector 10. This feature is most useful in small injectors.

As seen in FIG. 1, annular cavity or ring passage 92 communicates through a plurality of small diameter passages 102 in nozzle body 34, preferably three or four in number, to a small kidney cavity 104 in nozzle body 34 which in turn communicates with needle cavity 106 that leads to valve seat 36. The small kidney cavity 104 and needle cavity 106 together provide a small secondary accumulator cavity from which the aforesaid small pilot charge is initially injected into the engine cylinder at the onset of the injection event prior to injection of the main fuel charge from the primary accumulator cavity defined in accumulator bores 90, 94, 96, 98 and 100, and annular cavity or ring passage 92. .Such pilot charge is preferably about 2–20 percent of the total injected fuel charge, and most preferably about 5–10 percent of the total charge.

A cylindrical needle guide passage 108 is axially defined within nozzle body 34 between its upper and surface 32 and kidney cavity 104. Injector valve needle 110 has an upper guide position 112 which axially slidably and sealingly fits within guide passage 108. The upper guide port on 112 of needle 110 is of relatively large diameter, and below it needle 110 tapers down in the region of kidney cavity 104 to a relatively small diameter lower shank portion 114 which terminates at conical needle tip 116. The sliding fit of upper needle guide portion 112 within guide passage 108 is substantially fluid-tight and is sufficiently close to valve seat 36 for repeatably accurate centering of the needle tip 116 in valve seat 36 to provide sharper fuel cutoff and better atomization proximate the end of each injection event, as well as increased component life, relative to conventional accumulator-type injectors in which the needle was either unguided or was guided at a location axially remote from the tip.

Injector needle 110 has a flat, transverse top surface 118 at the upper end of its guide portion 112, top surface 118 being located slightly above upper end surface 32 of nozzle body 34. A small locator pin 120 extends axially upwardly from the top surface 118 of the needle to locate a spring guide and needle damper member 122 coaxially relative to needle 110. The guide/damper member 122 fits over locator pin 120 and has a flat annular damping base 124 which seats against the top surface 118 of needle 110. The damping base 124 provides damping flange means for hydraulic damping of needle closure events as described below. A reduced diameter, upwardly projecting spring locator portion 126 of guide/damper 122 provides radial centering for the needle spring. It is to be noted that the top surface 118 of needle 110, and hence also the flat annular base portion 124 of guide/damper 122, is displaced above the upper end surface 32 of nozzle body 34 in the fully closed position of needle 110, which assures complete closure of the needle 110 by the needle spring.

An elongated, cylindrical spring cavity 128 extends axially upwardly from upper end surface 32 of nozzle body 34 through a major portion of the length of accumulator body 26, terminating at an upper end surface 130. The needle spring is a helical compression spring 132 which is axially arranged within spring cavity 128 with its lower end seated against the flat annular base 124 of guide/damper 122 and its upper end seated against the end surface 130 of cavity 128.

Extending axially upwardly from the upper end 130 of spring cavity 128 through the upper end surface 24 of accumulator body 26 is a plunger guide and sealing passage 134 within which the cylindrical upper sealing portion 138 of a needle plunger 136 is slidably and sealingly fitted. Needle plunger 136 has an upper end 140 which is exposed to damper cavity 70 but recessed slightly down into passage 134 below the upper body surface 24, and hence below the bottom surface of stop plate 71, in the normally seated position of plate 71. The amount of clearance between plunger end 140 and plate 71 determines the height of the small preliminary increment of needle lift for the premix pilot charge. Plunger 136 extends axially downwardly from its upper end 140 as an integral member which includes the cylindrical upper sealing portion 138 and an elongated, cylindrical lower portion 142 which extends through the spring 132 to a lower end 144 which faces and is proximate the upward projection 126 of needle guide/damper 122. Spring cavity 128 communicates through a vent passage 146 to fuel supply conduit 76 at the interface between accumulator body 26 and intensifier body 18.

Needle plunger 136 serves a series of functions in its independent capacity from needle 110 during operation of the intensified accumulator injector 10. First, during the intensification stroke of high pressure piston 52, the intensified fluid pressure in damper cavity, 70 operates through stop plate hole 74 against the upper end 140 of plunger 136 to hold plunger 136 down against guide/damper 122 so as to hold needle 110 down against needle valve seat 36 with the aid of spring 132 against the upward force of the intensified pressure in the accumulator cavity against the lower part of needle 110.

Second, the length of needle plunger 136 defines the amount of clearance between plunger end 140 and the seated stop plate 71. At the onset of the needle opening event, intensified fluid pressure acts downwardly on a larger surface of plate 71 than upwardly on plate 71 because a portion of the lower surface of plate 71 is masked by its lapped fit against upper body surface 24 and thus is subject to only fluid vapor pressure. Thus, shortly after the onset of the needle opening event, plate 71 positively stops plunger 136, and hence needle 112, at a small percentage of full needle lift, and time for injection of the pilot charge is provided until the intensified pressure above plate 71 is vented sufficiently to allow needle 112 and plunger 136 to unseat plate 71 and to move plate 71 upwardly from body surface 24.

Third, the mass of plunger 136 is added to the mass of needle 110 to damp and slow down the beginning of the needle opening event, which is an added factor in allowing time for the pilot charge in cavities 104 and 106 to be injected into the engine cylinder before it can be overtaken by the main charge from the larger primary accumulator cavity.

Fourth, with needle 110 and its plunger 136 joined as an effectively unitary structure during the opening stroke of needle 110, the upper end 140 of plunger 136 is enabled to be utilized in cooperation with plate 71 to damp the end of the needle opening event. When plate 71 is moved upwardly by plunger 136 in its damper cavity 70, displacement of fluid by plate 71 is limited by the constriction between the periphery of plate 71 and the annular wall of damper cavity 70, and by the narrowing constriction between the top of plate 71 and shoulder 73, thereby damping the upper end of the needle opening event by a hydraulic damping action which may be referred to as "squish damping". This prevents needle bounce at the end of the opening event.

Fifth, and of great importance in enabling a very rapid needle closing event to be achieved, the separation of needle plunger 136 from needle 110 enables needle 110 to be relatively short and of very low mass as compared to conventional accumulator injector needles, so that needle 110 can be accelerated very rapidly by spring 132 to achieve a very rapid needle closing event. The low mass and short length of separated needle 110 also minimize the amount of compression energy that can be stored in the needle upon impacting the seat, and correspondingly minimizes needle closing bounce. The mass of separated needle 110 may be as little as one-third or less than the mass of conventional accumulator injector needles, and the closing acceleration of the low mass, separated needle 110 is estimated to be in the range of from about 10,000–20,000 Gs.

With such a high speed needle closing event, it is desirable to damp the end of closure to assure against needle bounce, even with the short, light-weight needle, and this function is performed by guide/damper 122. As guide/damper 122 and needle 110 more downwardly during the needle closing event, fluid at rail pressure must be displaced from below guide/damper 122 through the constriction between the periphery of its flat annular base 124 or damping flange means and the wall of spring cavity 120 to above base 124. The guide/damper thus serves as a shock absorber to hydraulically damp the needle closure in a squish damping action, cushioning the end of the injection event. This is a further factor in preventing the needle from dynamically or mechanically bouncing from compression energy that might otherwise be stored along the length of the needle upon impacting the seat. This closing damper effect can be adjusted by adjusting the radial clearance between the periphery of guide/damper base 124 and the surface of spring cavity 128, or by adjusting the axial clearance between the bottom of guide/damper base 124 and upper surface 32 of nozzle body 34, or by making both adjustments.

If desired, a slight annular relief cavity (not shown) may be provided in the wall of spring cavity 128 offset above the lower end of cavity 128 so as to allow fluid to bypass the periphery of guide/damper base 124 more freely during the early part of the needle closing stroke, while still presenting the full constriction between the periphery of base 124 and the wall of spring cavity 128 during the final phase of the closure stroke. However, experiments have shown that the shock absorbing effect of the fluid constriction between the periphery of guide/damper base 124 and the unrelieved cylindrical wall of spring cavity 128 effectively eliminates secondary injections from needle bounce without detrimentally slowing down the high rate of needle closure enabled by the short, very low mass needle 110. Cooperating in such elimination of needle bounce is the very fact that the needle is short. This causes minimization of the amount of longitudinal elastic compression energy that can be stored in the needle upon impact with the seat.

Spring cavity 128, in addition to serving the functions of housing needle return spring 132 and cooperating with guide/damper 122 to damp the closure stroke of needle 110, also serves as a collector for any intensified pressure fuel which may seep between the upper sealing portion 138 of needle plunger 136 and its passage 134, or between the upper guide portion 112 of needle 110 and its guide passage 108, or from annular cavity 92 radially inwardly past the inner interface between lower accumulator body surface 30 and upper nozzle body surface 32.

2. Operation of the First Embodiment

Overall and specific systems for operating an intensifier-type accumulator injector of the general type of the present invention are illustrated and described in detail in the Beck et al. U.S. Pat. No. 4,628,881, including the aforesaid high speed solenoid actuated control valve, and such systems are fully applicable for operating the intensifier-type accumulator of the present invention. Accordingly, the Beck et al. U.S. Pat. No. 4,628,881 is hereby incorporated by reference for its disclosures of apparatus and methods for operating the intensifier-type accumulator injectors 10 of the present invention.

Operation of the present invention is best understood with reference to FIGS. 1, 4, 8 and 11–13 of the drawings. FIG. 1 illustrates injector 10 in a position of repose prior to a sequence of intensification and injection events. Inlet/vent passage 64 is vented to a sufficiently reduced pressure, which may be essentially atmospheric pressure, to enable spring 62 to bias low pressure piston 48 and high pressure piston 52 to their uppermost positions, with the lower end 56 of high pressure piston 52 above fuel inlet cross conduit 78. Fuel supply conduit 76 is constantly supplied with fuel at rail pressure, and high pressure cylinder 50 below piston 52 has been filled with fuel at rail pressure from fuel supply conduit 76 through inlet conduit 78 and fuel port 79. Injector needle 110 is closed against needle valve seat 36, and accumulator inlet check valve 88 is also closed, with the fuel pressure within the accumulator cavity static at the needle closure pressure, which is preferably relatively high for a crisp needle closing event with good fuel atomization right up to closure and minimal, if any, fuel dribble proximate closure. Typically, this static, residual pressure within the accumulator cavity will be in the range of from about 3,000 psig to about 6,000 psig, and preferably it will be in the high pressure part of this range for best fuel cutoff characteristics. Needle stop plate 71 is biased by spring 72 to its sealed position against the upper surface 24 of accumulator body 26. Needle plunger 136 may, in this rest condition of injector 10, be in any position from where its lower end 144 is in contact with guide/damper 122 to where its upper end 140 is in contact with stop plate 71.

An intensification stroke is caused by introduction of fuel at rail pressure through actuating fluid inlet passage 64 into low pressure cylinder 46 to drive low pressure piston 48 downwardly, piston 48 carrying high pressure piston 52 downwardly with it for the intensifying stroke, the extent of this stroke being determined either by the time duration of application of rail pressure through passage 64 for time metering or by the pressure of the fuel introduced through passage 64 for pressure metering. The maximum travel of this intensification stroke is to the position of high pressure piston 52 shown in FIG. 4, with the upper end of reduced portion 57 still being located above the high pressure cylinder outlet port 83 so that port 83 remains clear. During this downward intensification stroke of the pistons, fuel is pressurized and compressed within high pressure cylinder 50, and such pressurization and compression is transmitted into the entire accumulator cavity through high pressure cylinder outlet port 83, cross-conduit 82, longitudinal passage 86, check valve 88, and accumulator bore 90, the pressurized, compressed fuel passing from bore 90 into annular cavity 92 and thence into accumulator bores 94, 96, 98 and 100, and also downwardly through nozzle passages 102 into kidney cavity 104 and needle cavity 106. The quantity of fuel thus poised in the accumulator cavity for injection depends upon the amount of compression of the fuel within the accumulator cavity, which depends upon the amount of pressure provided by the intensifier stroke, and this may range from about 6,000–7,000 psig for minimum engine power at idle up to about 22,000 psig or even higher for maximum engine power.

During the intensification stroke, the increasingly high intensified pressure within high pressure cylinder 50 is applied through damper cavity 70 to the upper end surface 140 of needle plunger 136. Plunger 136 seats against guide/damper 122 and transmits the resulting force of the intensified pressure to guide/damper 122 and thence to top surface 118 of needle 110, and this force, together with the force of needle spring 132, securely hold needle 110 down on its seat 36. This downward force on needle 110 is greater than the upward force as determined by the intensified pressure within kidney cavity 104 and needle cavity 106 operating upwardly on the differential area between the cross-section of upper guide portion 112 of the needle and the area of the needle seat.

At the end of the intensification stroke, injector is ready for an injection event, which is initiated by venting the actuating fluid inlet/vent passage 64, and hence low pressure cylinder 46, to a reduced pressure. This allows piston spring 62 to move both of the pistons 48 and 52 upwardly at a rate which may be controlled by orificing of passage 64, which now serves as a vent conduit. The mode of operation of the two-stage needle lift is best understood with reference to the graph or chart in FIG. 11.

Figure 11:
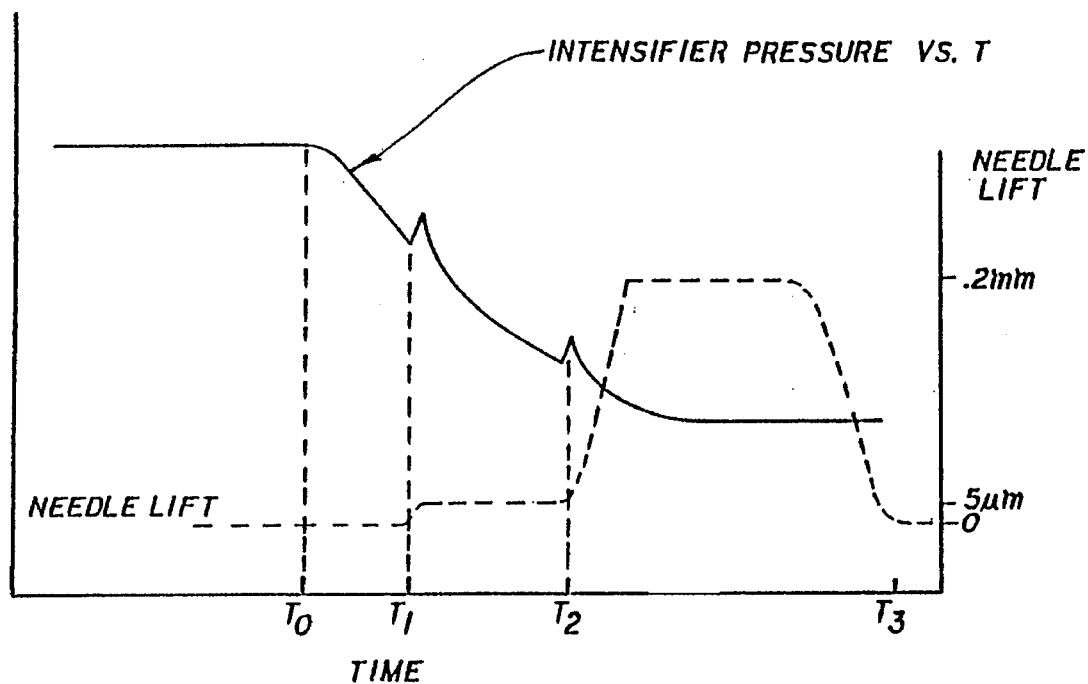
FIG. 11 is a graph or chart illustrating the two-stage needle lift of the invention.

The solid line curve 149 in FIG. 11 represents a plot of intensifier pressure (the pressure within intensifier cylinder 50) versus time. Curve 149 shows the rate of decay of pressure in intensifier cylinder 50 as it may be controlled by orificing of vent passage 64. Adjustment of the orificing of vent passage 64 will cause a corresponding adjustment of the rate of decay or slope of pressure/time curve 149. Thus, a greater constriction of the orificing in passage 64, with a reduced vent flow rate, will result in a flatter pressure/time curve 149; while a lesser constriction in passage 64, with corresponding increased vent fluid flow through passage 64, will result in a steeper slope for pressure/time curve 149.

The dotted line curve 150 represents needle position versus time, and shows how the needle lift timing relates to the intensifier pressure decay represented by curve 149.

At time $T_0$ the injection event is set into motion by commencement of venting of low pressure cylinder 46 through vent passage 64. At this time the needle is closed, or has zero lift. As the pressure decays from $T_0$ to $T_1$, the needle remains closed because $$A1(P_{int}) > P_{acc}(A_{stem} - A_{seat}) - F_s$$

where $A_{p1}$ is the cross-sectional area of upper portion 138 of plunger 136

$P_{int}$ is pressure in intensifier cylinder 50

Phd accis pressure in the accumulator cavity $A_{stem}$ is the area of the upper guide portion 112 of needle 110

$A_{seat}$ is the area of the needle valve seat $F_s$ is the force of needle spring 132.

The needle lifts initially to its prelift increment at time $T_1$ when $A_{p1}(P_{int}) = P_{acc}(A_{stem} - A_{seat}) - F_s$. This initial prelift increment is preferably in the range of from about 1–20 percent of maximum needle lift. It is shown on curve 150 as being approximately 5 micrometers, or 0.005 millimeters. This low-lift or prelift increment of the needle lift is defined when the upper end 140 of plunger 136 is stopped against the bottom surface of stop plate 71 which is seated and sealed against upper surface 24 of accumulator body 26. The upward blip of pressure/time curve 149 at $T_1$ represents a momentary pressure surge in intensifier cylinder 50 caused by the upward shift of plunger 136. Between $T_1$ and $T_2$, stop plate 71 remains seated against body surface 24 to hold the needle at the fixed prelift increment because $$A_{p2}(P_{int}) + F_{s1} > P_{acc}(A_{stem} - A_{seat}) - F_s$$

where $A_{p2}$ is the cross-sectional area of stop plate 71 which is sealed against upper body surface 24 $F_{s1}$ is the force of plate spring 72.

The needle lifts completely starting at time $T_2$ when $$A_{p2}(P_{int}) + F_{s1} = P_{acc}(A_{stem} - A_{seat}) - F_s$$

In the example of FIG. 11, full needle lift is approximately 0.2 millimeters. At time $T_2$, stop plate 71 becomes unseated from upper body surface 24 so that the seal between the plate 71 and the shoulder of surface 24 is broken and the vapor pressure acting on the bottom 71' of the plate 71 increases to the ambient pressure in cavity 70. Plate 71 then shifts upwardly to become seated on stop shoulder 73. The pressure blip proximate T2 is caused by a transitory pressure surge in intensifier cylinder 50 when plunger 136 and stop plate 71 shift upwardly.

The volume of the pilot charge will vary generally proportionally to both the time duration between $T_1$ and $T_2$ and the height of the needle prelift increment, both indicated by the dotted line curve 150. It is preferably about 2–20 percent of the total fuel charge, and most preferably about 5–10 percent of the total charge.

Figure 12:
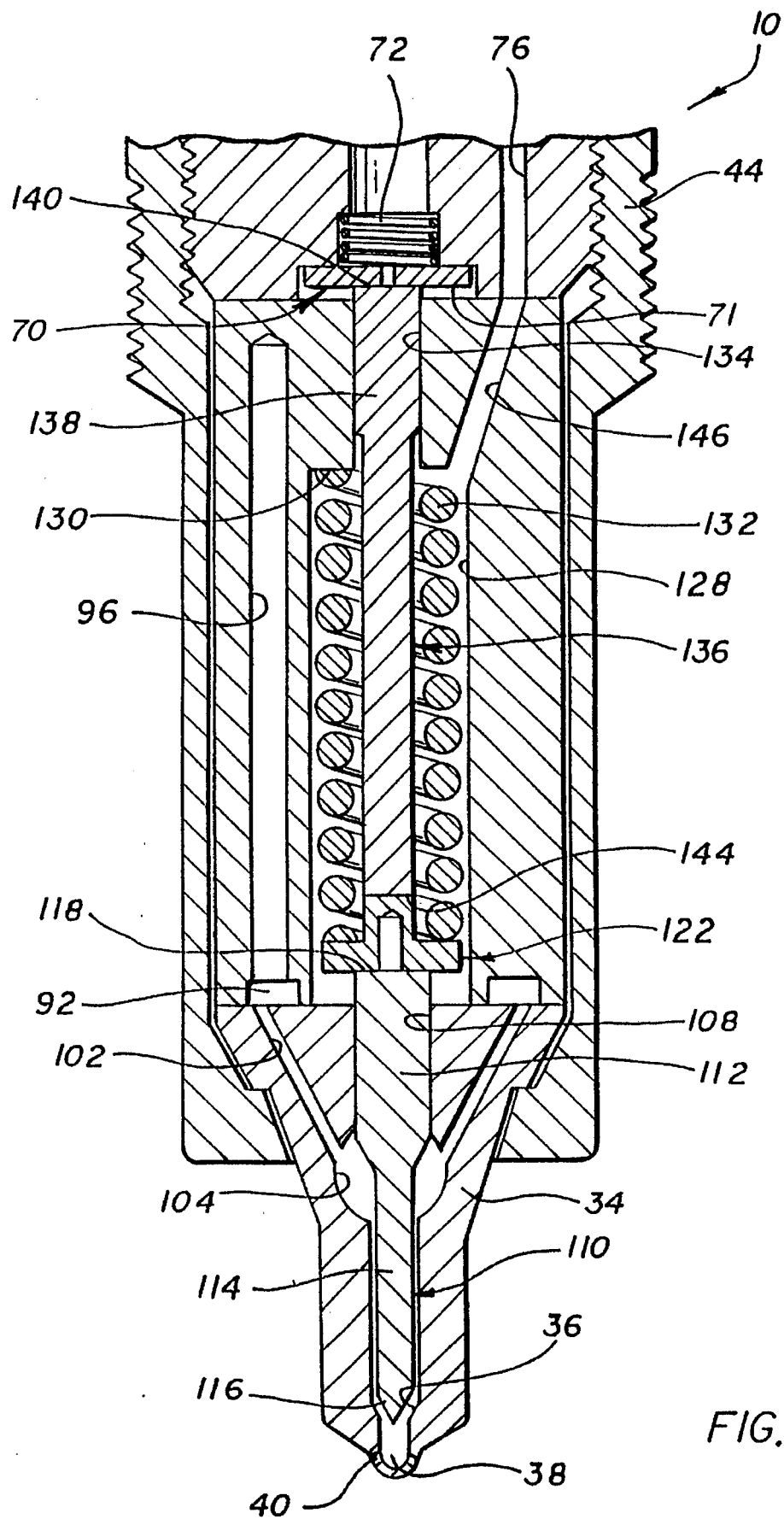
FIG. 12 shows a lower portion of FIG. 1, but with the needle in its fully lifted position.

In FIG. 12, needle 110 is shown in its fully open position, with needle 110, guide/damper 122, plunger 136 and stop plate 71 all closed together in a solid column, and stop plate 71 seated against shoulder 73.

The two phases of needle opening movement proximate $T_1$ and $T_2$ are slowed down and controlled by addition of the mass of plunger 136 to the mass of needle 110. The very short distance needle 110 and plunger 136 travel during the prelift phase does not allow enough momentum to build up in the needle/plunger combination to jar plate 71 off of its seated, sealed position. Then, when needle 110, plunger 136 and plate 71 move on upwardly in the second opening phase for the main injection, plate 71 damps the end of the opening event by hydraulic squish damping. This is caused both by the closely constricted peripheral zone between the outer annular surface of plate 71 which restricts fluid flow from above to below plate 71, and by the narrowing gap as the upper surface of plate 71 approaches its mating shoulder 73. The result is substantial elimination of needle bounce at the end of the opening event, with better spray uniformity at the beginning of the main part of the injection.

The needle remains open during the second phase or main part of the injection event as long as $$P_{acc}(A_{stem} - A_{seat}) > F_s$$

The needle closing event commences when $$P_{acc}(A_{stem} - A_{seat}) = F_s$$

Needle closure then occurs rapidly until complete closure occurs at time T3. Separation of needle 110 from plunger 136 during needle closure greatly reduces the effective mass and hence the inertia of the needle so that needle 110 can be accelerated very rapidly by spring 132 to achieve a rapid, crisp closing event; while at the same time, the low mass and short length of the separated needle 110 minimize needle bounce by minimizing the amount of compression energy that can be stored in the needle upon closing impact with the seat.

As discussed above, the inventive injection system could also be used as a more conventional single-stage injector simply by turning the rate plate 71 over during assembly such that the rough surface 71" of the plate is nonsealingly seated on the body 24 so that essentially no net fluid pressure is ever applied to the rate plate. The needle thus opens, lifts, and remains open so long as $$P_{acc}(A_{stem} - A_{seat}) > F_s$$

The inventive system thus provides considerable latitude to a manufacturer interested in producing both single-stage and two-stage injection systems.

Figure 13:
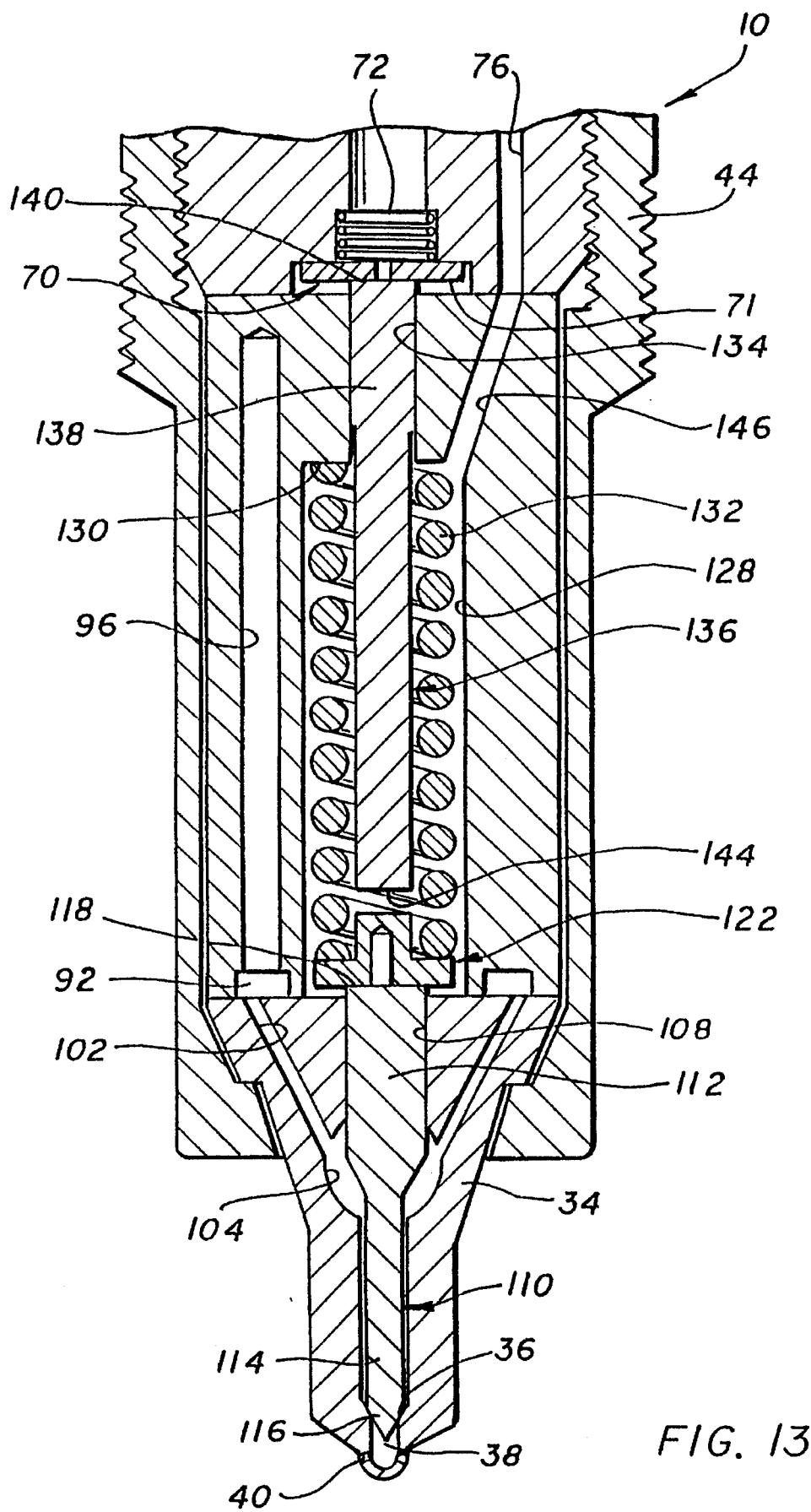
FIG. 13 is a view similar to FIG. 12, illustrating closure of the needle separated from the needle plunger.

FIG. 13 illustrates the separation of needle 110 and its guide/damper 122 from needle plunger 136 during the closing event. Since needle 110 and guide/damper 122 are completely separate parts from needle plunger 136, they are enabled to be driven entirely independently of plunger 136 from the open position of FIG. 12 through the closing event to the closed position of FIG. 13.

Needle bounce is also minimized by the squish damping effect resulting from the small clearance between the flanged periphery of guide/damper 124 and the cylindrical surface of spring cavity 128, and also by the limited clearance between the bottom of guide/damper 124 and the upper surface 32 of nozzle body 34. The very light-weight, short needle 110 cooperates in such squish damping by minimizing the amount of needle inertia which must be controlled by the damping. With these factors cooperating, needle bounce is substantially eliminated in the present invention. With relatively high closing accumulator pressure, the rapid, crisp closing event, coupled with the substantial elimination of closing needle bounce, enable full fuel atomization to be maintained right up to needle closure, for optimum ignition. The sharp closure cutoff and elimination of fuel dribble at closure are important in the elimination of smoke and hydrocarbon emissions.

It is to be noted that the needle closure damper, represented by the guide/damper and its small clearances relative to the surface of spring cavity 128 and surface 32 of nozzle body 34, is remote from needle tip 116 and valve seat 36. This permits efficient shaping of the needle tip and valve seat for a high flow coefficient as the needle approaches the seat during closure. Such high flow coefficient enables high pressure to be maintained proximate the seat for good atomization up to closure.

Another factor which assures sharp fuel cutoff at needle closure is the close proximity of needle guide portion 112 in guide passage 108 to the needle seat 36. By this means, the needle is continuously guided for consistent concentric seat contact. This is a factor in making the end of the injection event stronger than for conventional accumulator injector needles, with resulting better atomization at the end of injection. Consistent concentric closure contract of the needle in the seat assures a high flow coefficient and consequent high closing pressure and good atomization.

Referring again to FIG. 11, although the invention is not limited to any particular time intervals, typically the time from $T_0$ to $T_1$ will be on the order of about 0.1–0.3 milliseconds, and the time from $T_2$ to $T_3$ will be on the order of about 4–8 milliseconds. By way of comparison, with a conventional accumulator-type injector, the needle will be fully opened in on the order of about 0.2 milliseconds.

As an alternative to, or in addition to, controlling the rate of decay of the intensifier pressure as represented by curve 149 in FIG. 11 by means of orificing of vent passage 64 to slow down the vent rate from low pressure cylinder 46, the vent rate from low pressure cylinder 46 can also be controlled by adjusting the pressure level in the vent line. Thus, by raising the vent pressure in passage 64, the differential pressure between low pressure cylinder 46 and vent passage 64 will be lowered, correspondingly lowering the rate of fluid venting from low pressure cylinder 46, and accordingly flattening the intensifier pressure/time curve 149 in FIG. 11. Conversely, lowering of the vent pressure level in vent passage 64 will increase the pressure differential between low pressure cylinder 46 and vent passage 64, steepening the intensifier pressure/time curve 149 in FIG. 11. Such adjustments will, therefore, vary the time intervals between TO and T1 and between T1 and T2.

The two-stage opening of the needle in the present invention to provide a small initial pilot charge followed by the main charge has important benefits. The small amount of fuel in the pilot charge will ignite before the needle opens fully, so that the fire has started when the main charge is injected. This causes the main charge to ignite immediately upon injection, without the usual larger percentage of the main charge being injected before it ignites. This provides a great reduction in noise, improvement of fuel economy, and elimination of smoke. It also greatly reduces undesirable exhaust emissions, principally oxides of nitrogen and hydrocarbon emissions.

In the foregoing description of the intensified form of the invention, full needle lift has been indicated as being determined by engagement of stop plate 71 against stop shoulder 73. This will always be true for high power engine settings. However, the amount of needle lift off of its seat will actually vary generally in proportion to the difference between the opening and closing pressures of the accumulator as discussed in detail hereinafter in connection with the unintensified form of the invention shown in FIGS. 14–17. Accordingly, it is to be understood that for low and intermediate engine power settings, typically the needle will not lift off of the seat during the second, main phase of the injection sufficiently for stop plate 71 to fully seat against shoulder 73.

3. Variations of First Embodiment

FIG. 9 illustrates a modified stop plate 71 a which defines the prelift increment by the depth of a downwardly facing annular, axial recess 147 in plate 71a. Here, in the lowermost position of plunger 136a which is shown, its top surface 140a registers with the upper surface 24 of accumulator body 26. This modification enables stop plate 71a to be thicker than stop plate 71 of FIGS. 1, 4 and 8, thereby minimizing the possibility of flexure of plate 71a when it is impacted by plunger 136a, so as to assure maintenance of the seal between the bottom surface of plate 71a and the upper body surface 24. Damper cavity 70a in intensifier body 18a is made correspondingly deeper to accommodate the thicker plate 71a. An important advantage of the FIG. 9 form is that axial dimensioning of the intensifier and accumulator bodies and of the needle/plunger combination is not critical, and correct dimensioning for proper operation of the stop/rate plate can be simply achieved by selecting a stop/rate plate 71a having a recess 147 of any desired axial depth. This simplifies manufacture, minimizing surface machining tolerances.

FIG. 10 illustrates a further modified stop plate arrangement which would eliminate any possibility of the prelift seal between the stop plate and the body being disrupted by the impact of the plunger against the plate. In this case, two annular seals are employed in place of the flat seal of each of the stop plates 71 and 71a against the respective bodies. In the form of FIG. 10, plate 71b is made still thicker to accommodate a deeper annular, axial recess 147b in the bottom of plate 71b, and the upper end of plunger 136b extends up into recess 147b in the lowermost position of plunger 136b which is shown. The prelift increment of movement is defined by the spacing between upper end surface 140b of plunger 136b and the end of plate recess 147b. A first lapped seal is provided between the cylindrical outer periphery of plate 71b and the cylindrical surface of damper cavity 70b, and a second lapped seal is provided between the cylindrical surface of plunger 136b and the opposed cylindrical surface of plate recess 147b. These two annular seals serve the same sealing function as the single flat seal in the other two forms, but they cannot be disrupted by impacting of plunger 136b against plate 71b. Damper cavity 70b is given still further depth to accommodate the thicker stop plate 71b.

In the embodiment of FIG. 10, hydraulic damping of full-lift needle opening events is caused by the constriction between the top surface of plate 71b and shoulder 73b as plate 71b approaches shoulder 73b.

Figure 14:
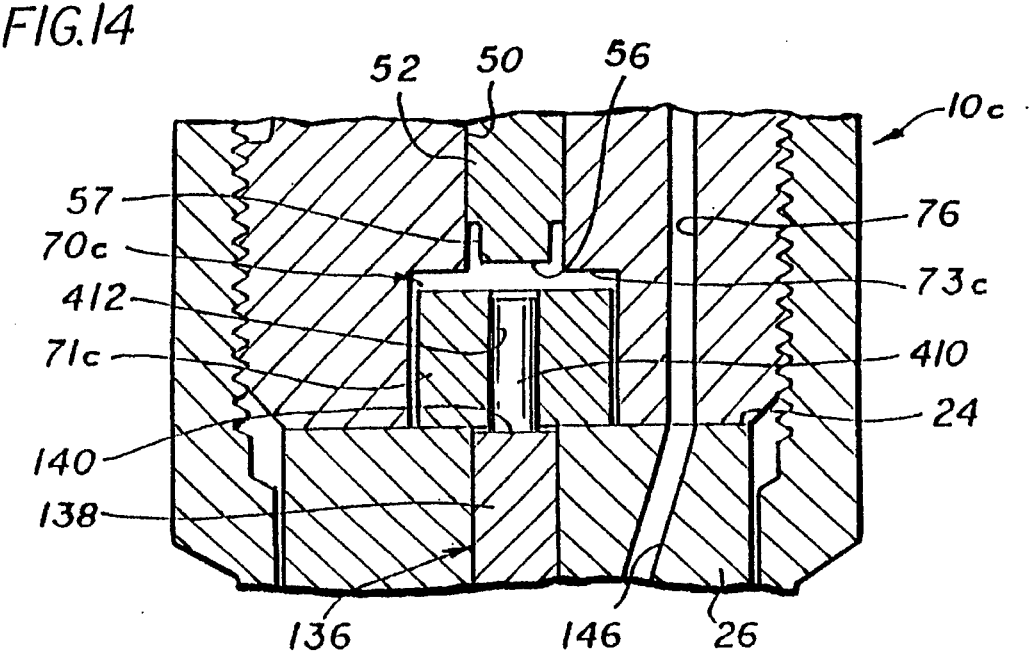
FIG. 14 is a view similar to FIGS. 9 and 10, in which the damping plate or member has an axial passage with a slidable pin therein.

FIG. 14 illustrates a further modified intensified form of the invention generally designated 10c which utilizes a needle stop and damping plate or member to accomplish the two-stage needle lift in a manner similar to the forms of the invention shown in FIGS. 8, 9 and 10. However, in the form shown in FIG. 14, stop plate member 71c has a lap-fitted pin 410 axially slidable with a fluid-tight seal in an axial bore 412 through stop member 71c. As with the stop plates in the forms shown in FIGS. 8, 9 and 10, stop member 71c has its bottom surface sealingly lap-fitted to a shoulder formed by the top surface 24 of accumulator body 26. With his construction, intensified pressure from damper cavity 70c is not directly transmitted through a hole in the stop plate or member as in the other forms, and the needle hold-down force prior to the injection event is provided by intensified fluid pressure against the top of pin 410. This arrangement minimizes the possibility of intensified pressurized fluid getting underneath stop member 71c during the first, prelift stage of needle movement to assure against premature ending of the first stage needle lift event.

As with the form of the invention shown in FIG. 8, the upper end 140 of needle plunger 136 is offset below the upper surface 24 of accumulator body 26 in the closed position of the needle. The amount of this offset clearance determines the extent of the small initial needle lift to provide the pilot charge.

When high pressure intensifier piston 52 starts to retract at the beginning of an injection event, lowered fluid pressure within damper cavity 70c enables the upward force of accumulator fluid pressure on the needle to overcome the downward forces of the needle spring and fluid pressure on pin 410 to allow the prelift increment of needle movement to occur. Such first-stage needle movement is stopped by abutment of the upper end 140 of needle plunger 136 against the bottom surface of stop member or plate 71c. At this time, the downward force of fluid pressure in damper cavity 70c against stop member 71c and its pin 410 plus the downward force of the needle spring are still greater than the upward force of accumulator fluid pressure on the needle, to effect the positive stop of needle plunger 136 against seated stop member 71c. As intensifier piston 52 further retracts upwardly to further reduce the fluid pressure in damper cavity 70c, the upward force of accumulator fluid pressure against the needle will, in sequence, overcome the downward forces of fluid pressure against stop member 71c and its pin 410 and of the needle spring, to enable needle plunger 136 to unseat stop member 71c and allow the needle to move to its fully opened position which is defined by engagement of the upper surface of stop member 71c against stop shoulder 73c at the top of damper cavity 70c.

B. Second Embodiment

Figure 15:
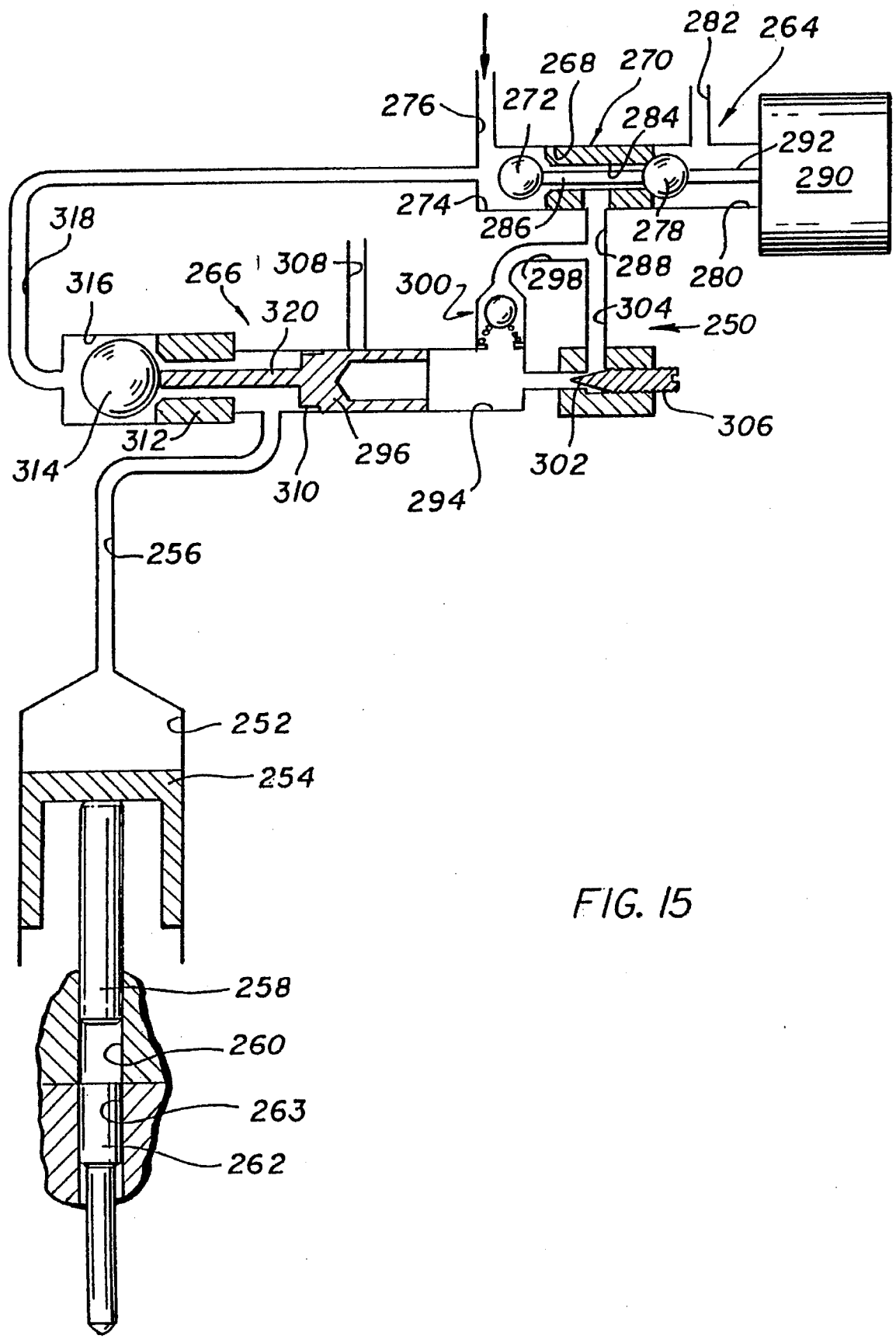
FIG. 15 is a diagrammatic illustration of a hydraulic circuit-controlled two-stage needle lift system, shown with its solenoid valve energized and control piston fully extended preparatory to the commencement of an injection event.
Figure 16:
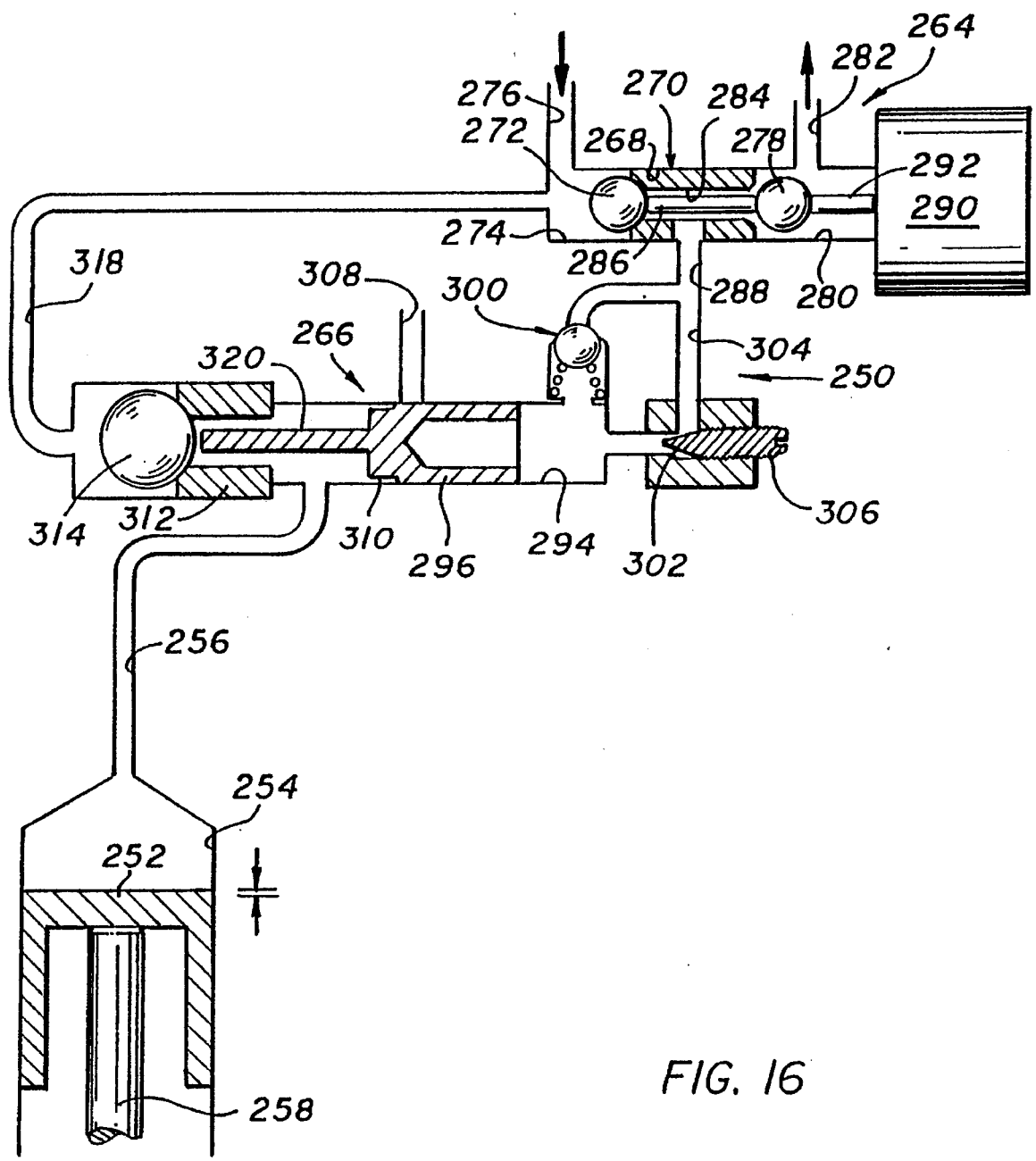
FIG. 16 is a view similar to FIG. 15, but with the solenoid valve de-energized to commence the injection event, and with the control piston partially retracted in a first stage needle prelift position.
Figure 17:
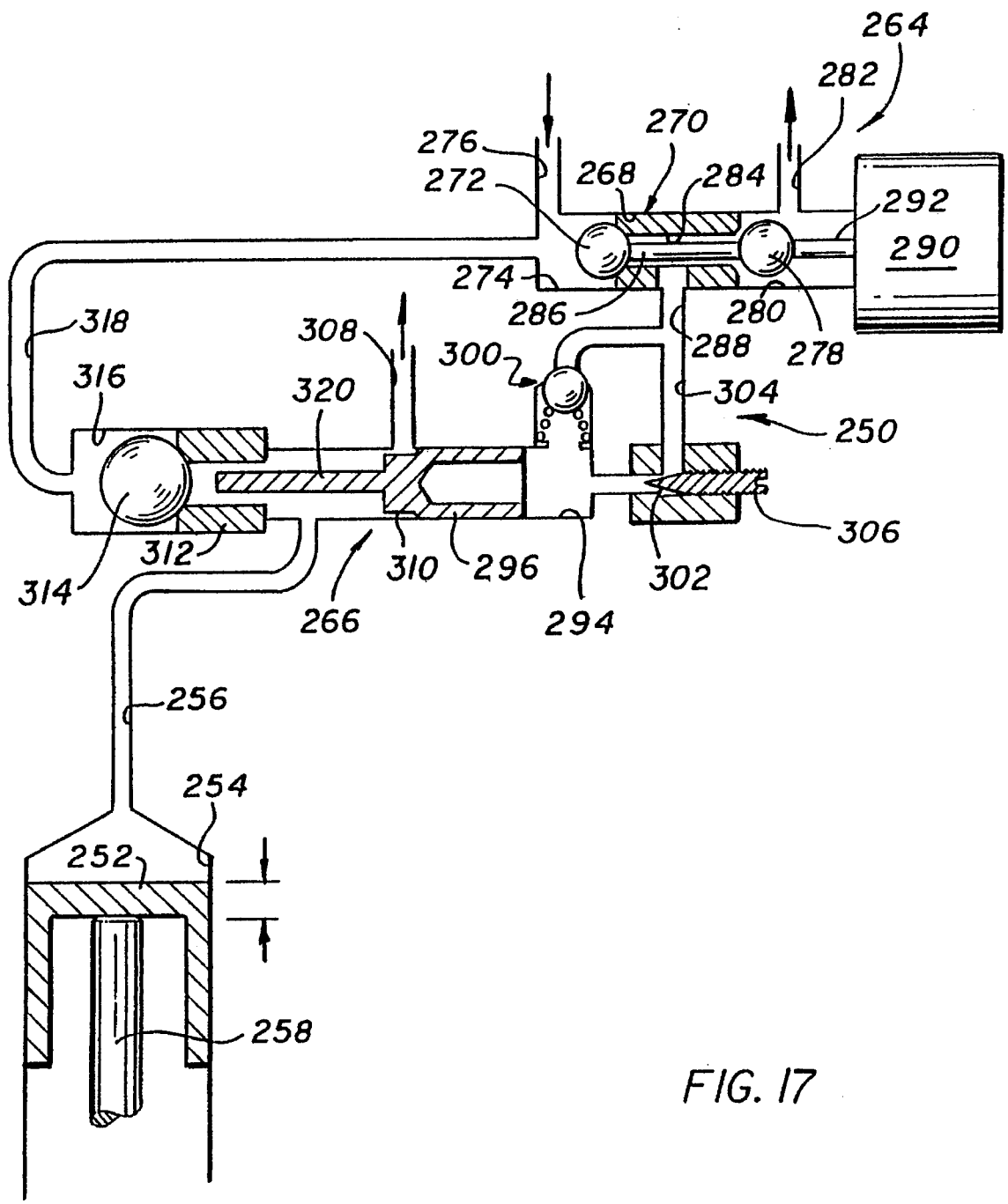
FIG. 17 is a view similar to FIGS. 15 and 16 with the control piston fully retracted in a second stage full needle lift position.

FIGS. 15, 16 and 17 diagrammatically illustrate another two-stage needle lift control system, generally designated 250 which is shown applied to an intensified accumulator injector. The needle lift control system 250 is in the form of a hydraulic circuit which produces two-stage venting from low pressure cylinder 252 above low pressure intensifier piston 254 through inlet/vent passage 256. This, in turn, produces a two-state upward movement of high pressure intensifier piston 258 and consequent two-stage pressure relief in high pressure intensifier cylinder 260 causing a first, low-lift increment of movement of injector needle 262, and then in sequence the full lift movement of needle 262. Needle 262 is illustrated diagrammatically in FIG. 15 as a unitary needle structure axially slidable in guide bore 263. It is to be understood, however, that a divided needle may be employed as in the form of the invention illustrated in FIGS. 1–14. The intensified form of the invention employed in conjunction with the two-stage hydraulic lift control system 250 of FIGS. 15, 16 and 17 may be structurally and functionally like the intensified injector system of FIGS. 1–14, although it does not employ a needle stop and damping wafer like plate 71 to produce the two-stage needle lift control.

1. Construction of Second Embodiment

FIG. 15 illustrates the needle lift control system 250 in an actuated condition for producing the intensification stroke, with rail pressure applied through inlet/vent passage 256 to low pressure cylinder 252, with both low pressure piston 254 and high pressure piston 258 at their lowermost positions and needle 262 closed. FIG. 16 illustrates the hydraulic circuit 250 in an unactuated, preliminary slow vent condition in which fluid pressure is slowly vented out of low pressure cylinder 254 through inlet/vent passage 256, with respective low and high pressure pistons 252 and 258 slightly raised to partially relieve pressure in high pressure cylinder 260 and thereby allow a preliminary low-lift increment of needle movement. FIG. 17 illustrates the hydraulic circuit 250 in an unactuated full vent condition in which fluid pressure is fully vented from low pressure cylinder 254 through inlet/vent passage 256, allowing full upward movement of the respective low and high pressure pistons 252 and 258, reducing the fluid pressure in high pressure intensification cylinder 260 sufficiently for full needle lift.

Referring to FIG. 15, the needle control system 250 has as its primary basis a tandem valve arrangement consisting of a high speed sole old valve generally designated 264 and a control valve generally designated 266 which is actuated ill response to actuation of solenoid valve 264. Solenoid valve 264 has a valve chamber 268 inside the body of the valve, with a valve seat cartridge 270 in chamber 268. A supply ball poppet 272 is located, in supply chamber 274 defined in one end of the valve chamber 268, supply chamber 274 receiving fuel at rail pressure through a supply passage 276. A vent ball poppet 278 is located in vent chamber 280 defined in the other end of valve chamber 268, and is in communication with a vent passage 282 which communicates to a vent pressure which may be somewhat above atmospheric pressure, as for example about 30 psig, or may if desired be atmospheric pressure.

Valve seat cartridge 270 has an axial passage 284 therethrough which communicates with the seats for both balls 272 and 278. A ball separator pin 286 extends through passage 284 and holds balls 272 and 278 spaced apart greater than the spacing between the two valve seats, so that when either ball is seated it causes the other ball to become unseated. A control conduit 288 communicates with the cartridge passage 284, and hence with both of the valve seats. Solenoid 290 is axially aligned with balls 272 and 278 and the ball seats, and has an armature pin 292 which, in the energized condition of solenoid 290 illustrated in FIG. 15, closes vent ball 278 against its seat, which causes supply ball 272 to be unseated. In the de-energized condition of solenoid 290 as illustrated in both of FIGS. 16 and 17, vent ball 278 is released, enabling rail pressure fuel in supply chamber 274 to close supply ball 272 against its seat, which in turn causes vent ball 278 to be lifted off of its seat.

Control valve 266 has a cylinder 294 in its valve body, with a control piston 296 slidable in cylinder 294. A fuel supply conduit 298 communicates from solenoid valve control conduit 288 through a check valve 300 to cylinder 294 at the rear of piston 296. A variable bleed orifice 302 provides outlet communication from cylinder 294 behind piston 296 through an increment vent conduit 304 to the solenoid valve control conduit 288. Bleed orifice 302 may have manual adjustment means such as an adjustment needle 306 for adjusting the rate of bleed through orifice 302, or may have automatic adjustment means controlled according to the condition of engine operation. Bleed orifice 302 is adapted to allow pressurized liquid to slowly bleed from cylinder 294 behind piston 296 so as to allow slow retraction of piston 296.

A primary vent conduit 308 communicates with cylinder 294 but is completely blocked by piston 296 in the fully advanced, actuated position of piston 296 as seen in FIG. 15. Piston 296 has an annular relief or reduction 310 proximate the head of the piston, which is offset from the primary vent conduit 308 in the fully advanced position of piston 296 as shown in FIG. 15, but which shifts into registry with vent conduit 308 when piston 296 shifts to a retracted position as shown in FIG. 17. Piston head relief 310 may, if desired, be in the form of an annular array of axially directed bleed grooves. Inlet/vent passage 256 for low pressure intensifier cylinder 254 communicates with cylinder 294 forward of the head of piston 296 in all positions of piston 296, and is placed in fluid communication with primary vent conduit 308 when piston 296 retracts to a full vent position like that illustrated in FIG. 17.

A poppet valve is carried in the body of control valve 266 in axial alignment with cylinder 294 and piston 296, spaced forward of the head of piston 296. This poppet valve includes an annular valve seat member 312 and a ball poppet 314 carried in a high pressure ball chamber 316. Chamber 316 is provided with liquid fuel at rail pressure from supply passage 276 through a supply conduit 318. Ball 314 is normally held in a closed, seated position as shown in FIGS. 16 and 17 by rail pressure of fuel in ball chamber 316. A ball actuator pin 320 extending from the head of piston 296 is adapted to unseat ball 314 in the fully actuated, advanced position of piston 296 as shown in FIG. 15 to supply fuel at rail pressure through seat member 312, cylinder 294 and inlet/vent passage 256 to low pressure intensifier cylinder 252 to provide the intensification stroke.

2. Operation of the Second Embodiment

In operation, the two-stage needle lift control system 250 of FIGS. 15–17 first produces an intensification stroke during which the accumulator is charged with fuel under intensified pressure, and the high fluid pressure in the high pressure intensification cylinder holds the needle down. Then, at the engine-programmed time for injection, the prelift or low-lift needle movement is caused to occur for injection of a pilot charge, and then in sequence full needle lift is effected for the main fuel charge.

This operational sequence of the control system 250 starts with the system in its fully relaxed condition illustrated in FIG. 17. In the condition of FIG. 17, solenoid 290 is unenergized, its armature pin 292 retracted to the right, supply ball 272 seated under the influence of fuel at rail pressure, and vent ball 278 unseated. Fuel pressure has been vented from cylinder 294 of control valve 266 through bleed orifice 302, increment vent conduit 304, control conduit 288, axial passage 284 of seat cartridge 270, and out past vent ball 278, its vent chamber 280 and vent passage 282. Such venting has caused control valve piston 296 to shift to the right to its full vent position in which pressurized fluid has been vented from low pressure intensifier cylinder 254 through inlet/vent passage 256, cylinder 296 and primary vent conduit 308, thus causing respective low and high pressure intensifier pistons 252 and 258 to be in their fully retracted or full lift positions, with injector needle 262 closed. Ball 314 of control valve 266 is seated, blocking rail pressure fuel from entering low pressure intensifier cylinder 254.

Energization of solenoid 290 shifts the control system 250 to its condition illustrated in FIG. 15. When solenoid 290 is energized, its armature pin 292 is extended, to the left as illustrated, seating vent ball 278 and unseating supply ball 272. Fuel at rail pressure passes into the system from supply passage 276 through supply ball chamber 274, past supply ball 272 through axial passage 284 of cartridge 270, and thence through control conduit 288, supply conduit 298 and past open check valve 300 into control valve cylinder 294, moving piston 296 to its fully advanced position, to the left as viewed. In this position, piston 296 closes off primary vent conduit 308 and unseats ball 314, allowing rail pressure fuel to pass from supply passage 276 through conduit 318, ball chamber 316, ball seat member 312, cylinder 294, and inlet/vent passage 256 into low pressure intensifier cylinder 252, producing the downward intensification stroke of intensifier pistons 254 and 258 and thereby charging the accumulator. The control system 250 has thus prepared the injector for an injection event, and as long as solenoid 290 is energized, the system will remain ready to effect the two-stage needle lift sequence.

The two-stage injection event is initiated by de-energization of solenoid 290, which instantaneously shifts solenoid valve 264 to its condition illustrated in FIG. 16, with supply ball 272 seated and vent ball 278 unseated. Check valve 300 is now seated, and the only escape path for fuel from control valve cylinder 294 behind piston 296 is through bleed orifice 302. At the instant solenoid 290 is de-energized, full rail pressure is present in cylinder 294 in front of piston 296, such pressure biasing piston 296 in the direction of retraction, to the right as viewed. Piston 296 now retracts to the right at a rate controlled by the variable bleed orifice 302, first allowing ball 314 to seat, and then enlarging the volume in cylinder 294 on the head side of piston 296, which reduces the fluid pressure in low pressure intensifier cylinder 254 and allows incremental upward movement of intensifier pistons 252 and 258, reducing the intensified pressure above the needle and causing the low-lift or prelift increment of needle lift for the pilot charge to be injected.

Figure 20:
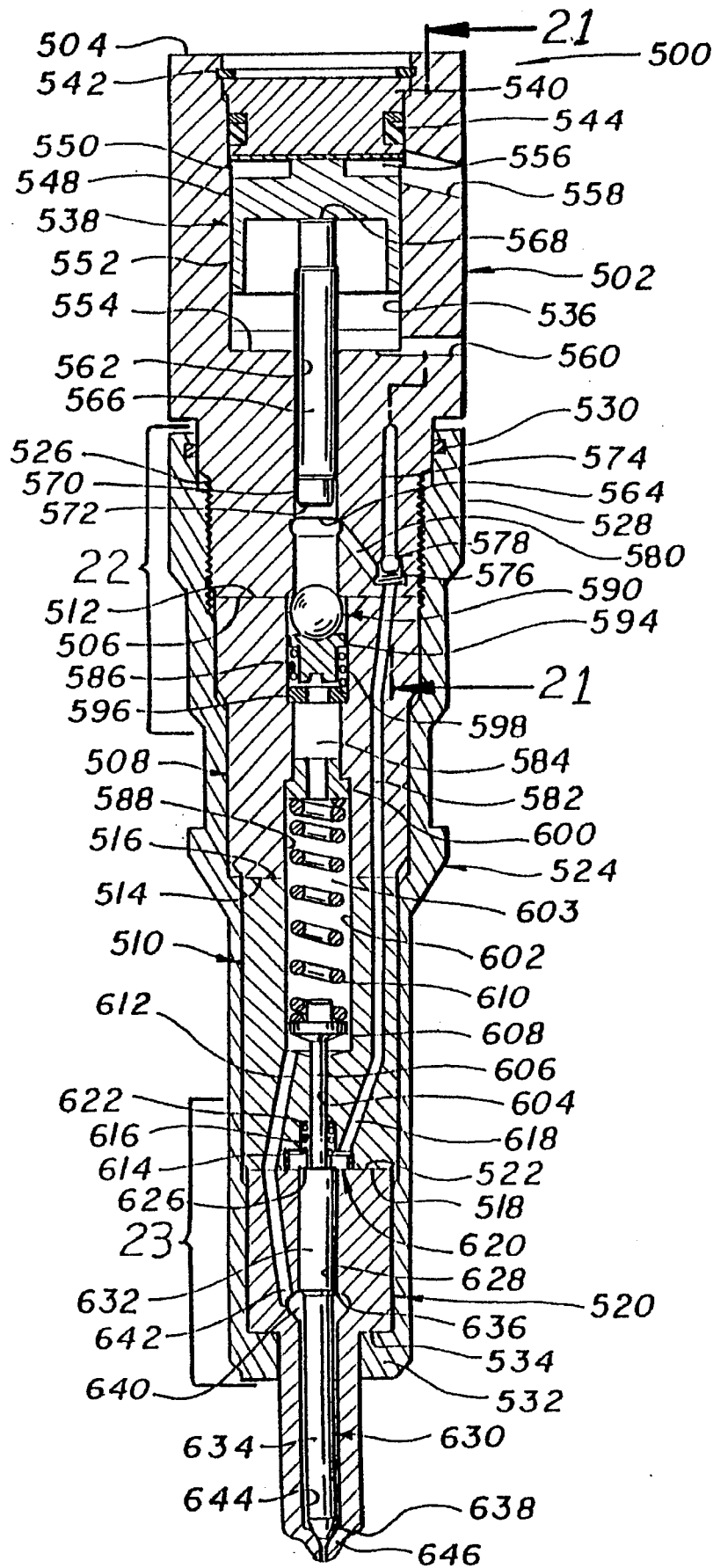
FIG. 20 is an enlarged longitudinal, axial sectional view of a presently preferred form of the present invention having an undivided short needle, with the stop/rate plate located immediately above the top of the needle and the accumulator cavity located generally coaxially above the stop/rate plate.
Figure 21:
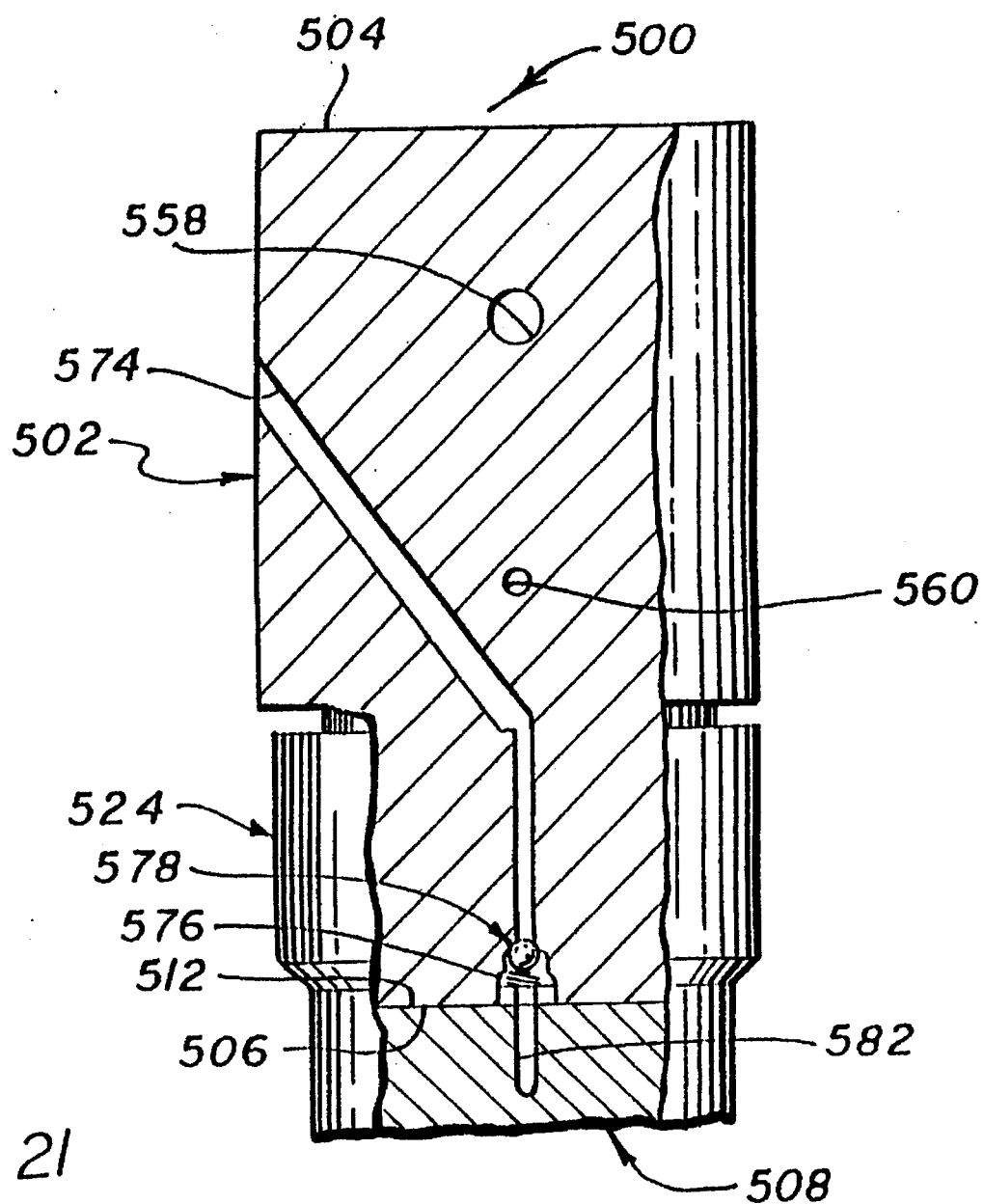
FIG. 21 is a further enlarged, fragmentary longitudinal section taken on the line 21—21 of FIG. 20.

FIG. 16 illustrates the control system 250 in this low-lift or prelift condition, the space between the vertical arrows to the left of FIG. 16 illustrating the low-lift increment of movement of the intensifier pistons. The low-lift condition remains in effect as long as piston 296 blanks off primary vent conduit 308 as seen in FIG. 16, the timer interval of the low-lift condition being determined by the rate at which fuel bleeds from behind piston 296 through variable bleed orifice 302. The main injection event commences when the reduced head portion 310 of piston 296 comes into registry with primary vent conduit 308 as piston 296 retracts from its position shown in FIG. 16 to its position shown in FIG. 17. The space between the vertical arrows to the left of the diagram of FIG. 20 illustrates the full lift increment of movement of the intensifier pistons.

While the two-stage needle lift hydraulic control system 250 of FIGS. 15–17 has been shown and described above applied to an intensified type accumulator injector, it is to be understood that it is equally applicable to an unintensified type accumulator such as is disclosed in co-pending application Ser. No. 930,981. Applying the system 250 of FIGS. 15–17 to an unintensified accumulator injector, the inlet/vent passage for the actuating fluid would be connected to inlet/vent passage of unintensified injector. Then the hydraulic system 250 will apply the two-stage venting directly to spring cavity 218 and hence directly to the top of needle 204 so as to produce the two-stage needle lift.

C. Third Embodiment

Figure 18:
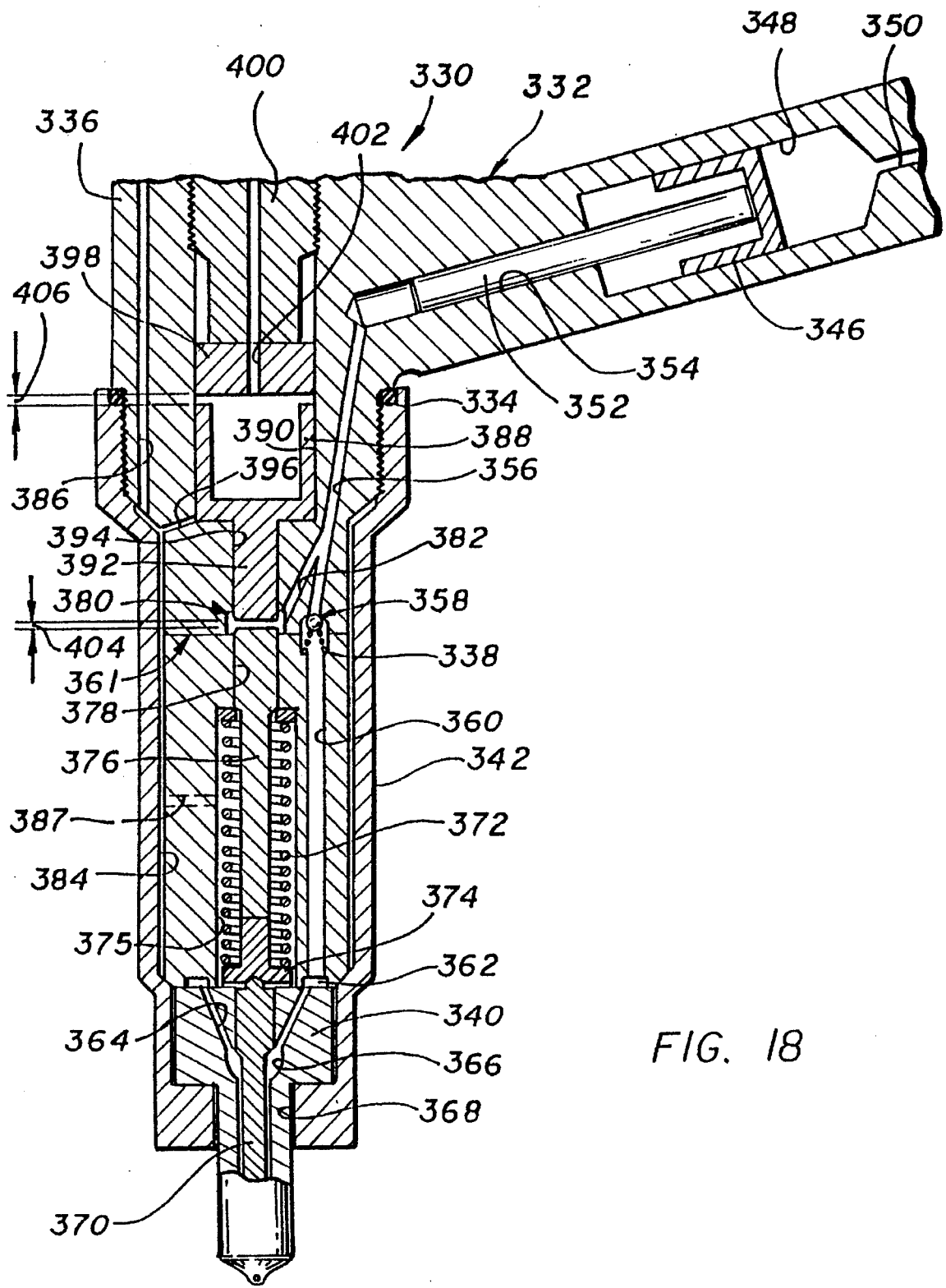
FIG. 18 is an axial, vertical section of an intensified injector embodying a positive stop piston for defining the needle prelift increment.
Figure 19:
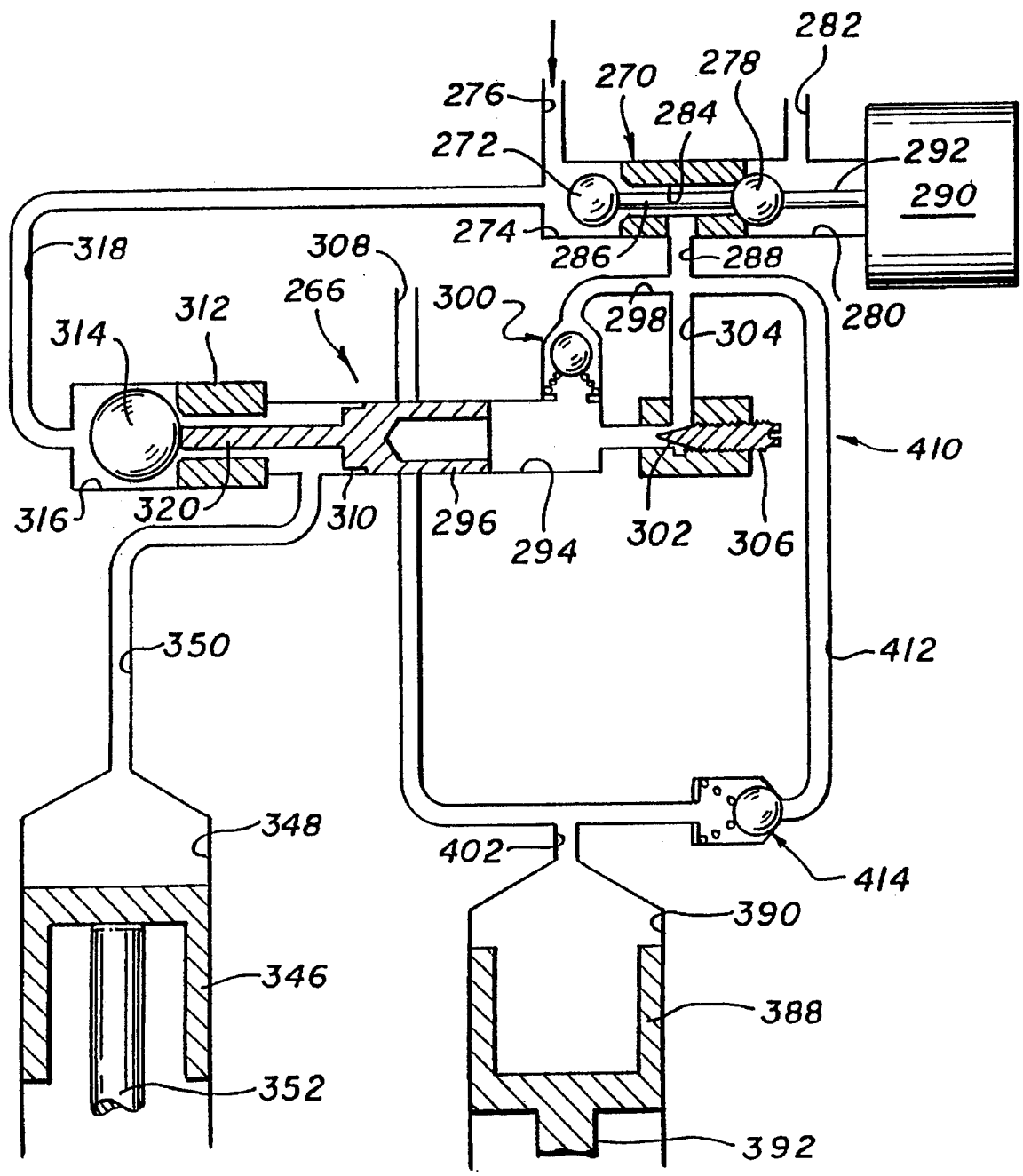
FIG. 19 is a diagrammatic illustration of a hydraulic circuit similar to that of FIGS. 15–17 but modified to control the positive stop piston in the injection of FIG. 18.

Another form of two-stage needle lift control system is shown in FIGS. 18 and 19, which has a hydraulic control circuit that is very similar to the hydraulic circuit of the form shown in FIGS. 15–17, but which incorporates a positive stop to accurately define the first increment of needle lift. The system of FIGS. 18 and 19 is also shown applied to an intensified form of accumulator injector. The control system of FIGS. 18 and 19 embodies a stop piston in axial alignment with the needle and its plunger, and has the intensifier offset to the side. This structural arrangement of the injector is illustrated in FIG. 18, which will first be described, while the implementing hydraulic circuit is diagrammatically illustrated in FIG. 19.

1. Construction of Third Embodiment

Referring to FIG. 18, the injector is generally designated 330, and has an upper body 332 with an intensifier portion 334 off to one side, and a stop piston portion 336 generally axially aligned with the injector needle. Axially aligned with and below stop piston body portion 336 is accumulator body 338, with a lapped seal therebetween. Nozzle body 340 defines the lower end portion of injector 330, and has a lapped seal fit against the lower end of accumulator body 338. The three bodies 332, 338 and 340 are clamped together by injector housing 342, with accumulator body 338 and nozzle body 340 seated within housing 342, and the stop piston portion 336 of upper body 332 threadedly coupled in the upper end of housing 342. An O-ring seal 344 is engaged between the top of housing 342 and upper body 332.

The intensifier portion 334 of injector 330 is only diagrammatically illustrated, and it is to be understood that it has components similar to those of the intensifier portion of injector 10 illustrated in FIGS. 1–14, and functions in essentially the same way. The intensifier portion of injector 330 includes low pressure intensifier piston 346 slidable in low pressure cylinder 348, with inlet/vent passage 350 in communication with low pressure cylinder 348. High pressure intensifier piston 352 is slidable in high pressure cylinder 354.

An intensified pressure conduit 356 leads from the inner, lower end of high pressure cylinder 354 downwardly though stop piston body portion 336 to a check valve 358 which serves as the inlet to the primary accumulator cavity. Thus, intensified pressure conduit 356 delivers high pressure fuel through check valve 358 into a longitudinally arranged accumulator bore 360 in the same manner that intensified pressurized fuel in the first form of the invention is delivered through check valve 88 into accumulator bore 90 as seen in FIG. 4.

Below the interface 361 between the bottom of stop piston body portion 336 and the top of accumulator body 338, the structure and operation of injector 330 of FIG. 18 are essentially the same as they are in injector 10 of FIGS. 1–14 below the top surface 24 of its accumulator body 26. Minor variations will be noted below. Thus, the primary accumulator cavity of injector 330 consists of a series of accumulator bores like bore 360 peripherally spaced about accumulator body 338 which are in communication with each other through annular cavity 362 in the bottom of accumulator body 338. The primary accumulator cavity communicates from annular cavity 362 through passages 364 in nozzle body 340 to kidney cavity 366, and thence to needle cavity 368. Needle 370 is normally biased to its closed position by needle spring 372 and guide/damper 374 which are located in spring cavity 375.

Needle plunger 376 extends upwardly from guide/damper 374 through spring 372 and plunger guide bore 378 in the upper end portion of accumulator body 342. Needle plunger 376 has a sliding fluid-tight seal in its guide bore 378, and its upper end is exposed to a small annual intensifier cavity 380. Intensifier cavity 380 communicates through a passage 382 and high pressure conduit 356 to the high pressure intensifier cylinder 354.

A minor variation in injector 330 of FIG. 18 from injector 10 of FIGS. 1–14 is that a generally cylindrical annular clearance 384 is provided between the outer surface of accumulator body 338 and the inner surface of housing 342. This clearance 384 has an outward frusto-conical flare at its upper end from which a vent passage 386 extends upwardly through stop piston body portion 336. Vent passage 386 is vented to a fuel supply source at relatively low pressure, as for example about 30 psig. Annular clearance 384 and vent passage 386 serve two functions. First, spring cavity 375 is filled with liquid fuel through a radial passage 387 from clearance 384 to cavity 375. Second, any leakage between the lapped interfaces between the stacked bodies will accumulate in the annular clearance 384 and be vented through vent passage 386.

A stop piston 388 is provided in injector 330 to positively define both the small incremental prelift of the needle and the extent of the full lift of the needle. Stop piston 388 is axially slidable a short distance in a cylinder 390 which is axially aligned with needle 370 and its plunger 376. Stop piston 388 has a downwardly extending coaxial rod or plunger portion 392 which is slidable with a fluid-tight seal in a bore 394. Although stop piston 388 and its plunger 392 are illustrated as an integral unit, they may, if desired, be separate parts and will function as a unit. A generally radially oriented vent passage 396 provides pressure relief from the bottom of cylinder 390 to the annular clearance 384, and hence to vent passage 386.

Upward travel of stop piston 388 is limited by piston stop member 396 which is located by means of a threaded positioning plug 400. Positioning plug 400 may, if desired, be threadedly axially adjustable to adjust the axial position of piston stop member 398. Stop member 398 determines the uppermost limit of travel of stop piston 388, and consequently of needle 370 and its plunger 376, as will be discussed below. An inlet/vent passage 402 provides alternate rail pressure and vent communication through positioning plug 400 and stop member 398 to stop piston cylinder 390.

The small increment 404 of needle prelift for the pilot charge is defined by the space between the upper end of needle plunger 376 and the lower end of stop piston plunger 392 with needle 370 in its closed position and stop piston 388 in its lowermost position as these parts are illustrated in FIG. 18. This is the position of the parts after completion of an intensification stroke with injector 330 prepared for an injection event. At such time rail pressure is being applied both to low pressure intensifier piston 346 through inlet/vent passage 350 and to stop piston cylinder 390 through inlet/vent passage 402. At such time high intensified pressure is being applied from high pressure intensifier cylinder 354 through high pressure conduit 356 and passage 382 to the small intensifier cavity 380. The accumulator cavity is at intensified pressure, applied through check valve 358. Full intensification pressure within intensifier cavity 380 holds the needle down, the downward force of high intensification pressure in intensifier cavity 380 against needle plunger 376 plus the downward force of spring 372 on needle 370 being greater than the upward force of accumulator pressure on the needle.

An injection event is initiated by partial venting of pressure from low pressure intensifier cylinder 348 out through inlet/vent passage 350, as will be explained in connection with FIG. 19. Such initial partial venting of low pressure intensifier cylinder 348 is not accompanied by any venting from stop piston cylinder 390, which is maintained at rail pressure. Lowering of the intensifier pressure by partial retraction or backing off of the two intensifier pistons 346 and 352 will cause the intensified pressure within intensifier cavity 380 to be lowered sufficiently for the upward force of accumulator pressure on needle 370 to overcome the downward force of intensifier cavity pressure on piston plunger 376 and the downward force of spring 372, at which time needle 370 will shift upwardly in its small initial increment 404 of lift which is stopped when the upper end of needle plunger 376 engages the lower end of stop piston plunger 392. At this time the full rail pressure against stop piston 388 blocks further upward movement of the needle. The time interval during which the needle is at this small prelift increment is adjustable by the hydraulic circuit of FIG. 19, and at the end of this time interval rail pressure is vented from stop piston cylinder 390 through inlet/vent conduit 402, allowing the needle to move upwardly a further increment 406 to its fully opened position which is determined by engagement of the upper end of stop piston 388 against stop member 398. The main injection event then occurs, and ends when accumulator pressure drops sufficiently for needle spring 372 to close needle 370.

FIG. 19 illustrates a hydraulic circuit 410 for operating the positive stop injector of FIG. 18. The hydraulic circuit 410 of FIG. 18 is the same as the hydraulic circuit of FIGS. 18–20 except for the addition of circuit components associated with stop piston 388 and its cylinder 390 which provide the positive incremental prelift stop for the needle. These additional components include a stop cylinder feed passage 412 which connects to control conduit 288 and communicates through a check valve 4 14 to stop cylinder inlet/vent passage 402. Also added in the hydraulic circuit of FIG. 19 is a stop cylinder vent passage 4 16 which connects stop cylinder inlet/vent passage 402 to control valve cylinder 294 at the same axial position as primary vent conduit 308.

2. Operation of Third Embodiment

Energization of solenoid 290 produces the intensification stroke of intensifier pistons 346 and 352 by lifting supply ball 272 off of its seat, providing rail pressure fuel through passages 284, 288 and 298 past check valve 300 into control valve cylinder 294 to extend control piston 296 to its fullest extent to the left as viewed in FIG. 19. In this position of piston 296, its ball actuator pin 320 lifts ball 314 off of its seat, admitting rail pressure fuel through conduits 276 and 318, chamber 316, valve seat 312, cylinder 294, and inlet/vent passage 350 to low pressure intensifier cylinder 348.

Simultaneously with pressurization of the intensifier cavity 380, rail pressure fuel is provided to stop piston cylinder 390 to place stop piston 388 in its positive stop position illustrated in FIG. 18. Such rail pressure fuel is provided from supply conduit 276 through chamber 274, conduits 284, 288 and 412, check valve 414, and stop cylinder inlet/vent passage 402.

Initiation of the two-stage injection event is caused by de-energization of solenoid 290, which causes solenoid valve supply ball 272 to seat and vent ball 278 to become unseated. The first, small increment stage of needle lift is produced by the hydraulic circuit 410 of FIG. 19 in the same way as it was produced in the hydraulic circuit 250 of FIGS. 15–17, except for the positive limitation placed on the first-stage needle lift by stop piston 388. Thus, upon de-energization of solenoid 290, control valve piston 296 slowly retracts to the right in FIG. 19 as fuel in cylinder 294 behind piston 296 bleeds out through bleed orifice 302, passages 304, 288 and 284, vent chamber 280, and vent passage 282. Such retracting movement of piston 296 lowers the pressure on its head side which lowers the pressure in low pressure intensifier cylinder 348 via inlet/vent passage 350, allowing intensifier pistons 346 and 352 to partially retract. When such partial retraction is sufficient, lowered pressure in intensifier cavity 380 of FIG. 18 will allow the needle to lift in its small first-stage increment which is positively defined by abutment of the needle plunger 376 against stop piston plunger 392. At this time the full rail pressure is maintained in stop piston cylinder 390 because stop cylinder vent passage 416 is closed off by control valve piston 296 and stop cylinder feed passage check valve 414 is closed.

As control piston 296 continues to retract to the right in FIG. 19 because of fuel bleeding through orifice 302, the piston's reduced head portion 310 comes into registry with both primary vent conduit 308 and stop cylinder vent passage 416 at the same time, whereby low pressure intensifier cylinder 348 and stop piston cylinder 390 are simultaneously vented through control cylinder 294 and primary vent conduit 308. This simultaneously removes the two barriers of high intensification pressure and stop piston 388 from above needle plunger 376, allowing full lift of the needle.

D. Fourth Embodiment

FIGS. 20–26 illustrate a further form of the invention which is generally designated 500 . Injector 500 is an intensifier-type fuel injector which appears generally similar to the first form shown in FIG. 1–14, but there are a number of distinctions between the two injectors. First, injector 500 has a unitary, short, lightweight needle, rather than a longitudinally divided needle having both lower needle and upper plunger sections as in FIG. 1–14. Second the stop/rate plate and its cavity in the injector form 500 are proximate the lower end of the injector, the plate seating against the top surface of the nozzle body and coacting directly with the top of the short needle, rather than with a needle extension plunger as in the FIGS. 1–14 form. Third, the stop/rate plate of the injector 500 is the bottom-recessed-type plate like that shown in FIG. 9, with its associated manufacturing advantages. Fourth, the accumulator cavity of injector 500 is coaxial with and located axially between the needle and the intensifier, with the needle return spring located in the accumulator cavity, and with the accumulator ball check valve located coaxially between the accumulator and the intensifier, rather than the accumulator cavity consisting of peripheral bores outside of a separate needle spring cavity and the accumulator ball check valve being laterally offset from the axis of the injector, as in the FIGS. 1–14 form. Fifth, the intensifier low pressure piston and high pressure plunger are hydraulically returned to their uppermost starting positions upon injection, without need of a return spring such as that employed in the FIGS. 1–14 form. Sixth, there is an intensifier plunger over-travel safety feature in injector 500 which stops further and uncontrolled injection events in the event of injector nozzle breakage or cracking. Seventh, the hydraulic circuitry in the injector itself is quite different from the FIGS. 1–14 form to accommodate these other differences, although the basic hydraulic circuitry external of the injector may be the same. In general, these features of the injector form 500 result in a minimized needle compression column length which provides a high order of injection predictability with close control of injection characteristics, a relatively large and free-flowing accumulator input check valve, and simplified, relatively low-cost manufacturing procedures.

1. Construction of Fourth Embodiment

Referring to FIGS. 20–26, injector 500 includes an upper intensifier body 502 which has an upper end 504 and a flat, transverse lower end surface 506. Axially aligned with and below intensifier body 502 is an accumulator body assembly which consists of two stacked portions, an upper accumulator body portion 508, and a lower accumulator body portion 510. The upper accumulator body portion 508 has flat, transverse upper and lower end surfaces 512 and 514, respectively, the upper surface 512 having a lapped seal with lower intensifier body surface 506. The lower accumulator body portion 510 has respective flat, transverse upper and lower end surfaces 516 and 518, the upper surface 516 having a lapped fit with the lower surface 514 of the upper accumulator body portion 508. Below the aforesaid axially aligned stack of body members is nozzle body 520 which has a flat, transverse upper end surface 522 that has a lapped seal with the lower end surface 518 of lower accumulator body portion 510.

All four of the injector body portions 502, 508, 510 and 520, are locked together in axial alignment by means of a housing 524 that is in the form of an elongated nut. A radially reduced externally threaded lower portion 526 of intensifier body 502 is threadedly gripped by an internally threaded upper end portion 528 of housing 524, with an O-ring seal 530 in the upper end of housing 524 providing a fluid-tight seal against an external annular surface of intensifier body 502. From this threaded upper connection of housing 524 with intensifier body 502, housing 524 extends downwardly in covering relationship over the two accumulator body portions 508 and 510 and nozzle body 520, housing 524 having a radially inwardly turned annular flange 532 at its lower end which axially upwardly grips against a downwardly facing annular shoulder 534 on nozzle body 520.

A. Intensifier Body 502 and Its Components

The upper portion of intensifier body 502 defines an axially oriented low pressure intensifier cylinder or chamber 536 within which a low pressure intensifier piston 538 is axially slidable. The upper limit of travel of piston 538 is defined by an upper end plug 540 within intensifier body 502, the end plug 540 being stopped against upward movement by a lock ring 542 seated in the upper end of body 502. An O-ring seal 544 provides a fluid-tight seal between end plug 540 and intensifier body 502 above piston 538.

The low pressure intensifier piston 538 has a generally flat annular head 548 with an integral upwardly projecting central boss 550. An integral cylindrical skirt 552 extends downwardly from piston head 548 to complete the low pressure intensifier piston 538.

Figure 24:
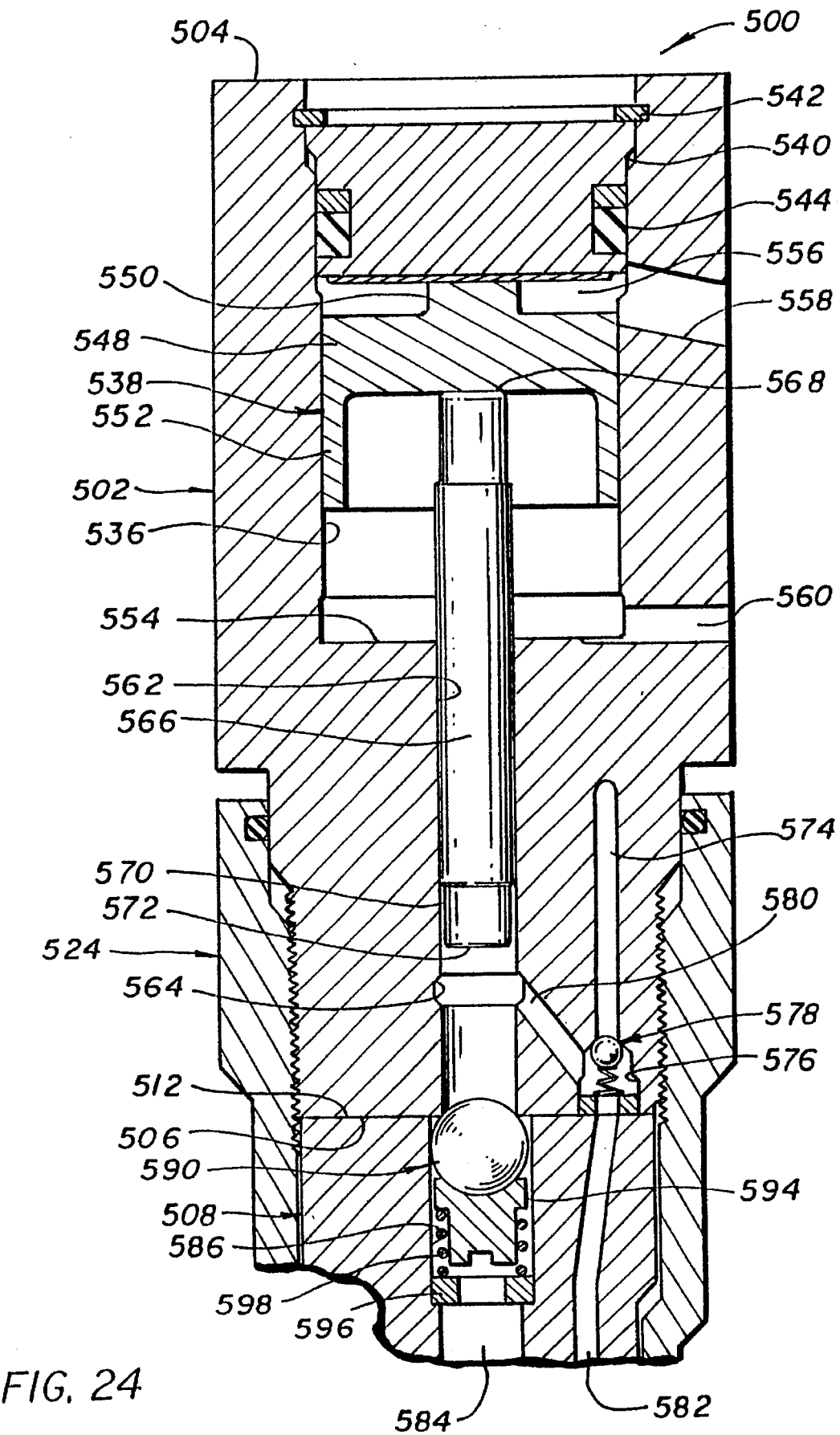
FIG. 24 is a further enlarged, fragmentary view of the upper part of FIG. 20, showing the intensifier piston and plunger in their uppermost positions prior to commencement of a downward intensification stroke, with the accumulator ball check valve in its seated, closed position.
Figure 26:
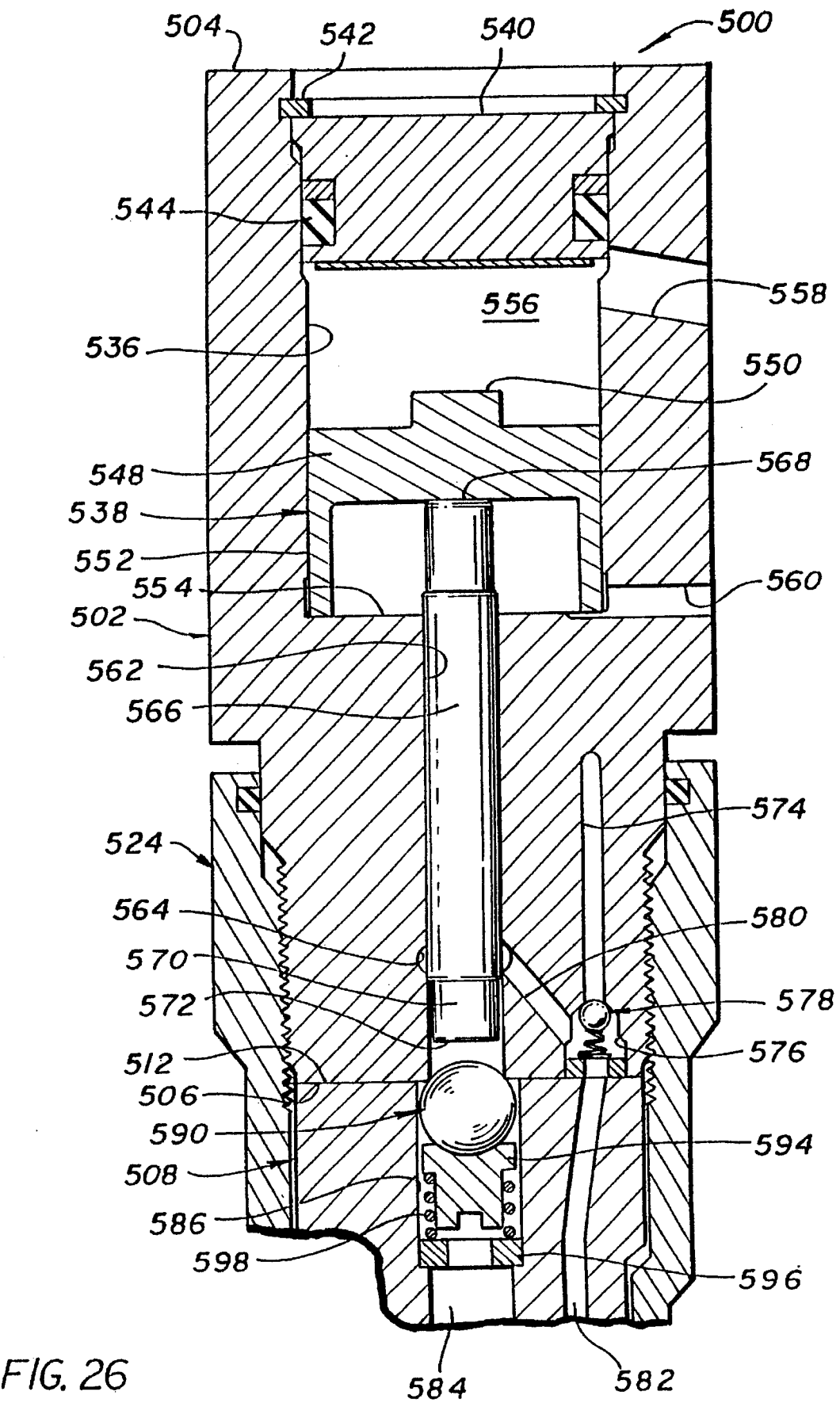
FIG. 26 is a view similar to FIGS. 24 and 25, with the intensifier piston and plunger moved further downwardly from their FIG. 25 positions in an "over-travel" position resulting from nozzle breakage, with the piston bottomed and the plunger in a "safety" position in which it blocks the plunger chamber inlet passage to prevent return upward travel of the intensifier plunger and piston.

Low pressure intensifier cylinder 536 has a generally closed, upwardly facing bottom surface 554 which defines an absolute lowermost limit of travel of piston 538 by engagement of the piston skirt 552 against it, as seen in FIG. 26. This represents an abnormally low position of piston 538 which will be reached only in the unlikely event of injector nozzle breakage or cracking, as described in detail below. The uppermost limit of travel of piston 538 is defined by engagement of the piston head boss 550 against the bottom surface of end plug 540 or against a spacer shim on the underside of plug 540 as seen in FIGS. 20 and 24. Boss 550 thus assures head space 556 above piston head 548 at all times, even when piston 538 is in its uppermost position of FIGS. 20 and 24. A generally transverse actuating fluid inlet/vent passage 558 communicates through the wall of intensifier body 502 to the upper end of cylinder 536 and hence to this head space 556. A generally transverse vent passage 560 also extends through the wall of intensifier body 502 so as to communicate with low pressure cylinder 536 proximate the bottom of cylinder 536. Vent passage 560 provides pressure and vacuum relief from the underside of piston 538 during axial movement of piston 538 within cylinder 536.

Within intensifier body 502 coaxially below low pressure cylinder 536 is a relatively small high pressure intensifier cylinder or chamber 562 which opens upwardly through the bottom surface 554 of the low pressure cylinder 536, and extends axially downwardly through the entire lower portion of body 502, opening downwardly through the lower end surface 506 of body 502. High pressure cylinder 562 has an annular inlet recess 564 in its lower portion. High pressure intensifier plunger 566 is axially slidable within high pressure cylinder 562, having an upper end 568 which abuts against the underside of low pressure piston head 548 in all axial locations of piston 538 and plunger 566. Plunger 566 has a reduced diameter lower end portion 570 providing an annular relief that extends to the lower end 572 of plunger 566.

Figure 22:
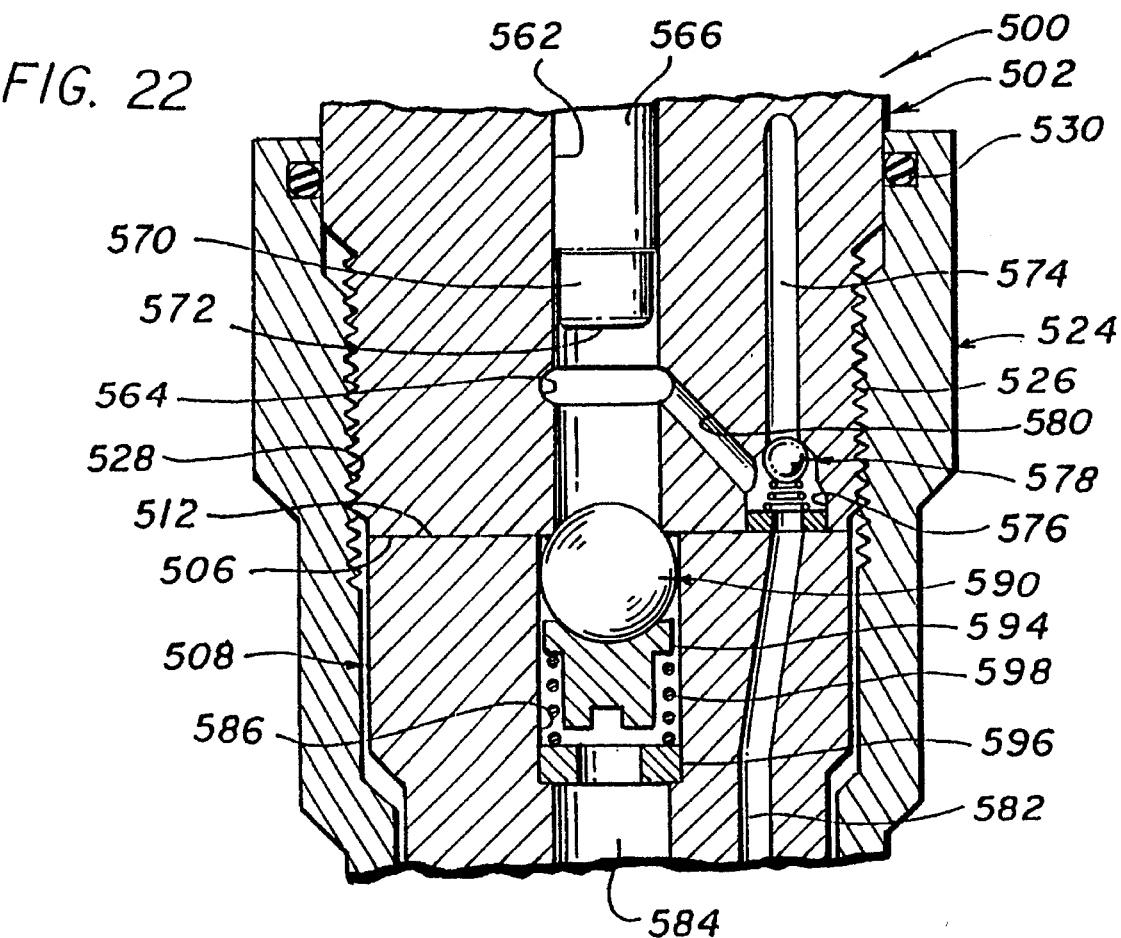
FIG. 22 is a further enlarged, fragmentary longitudinal axial section taken in the bracketed region 22 of FIG. 20.
Figure 25:
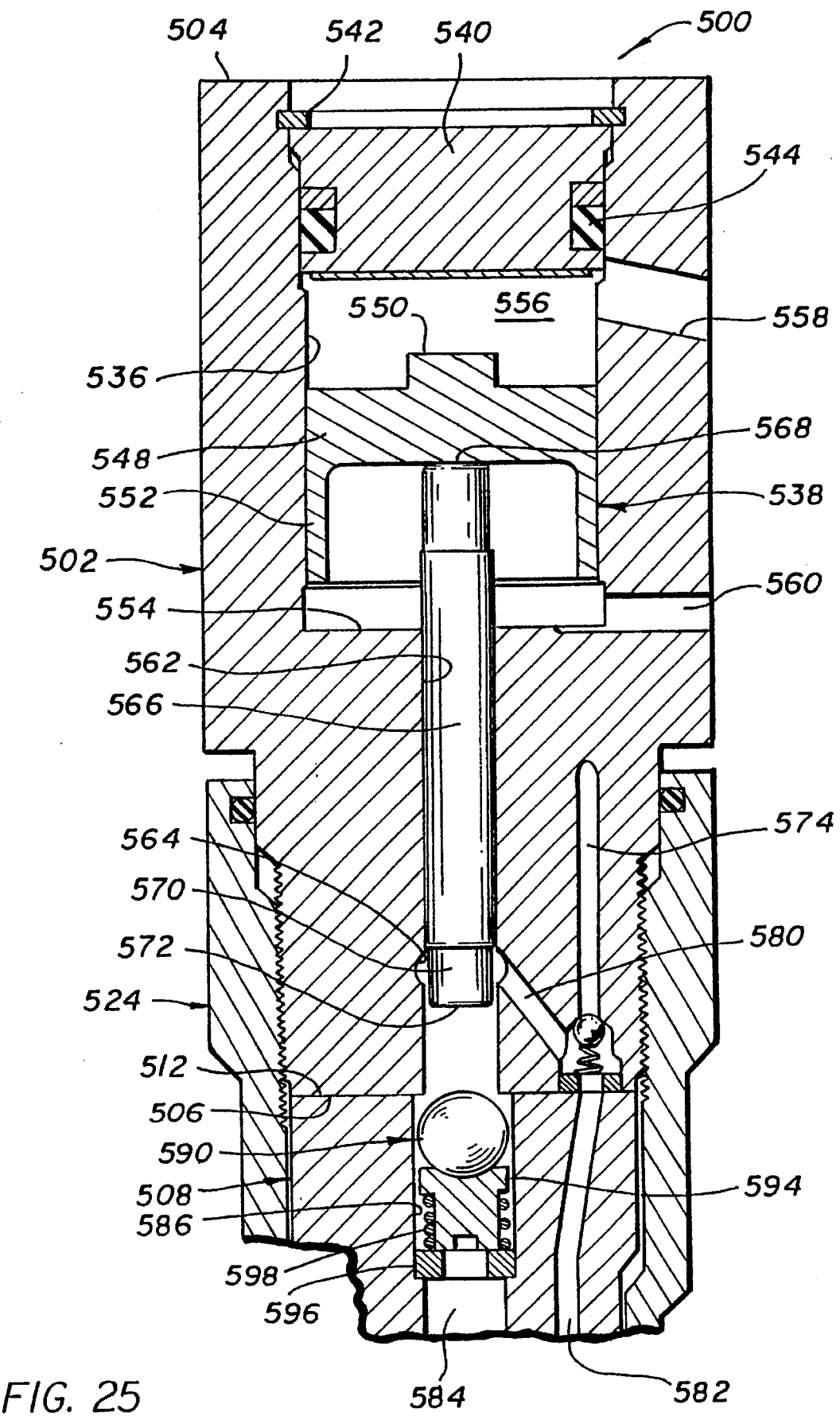
FIG. 25 is a view similar to FIG. 24, with the intensifier piston and plunger moved downwardly to a normal position at the completion of an intensification stroke, with the accumulator ball check valve shown still in its unseated, open position.

A rail pressure fuel source conduit 574 extends generally downwardly through intensifier body 502, providing a constant connection to rail pressure within intensifier body 502. Conduit 574 communicates with a check valve chamber 576 within the lower portion of body 502, and a ball check valve 578 provides one-way communication of rail pressure fuel through an inlet passage 580 to the high pressure intensifier cylinder 562 at annulus 564. In the uppermost position of plunger 566 as seen in FIGS. 20, 22 and 24, the lower end 572 of plunger 566 is offset substantially above inlet annulus 564. At the normal lowermost position of plunger 566 as seen in FIG. 25, the lower end relief portion 570 of plunger 566 communicates with the inlet annulus 564. Thus, in all normal positions of plunger 566, there is communication with rail pressure fuel for inlet flow of rail pressure fuel through check valve 578 to provide fuel within the lower portion of cylinder 562 during each upward fill stroke of plunger 566; while check valve 578 will block reverse flow of fuel during each downward intensification stroke of plunger 566.

B. Accumulator Body Upper Portion 508

An intensification fuel communication passage 582 extends from check valve chamber 576 downwardly through the entire length of upper accumulator body portion 508, receiving intensified fluid pressure during downward intensification strokes of plunger 566, and being relieved back to substantially rail pressure during upper injection and fill strokes of plunger 566. Communication passage 582 is substantially laterally offset from the axis of body portion 508.

A central bore 584 extends axially through the length of body portion 508, having respective upwardly opening and downwardly opening counterbores 586 and 588. Accumulator ball check valve 590 is freely axially shiftable in upper counterbore 586. A ball guide member 594 is engaged under ball 590, and is axially shiftable from an upper valve-closed position as seen in FIGS. 20, 22, 24 and 26 to a lower valve-open position as seen in FIG. 25 in which it is engaged against a stop ring 596 in the lower end of upwardly opening counterbore 586. Helical check valve compression spring 598 is engaged between stop ring 596 and guide member 594 to bias ball 590 to a normally closed, seated position against the lower end rim of high pressure intensifier cylinder 562 as seen in FIGS. 20, 22, 24, and 26. A ferrule-shaped needle spring seat 600 is fixedly seated in the upper end of downwardly opening counterbore 588.

C. Accumulator Body Lower Portion 510

Figure 23:
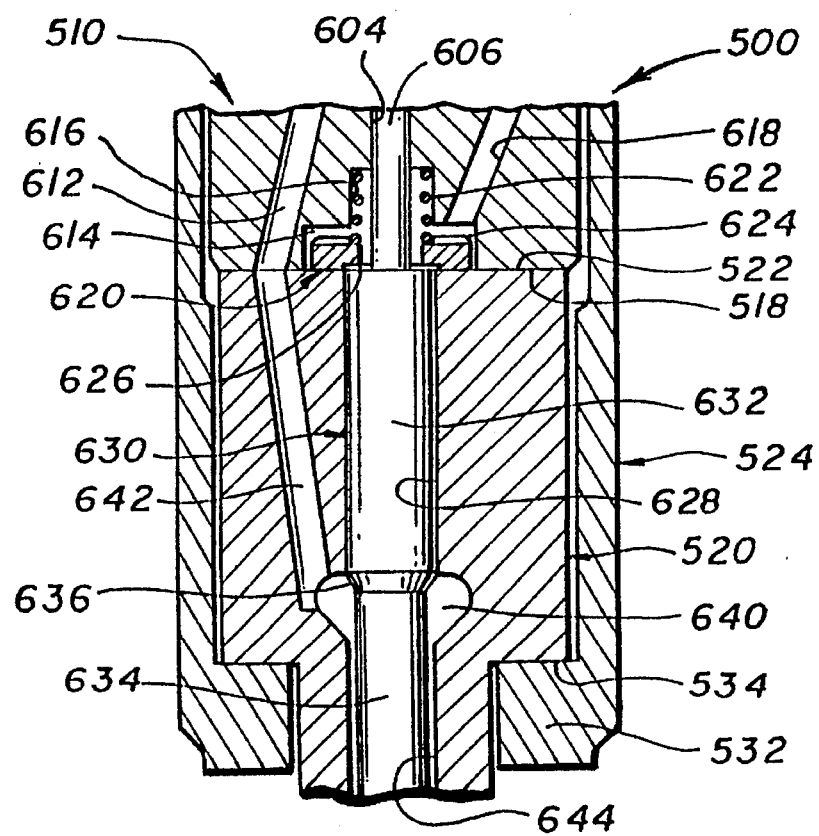
FIG. 23 is a view similar to FIG. 22 taken in the bracketed region 23 of FIG. 20.

The lower accumulator body portion 510 has a relatively large diameter upwardly opening axial bore portion 602 which communicates with the downwardly opening counterbore 588 of accumulator body portion 508. Bore portions 588 and 602 together define accumulator chamber 603. A relatively small axial bore extends downwardly through the lower portion on body 510 for receiving an axial seal pin 606. An annular spring adapter 608 is engaged against the top of seal pin 606 in the lower portion of accumulator chamber 603, and helical compression needle closure spring 610 in accumulator chamber 603 is engaged between adapter 608 and spring seat 600 to provide downward spring closure force through seal pin 606 to the top of the injector needle as seen in FIGS. 20 and 23. A needle force adjust shim may be interposed between adapter 608 and spring 610 as shown. An accumulator pressure fuel communication passage 612 extends downwardly from the lower end of accumulator chamber 603 through body 510 and its lower end surface 518.

Seal pin bore 604 has a downwardly opening, stepped counterbore consisting of a relatively large diameter, downwardly opening counterbore portion defining the stop/rate plate cavity 614, and a relatively small diameter inner counterbore portion defining a stop/rate plate seating spring cavity 616. An intensification pressure fuel communication passage 6 18 extends from passage 582 in upper accumulator body portion 508 down through lower accumulator body portion 510 into communication with stop/rate plate cavity 614.

The stop/rate plate is designated 620, being generally ring- or washer-shaped with a central circular aperture through which seal pin 606 extends. The bottom surface of stop/rate plate 620 is flat, and has a lapped seal against the upper end surface 522 of nozzle body 520. Stop/rate plate 620 is biased downwardly to a normally flush engagement against nozzle body surface 522 by means of plate seating spring 622 which extends downwardly from spring cavity 616 into plate cavity 614 and against the top of plate 620. Plate 620 preferably has a plurality, such as four, of radially extending ribs on its upper surface which allow free flow of fuel above stop/rate plate 620 at all times, and also serve to center spring 622 above plate 620. Suitable peripheral clearance is also provided about plate 620 for free flow of fluid. Stop/rate plate 620 is preferably of the type shown in FIG. 9, having a downwardly opening axial recess 626 for receiving the upper end of the needle so as to define the needle prelift increment of movement. Alternatively, the plate and needle arrangements may, if desired, be generally like those shown in FIGS. 8, 10 or 14.

D. Nozzle Body 520

Nozzle body 520 has an axial needle guide passage 628 through which the needle, generally designated 630, extends. Needle 630 is a short, lightweight, unitary structure having an enlarged upper guide portion 632 which axially slidably fits within guide passage 628, and a reduced diameter lower shank portion 634, portions 632 and 634 being connected by a generally downwardly facing bevel or chamfer portion 636. The needle shank portion 634 extends downwardly to a frusto-conical needle valve closure tip 638.

Nozzle body 520 defines an annular kidney cavity 640 which communicates in its upper portion with the needle bevel portion 636. An accumulator pressure fuel communication passage 642 extends from kidney cavity 640 upwardly through nozzle body 520 into communication with the accumulator pressure fuel communication passage 612 in lower accumulator body portion 510. Elongated, narrow needle cavity 644 extends downwardly from kidney cavity 640 to needle valve seat 646 proximate the lower end of nozzle body 520.

2. Operation of the Fourth Embodiment

The mode of operation of the form of the present invention shown in FIGS. 20–26 and structurally described above is essentially the same as the mode of operation described in detail hereinabove for the two-stage needle lift form of the invention shown in FIGS. 1–14, involving the same pressure ratios and parameters, ranges, equations, and other features of operation described in detail for the form of FIGS. 1–14. Accordingly, all such operational factors described relative to FIGS. 1–14 are hereby adopted also for the form of the invention shown in FIGS. 20–26. As with the form shown in FIGS. 1–14, overall and specific systems for operating the intensifier-type accumulator injector of FIGS. 20–26 are illustrated and described in detail in the Beck et al. '881 patent, including the high speed solenoid actuated control valve, and such systems are fully applicable for operating the intensifier-type accumulator injector of FIGS. 20–26. Accordingly, the Beck et al. '881 patent is hereby incorporated by reference for its disclosures of apparatus and methods for operating the intensifier-type accumulator injector 500 of FIGS. 20–26. Similarly, the two-stage needle lift control system applied to an intensified accumulator injector diagrammatically illustrated in FIGS. 15–17 and described in detail in connection with those figures is equally applicable to the intensified injector 500 of FIGS. 20–26. Accordingly, the control system of FIGS. 15–17 and the foregoing description of the structure and operation thereof are also hereby incorporated by reference as applicable to intensified injector 500 of FIGS. 20–26.

The specific mode of operation for accumulator injector 500 of FIGS. 20–26 will now be described, with minor differences noted from the operation of the form shown in FIGS. 1–14.

In the position of the parts shown in FIGS. 20–25, an injection event has been effected by venting fuel from head space 556 in low pressure intensifier cylinder 536 through inlet/vent passage 558 to a lower-than-rail pressure, which may be essentially atmospheric pressure. Low pressure intensifier piston 538 and high pressure intensifier plunger 566 are at their uppermost positions, having been moved upwardly to these positions by fuel at rail pressure entering the injector through fuel supply conduit 574, passing through check valve 578 and inlet passage 580 into the high pressure intensifier cylinder 562 under high pressure intensifier plunger 566. Accumulator ball check valve 590 is closed under the combined influence of pressure within accumulator chamber 603 which is considerably higher than rail pressure, and check valve spring 598. The needle valve is closed, needle 630 being moved back down to its lowermost position after injection under the influence of needle closure spring 610. The high pressure intensifier cylinder 562 is filled with fluid.

The timed intensification stroke is caused by introduction of fuel at rail pressure through actuating fluid inlet/vent passage 558 into head space 556 at the upper end of low pressure intensifier cylinder 536. Downward movement of low pressure piston 538 moves high pressure plunger 566 downwardly for pressure multiplication of the fuel within high pressure cylinder 562, and when the fluid pressure within high pressure cylinder 562 becomes greater than the residual fluid pressure within accumulator chamber 603, ball check valve 590 unseats downwardly to its position of FIG. 25 to pass this intensified fuel downwardly through bore 584 into intensifier chamber 603. The downward intensification stroke terminates when fluid pressure balance is achieved between high pressure cylinder 562 and accumulator chamber 603, at which time accumulator ball check valve 590 closes. FIG. 25 illustrates the completion of an intensification stroke just before ball check valve 590 closes. The extent of downward travel of high pressure plunger 566 during the intensification stroke will depend upon engine load, longer downward strokes of intensifier plunger 566 corresponding to higher engine loads.

It is presently preferred to employ fuel pressure metering in which fuel rail pressure is varied to accommodate different engine loads, being higher for heavier engine loads and being lower for lighter engine loads. Higher rail pressures result in greater compression within high pressure intensifier cylinder 562, and correspondingly within accumulator chamber 603 with resulting greater injectable fuel volume. Alternatively, pulse width or time duration fuel metering may be employed, or if desired, a combination of pressure metering and pulse width or time metering may be employed.

During the aforesaid downward compression stroke, intensified pressurized fuel communicates downwardly through passage 580, check valve chamber 576, and communication passages 582 and 6 18 into the stop/rate plate cavity 614. At this time, stop/rate plate 620 remains seated against the upper end surface 522 of nozzle body 520. Stop/rate plate 620 is fluid-locked in its seated position during the intensification stroke by means of hydraulic force differential of the intensified pressure in stop/rate plate cavity 614 on plate 620, the same intensified pressure being applied to both the top and bottom surfaces of plate 620, but the effective top surface being greater than the effective bottom surface because of the substantial peripheral portion of the plate 620 which is masked by the lapped surface contact between the bottom of plate 620 and the upwardly facing nozzle body surface 522.

During intensification, needle 630 is held down in its seated position by downward hydraulic force in plate cavity 614 against the top surface of needle 630 and by the force of needle closure spring 610. At this time, such downward closure forces are greater than the upward force of accumulator pressure in kidney cavity 640 and needle cavity 644 against downwardly facing portions of needle 630 (bevel portion 636 and partly masked top portion 638). Such accumulator pressure is applied to kidney cavity 640 from accumulator chamber 603 through passages 612 and 642.

The two-stage needle lift is caused by timed venting of the low pressure intensifier cylinder head space 556 through inlet/vent passage 558 to a lower-than-rail pressure such as essentially atmospheric pressure. As the pressure decays within low pressure cylinder 536, it simultaneously decays within high pressure cylinder 562, and hence through passages 580, 582 and 6 18 to within plate cavity 614 and against the upper end surface of needle 630. Nevertheless, intensified pressure remains in kidney cavity 640 and needle cavity 644, this intensified pressure overcoming the decaying pressure in plate cavity 614 and causing needle 630 to lift in its low-lift increment where it is stopped against the downwardly facing surface in plate recess 626, needle 630 remaining at this low-lift, pilot injection position for an increment of time until the aforesaid downward pressure-area differential is overcome by the aforesaid upward fluid pressure force on needle 630 to release stop/rate plate 620 from its seated position and allow needle 630 to lift to a higher, full injection position, the extent of plate lift depending upon engine load. By way of example only, and not of limitation, representative needle lift increments may be on the order of about 0.0005 inch for the prelift increment and 0.012 inch for full lift.

The extent of overlap of plate 620 on nozzle body surface 522 controls the time duration of the prelift pilot injection, while the depth of plate recess 626 controls the rate of pilot injection fuel flow. Thus, these two features of the stop/rate plate 620 synergistically control the fuel volume of the pilot injection.

During injection, intensified pressurized fuel flows from accumulator cavity 603 through communication passages 612 and 642, kidney cavity 640 and needle cavity 644 through the injector nozzle, until the intensified pressure decays to the point where upward fluid pressure on needle 630 is overcome by downward fluid pressure on the top surface of needle 630 and the force of needle return spring 610, at which time needle 630 closes against valve seat 646, closing off accumulator cavity 603 at substantially higher than rail pressure, and allowing stop/rate plate 620 to again seat flush against the upwardly facing nozzle body surface 522. The upward force of fuel at rail pressure in high pressure intensifier cylinder 562 moves both intensifier plunger 566 and piston 538 back upwardly to their uppermost positions as viewed in FIGS. 20, 22, and 24. Injector 500 is then ready for sequential injection events.

3. Over-Travel Safety Feature

As described above, the intensifier-type fuel injector 500 utilizes hydraulic rail pressure to return the intensifier piston 538 and plunger 566 to their uppermost positions. Under normal operating conditions, the downward travel of plunger 566, and hence also of piston 538, stops during an intensification stroke when the pressure within high pressure cylinder 562 balances with the pressure in accumulator chamber 603, and as illustrated in FIG. 25, the return rail pressure inlet annulus 564 remains, effectively, under intensifier plunger 566, since annulus 564 remains in communication with the relief portion 570 at the bottom of plunger 566. FIG. 25 shows the lowermost position of plunger 566 under maximum load conditions, with such communication still fully in effect.

However, in the event of injector nozzle breakage or cracking, the balancing pressure may be relieved from accumulator chamber 603 since injector needle 630 cannot effectively close off the nozzle, and fuel can continue to flow downwardly from accumulator chamber 603 through communication passages 612 and 642, kidney cavity 640 and needle cavity 644, and thence out through the breach. Without a safety feature to prevent further flow of rail. pressure fuel into the high pressure intensifier cylinder 562, the result could be a series of further and uncontrolled injection events. However, in the present invention the intensifier parts are so arranged that in the event of such a nozzle breach, the resulting reduced fuel pressure within accumulator chamber 603 will prevent the normal fluid balance from occurring and allow plunger 566 to move downwardly to an over-travel safety position as illustrated in FIG. 26 in which the plunger body above its relief portion 570 seals off the rail pressure fluid inlet annulus 564 to prevent further entry of rail pressure fluid into the intensifier, and thereby positively block any further injection events. Such over-travel is stopped when the skirt portion 552 of low pressure piston 538 bottoms out against the bottom surface 554 of low pressure cylinder 536 under the influence of rail pressure fuel flowing into head space 556 through fluid inlet/vent passage 558.

4. Stop Plate/VCO Feature

Improved ignition during the pilot injection phase can be achieved by replacing the needle 630 and associated nozzle of the injector 500 with a valve covers orifice (VCO) nozzle and associated needle. Thus, referring to FIGS. 27–29, a portion of the injector 500 is illustrated in which the needle, nozzle, and needle body have been replaced by a VCO nozzle, needle, and needle body. All other portions of the injector 500, including the stop plate 620, remain unchanged.

Nozzle body 720 is generally the same as nozzle body 520 described above and thus includes an upper end surface 722 which has a lapped seal with the lower end surface 518 of lower accumulator body portion 510 and a downwardly facing annular shoulder 734 abutting annular flange 532 of housing 524. Nozzle body 720 has an axial needle guide passage 828 through which the needle, generally designated 830, extends. Needle 830, like needle 630 described above, is a short, lightweight, unitary structure having an enlarged upper guide portion 832 which axially slidably fits within guide passage 828, and a reduced diameter lower shank portion 834. Portions 832 and 834 are connected by a generally downwardly facing bevel or chamfer portion 836. The needle shank portion 834 extends downwardly to a frusto-conical needle valve closure tip 838 mating with a valve seat 846 detailed below.

Nozzle body 720, like nozzle body 520 described above, defines an annular kidney cavity 840 which communicates in its upper portion with the needle bevel portion 836 of needle 830. An accumulator pressure fluid communication passage 842 extends from kidney cavity 840 upwardly through nozzle body 720 into communication with the accumulator pressure fluid communication passage 612 in lower accumulator body portion 510 of injector 500. An elongated, narrow needle cavity 844 extends downwardly from kidney cavity 840 to a needle valve seat 846 of VCO 850.

Figures 28, 29:
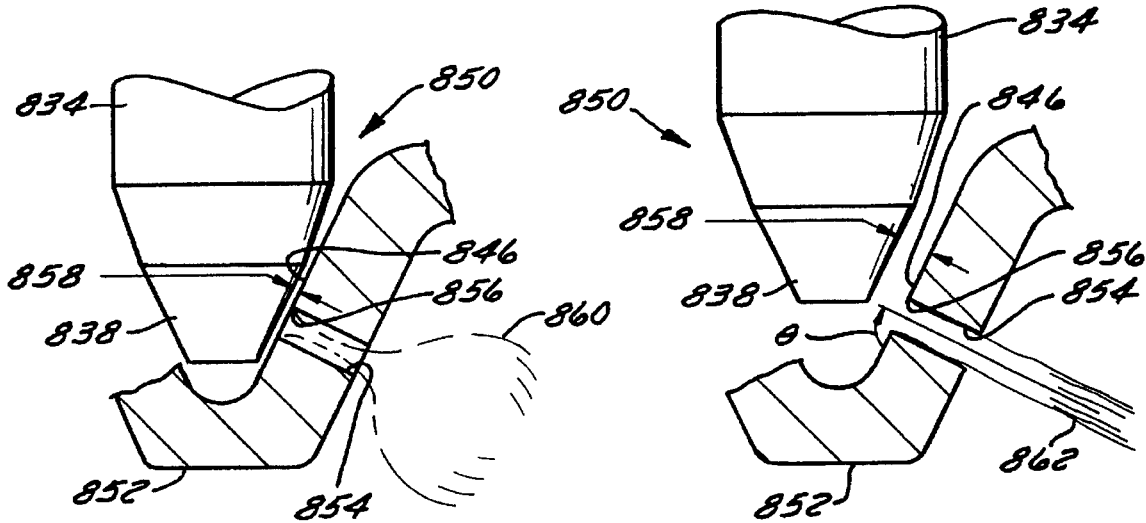
FIG. 28 is a greatly enlarged fragmentary sectional view of a portion of the encircled portion of FIG. 27 designated "28" with the needle valve in a partially open position.
FIG. 29 is a view similar to FIG. 28, with the needle valve in its fully open position.

Referring to FIGS. 28 and 29, VCO 850 is formed from a nozzle cap 852 formed on the lowermost end of nozzle body 720 and defines the frusto-conical needle valve seat 846 having a shape which complements that of the mating frusto-conical needle tip 838 of needle 830. Injection bores 854 are formed through the cap 852 and have inlets 856 opening into the valve seat 846.

The use of the VCO 850 to improve the two-stage fuel injection process of injector 500 will now be described. When the lower pressure intensifier cylinder head space is vented through the inlet vent passage (not shown in FIGS. 27–29), the intensified pressure in kidney cavity 840 and needle cavity 844 overcome the decaying pressure in plate cavity 614 and cause the needle 830 to lift its low lift increment to a position in which it is stopped against the downwardly facing surface in plate recess 826. By this time, needle 830 would have risen from its seated position to the prelift position illustrated ill FIG. 28 in which the gap 858 between needle tip 838 and valve seat 846 is less than 10%, and preferably between 1% and 5% of the diameter each of the holes 854. The area of a cylinder formed as an extension of each ejection hole 854 between the inlet 856 of the hole 854 and the needle tip 838 (which cylinder has a diameter equal to the diamter of the hole 854 and a height equal to the thickness of the gap 858) is thus between 4% and 20% of the cross-sectional area the holes 854. Fuel thus flows through the gap 858 at a throttled rate producing a turbulence at the inlets 856 of holes 854. This turbulent flow into holes 854 results in the ejection from the holes of a highly atomized, wide angle spray plume 860 with low penetration. This plume is easily ignited and thus facilitates preignition of the pilot charge.

When the needle 830 is lifted to its full lift position to inject the main fuel charge as described above, needle tip 838 lifts to a position in which the gap 858 between needle tip 838 and valve seat 846 has a diameter of about 25% of the diameter of each of the holes 854 and forms a cylinder between each hole 854 and the needle tip 838 which is approximately 100% of the cross sectional area of each of the holes 854. The flow of fuel to the inlet 856 of holes 854 is thus no longer throttled. As a result, fuel is ejected from the holes 854 into the cylinder in a considerably narrowed jet 862 having high penetration. This penetrating jet 862 is desired for combustion during the main injection event.

Figure 27:
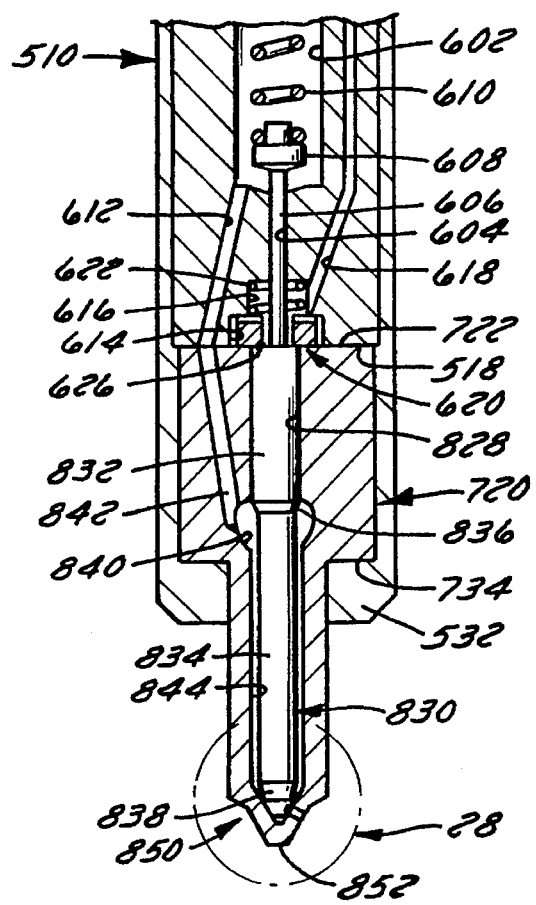
FIG. 27 is an enlarged longitudinal, axial sectional view of a portion of the injection system of FIG. 20 employing as the nozzle a valve covers orifice (VCO) nozzle.

The injector of the embodiment of the invention illustrated in FIGS. 27–29 is designed for the axial insertion of the injector 500 into the engine cylinder. Each of the injection holes 854 is accordingly drilled into the needle cap 852 at the same angle θ, which is essentially perpendicular to the valve seat 846, to produce a uniform injection of fuel into the cylinder. It should be understood, however, that if the fuel injector must be inserted into the engine cylinder at an inclined angle with respect to the engine cylinder axis, e.g., to make room for valves or other devices mounted on the engine cylinder, the ejection of fuel from injection holes drilled at the uniform angle θ would not result in uniform dispersement of fuel into the cylinder. It would accordingly be necessary in this instance to alter the angles at which some of the injection holes are drilled to compensate for the inclination of the injector. For instance, holes on opposed sides of the injector may, depending upon the orientation of the injector, be drilled at respective angles of θ+δ and θ−δ to compensate for injector tilt.

The combination of the stop/rate plate 620 and the VCO 850 is believed to provide an improved two-stage injection event not possible with either feature alone. That is, the highly atomized plume 860 desired during pilot or initial fuel injection is assured by the gap 858 which, due to the operation of the rate plate 620 as described above, remains constant until accumulator pressure decays to a designated level permitting the injection of the main charge. This permits a degree of control of the two-stage injection system not believed possible with conventional two-stage injection systems— even two-stage injection systems utilizing VCOs.

While the present invention has been described with regard to particular embodiments, it is to be understood that modifications may be readily be made by those skilled in the art, and it is intended that the claims cover any such modifications which fall within the scope and spirit of the invention as set forth in the appended claims.

What is claimed is:

1. A method of reducing undesired premixed burning in an internal combustion engine, comprising:

A. lifting an injector needle of a fuel injector a constant low-lift increment from a valve seat of a valve covers orifice (VCO) nozzle having an injection hole opening into said valve seat;

B. preventing lifting of said injector needle beyond said low-lift increment for a sufficient interval of time to inject a relatively small initial fuel charge into the engine from said VCO nozzle, said injection producing a highly atomized, wide-angle spray plume with relatively low penetration, said interval terminating when lifting forces imposed on said injector needle overcome holding forces imposed on said injector needle by a stop plate, said stop plate having opposed first and second surfaces exposed to an ambient fluid pressure and to a fluid vapor pressure, respectively;

C. lifting said injector needle to a higher lift position to inject a main fuel charge into the engine, said main fuel charge being ejected from said VC0 nozzle as a relatively narrow jet having high penetration.

2. A method as defined in claim 1, wherein said fuel injector is a pressure intensified-type fuel injector, and wherein said ambient fluid pressure comprises intensified fluid pressure, and further comprising applying a biasing force to said injector needle via a needle return spring located in an accumulator cavity of said injector.

3. A method as defined in claim 1, wherein said preventing step commences when said injector needle abuts said stop plate and terminates when said stop plate lifts with said injector needle.

4. A method as defined in claim 3, wherein said fluid vapor pressure is formed from an essentially fluid-tight seal formed by the seating of said stop plate onto a mating flat stationary member, and wherein, when said stop plate is lifted, said seal is broken and fluid pressure at the interface between said stop plate and said stationary member increases from said fluid vapor pressure to said ambient pressure.

5. A method as defined in claim 1, wherein, during the injection of said initial fuel charge, a needle tip of said injector needle is spaced from said valve seat by a constant pre-lift gap the thickness of which is less than 10% of the diamter of said injection hole.

6. A method as defined in claim 5, wherein the thickness of said constant pre-lift gap is between 1% and 5% of the diameter of said injection hole.

7. A method as defined in claim 5, wherein, during the injection of said main fuel charge, said needle tip of said injector needle is spaced from said valve seat by a gap the thickness of which is approximately 100% of the diameter of said injection hole.

8. A fuel injector for an internal combustion engine comprising:
  A. an injector body;
  B. a valve covers orifice (VCO) nozzle provided on said injector body and having a needle valve seat and an injection hole opening into said valve seat;
  C. an injector needle slidably received in said injector body and having a needle tip normally seated on said valve seat; and
  D. a stop plate disposed in said injector body and being normally positioned so as to have opposed first and second surfaces thereof exposed to an ambient fluid pressure and to a fluid vapor pressure, respectively.

9. A fuel injector as defined in claim 8, wherein said second surface of said stop plate comprises a downwardly facing flat and smooth surface which is normally seated on a flat and smooth shoulder of said injector body so as to provide an essentially fluid-tight seal therebetween.

10. A fuel injector as defined in claim 8, wherein said fuel injector is an accumulator-type fuel injector in which the energy for injection is stored by the compression of liquid fuel within an accumulator cavity of said injector.

11. A fuel injector as defined in claim 10, wherein said fuel injector is a pressure intensified-type fuel injector having a cavity exposed to intensified fluid pressure, and wherein said stop plate is provided in said cavity.

12. A fuel injector as defined in claim 11, further comprising
  A. a pin which extends through a hole formed in said stop plate and has a lower end which abuts said injector needle and an upper end positioned in said accumulator cavity, and
  B. a needle return spring positioned in said accumulator cavity and seated on said pin.

13. A fuel injector as defined in claim 8, wherein said injector is dimensioned such that, during the injection of an initial fuel charge, said needle tip of said injector needle is spaced from said valve seat by a constant pre-lift gap the thickness of which is less than 10% of the diameter of said injection hole.

14. A fuel injector as defined in claim 13, wherein the thickness of said gap is between 1% and 5% of the diameter of said injection hole.

15. A fuel injector as defined in claim 13, wherein said injector is dimensioned such that, during the injection of a main fuel charge, said needle tip of said injector needle is spaced from said valve seat by a gap the thickness of which is approximately 20% of the diameter of said injection hole.

16. A fuel injector as defined in claim 8, wherein a plurality of said injection holes are formed in said nozzle and open into said valve seat at a uniform angle θ.

17. A fuel injector as defined in claim 8, wherein a plurality of said injection holes are formed in said nozzle and open into said valve seat, and wherein two of said holes are formed in opposed sides of said nozzle and open into said valve seat at different angles to compensate for injector tilt.

18. A method of reducing undesirable premixed burning in an internal combustion engine, comprising
  A. raising an injector needle of an accumulator-type fuel injector off a valve seat a small constant low-lift increment for a sufficient interval of time to inject a small initial fuel charge into the engine through a valve covers orifice (VCO) nozzle having an injection hole opening into said valve seat; and then
  B. raising said injector needle to a higher lift position to inject a main fuel charge into the engine.

19. A fuel injector comprising:
  A. an injector body having
    (1) a longitudinal bore formed therein,
    (2) a valve covers orifice (VCO) nozzle formed in a bottom end of said bore and defining a frusto-conical needle valve seat, and
    (3) a pressurized cavity formed therein located above and in communication with an upper end of said bore;
  B. an injector needle slidably received in said bore and having a lower frusto-conical needle tip normally seated on said valve seat and an upper end normally disposed proximate a junction between said pressurized cavity and said bore; and
  C. a stop plate disposed in said pressurized cavity and having
    (1) an upper surface exposed to an ambient fluid pressure in said pressurized cavity,
    (2) a lower surface sealingly contacting a shoulder of said injector body, and
    (3) a hole formed therethrough permitting the imposition of forces, generated by said ambient fluid pressure in said pressurized cavity, on said upper end of said injector needle.

20. A fuel injector as defined in claim 19, wherein said injector is an intensified accumulator type injector having an intensifier chamber and an accumulator chamber, and wherein said ambient fluid pressure comprises intensifier pressure in said intensifier chamber, and further comprising a needle spring which is provided in said accumulator chamber and which biases said injector needle towards said valve seat.

21. A fuel injector as defined in claim 20, further comprising a pin extending through said hole of said stop plate and having a lower end abutting said upper end of said injector needle and an upper end located in said accumulator chamber and abutting said needle spring.

22. A fuel injector as defined in claim 19, wherein
  A. the pressure at an interface between said lower surface of said stop plate and said shoulder of said injector body is approximately fluid vapor pressure, and
  B. the net pressure forces on said stop plate are the product of 1) the area of said interface and 2) the difference between an ambient pressure in said pressurized cavity and said fluid vapor pressure.

23. In an internal combustion engine accumulator-type fuel injector, a method of reducing undesirable premixed burning in the engine which comprises:
  A. raising an injector needle off a valve seat of a nozzle a small, constant low-lift increment for a sufficient interval of time to inject a small initial fuel charge into the engine, said nozzle comprising a valve covers orifice (VCO) nozzle having an injection hole opening into said valve seat;
  B. then lifting said injector needle to a full lift position to inject a main fuel charge into the engine; and
  C. controlling needle lift by controlled venting of pressurized liquid from a pressurized zone located above said injector needle.

24. A method as defined in claim 23, wherein said step of controlling comprises:
  A. first relatively slowly venting said pressurized liquid from said pressurized zone to produce said constant low-lift increment of lift of said injector needle; and
  B. then relatively rapidly venting said pressurized liquid from said pressurized zone to produce said lifting of said injector needle to its said full lift position.

25. A method as defined in claim 24, further comprising:
  A. placing a stop plate at a first stop position in which it is spaced said low-lift increment above the upper end of said injector needle prior to said relatively slow venting so as to positively stop said injector needle at its said low-lift increment of lift during said relatively slow venting, thereby permitting only throttled fuel flow to said injection hole of said VCO; and
  B. releasing said stop plate from its first stop position during said relatively rapid venting so as to enable said injector needle to lift to its said full lift position, thereby permitting unthrottled fuel flow to said injection hole of said VCO nozzle.

26. A fuel injector for an internal combustion engine comprising:
  A. an injector body having a flat, smooth surface;
  B. a nozzle provided on said injector body and defining needle valve seat;
  C. an injector needle slidably received in said injector body and being normally seated on said valve seat; and
  D. a stop plate disposed in a cavity which is formed in said injector body above said injector needle and which is subject to an ambient fluid pressure, said stop plate having a smooth, flat axial surface and an opposed rough, flat axial surface, said stop plate selectively seating on said smooth surface of said injector body.

27. A fuel injector as defined in claim 26, wherein said smooth surface of said stop plate faces said smooth surface of said injector body and seals against said smooth surface of said injector body when said stop plate is seated on said injector body.

28. A fuel injector as defined in claim 26, wherein said rough surface of said stop plate faces said smooth surface of said injector body and does not seal against said smooth surface of said injector body when said stop plate is seated on said injector body.

29. A method of injecting fuel into an engine comprising:
  A. lifting an injector needle of a fuel injector a constant low-lift increment from a valve seat of said fuel injector into an abutting relationship with a stop plate to inject an initial fuel charge into said engine, said stop plate being positioned in a cavity exposed to an ambient fluid pressure and having a smooth, flat axial surface and an opposed rough, flat axial surface, said stop plate being seated on a smooth, flat surface of an injector body in which said injector needle is slidable; and then
  B. lifting said injector needle to a higher lift position to unseat said stop plate from said surface of said injector body and to inject a main fuel charge into the engine.

30. A method as defined in claim 29, wherein said smooth surface of said stop plate is sealingly seated on said smooth surface of said injector body during said step A so that said ambient fluid pressure and a fluid vapor pressure are imposed on said rough surface and a portion of said smooth surface, respectively, thereby imposing holding forces on said stop plate, and further comprising preventing lifting of said injector needle beyond said low-lift increment for a sufficient interval of time to inject a relatively small initial fuel charge into the engine, said interval terminating when lifting forces imposed on said injector needle overcome said holding forces imposed on said stop plate.

31. A method as defined in claim 29, wherein said rough surface of said stop plate is non-sealingly seated on said smooth surface of said injector body during said step A so that said ambient fluid pressure is imposed on both said rough surface and said smooth surface of said stop plate, and further comprising lifting said injector needle beyond said low-lift increment immediately upon contact between said injector needle and said stop plate.

* * * * *